(12) United States Patent
Curtis et al.

(10) Patent No.: US 9,388,766 B2
(45) Date of Patent: Jul. 12, 2016

(54) NETWORKS OF COGENERATION SYSTEMS

(71) Applicant: Concentric Power, Inc., Campbell, CA (US)

(72) Inventors: Brian Mark Curtis, San Jose, CA (US); Riyaz Mohammed Shipchandler, Campbell, CA (US)

(73) Assignee: CONCENTRIC POWER, INC., Campbell, CA (US)

( * ) Notice: Subject to any disclaimer, the term of this patent is extended or adjusted under 35 U.S.C. 154(b) by 339 days.

(21) Appl. No.: 13/841,068

(22) Filed: Mar. 15, 2013

(65) Prior Publication Data

US 2014/0039708 A1 Feb. 6, 2014

Related U.S. Application Data

(60) Provisional application No. 61/685,738, filed on Mar. 23, 2012, provisional application No. 61/685,737,
(Continued)

(51) Int. Cl.
*G06F 19/00* (2011.01)
*F02G 5/00* (2006.01)
(Continued)

(52) U.S. Cl.
CPC . *F02G 5/00* (2013.01); *F01K 13/00* (2013.01); *F01K 13/02* (2013.01); *F02B 63/04* (2013.01); *F02D 25/00* (2013.01); *F02D 29/06* (2013.01); *Y02E 20/14* (2013.01)

(58) Field of Classification Search
CPC ........... F02G 5/00; F01K 13/00; F01K 13/02; F02B 63/04; F02D 29/06

USPC ......................................................... 700/288
See application file for complete search history.

(56) References Cited

U.S. PATENT DOCUMENTS 4,802,100 A 1/1989 Aasen et al.
5,159,562 A 10/1992 Putman et al.
(Continued)

FOREIGN PATENT DOCUMENTS

WO WO 2011/069263 A1 6/2011

OTHER PUBLICATIONS

International search report and written opinion dated Jun. 14, 2013 for PCT/US2013/032680.
(Continued)

*Primary Examiner* — Michael D Masinick
(74) *Attorney, Agent, or Firm* — Wilson Sonsini Goodrich & Rosati

(57) ABSTRACT

The invention provides systems and methods for a network of cogenerations systems. In some cases, each system includes at least one cogeneration plant and at least one host facility, where the systems in the network are under the control of a common control system that optimizes a result for the network as a whole. In some cases, each cogeneration system in the network has an individual profile that is used by the control system for controlling that individual cogeneration system. In some cases, one or more of the cogeneration plants is assembled from a set of at least two modular transportable units where the modular units contain sensors that are configured to be ready for transmission of inputs to the common control system with little or no modification when the units are assembled into the final cogeneration plant and actuators or actuator systems that are configured to be ready for reception of outputs from the common control system with little or no modification when the units are assembled into the cogeneration plant.

23 Claims, 10 Drawing Sheets

Related U.S. Application Data filed on Mar. 23, 2012, provisional application No. 61/685,765, filed on Mar. 23, 2012, provisional application No. 61/685,740, filed on Mar. 23, 2012, provisional application No. 61/667,848, filed on Jul. 3, 2012, provisional application No. 61/667,832, filed on Jul. 3, 2012.

(51) Int. Cl.
  *F02D 25/00* (2006.01)
  *F02B 63/04* (2006.01)
  *F01K 13/00* (2006.01)
  *F01K 13/02* (2006.01)
  *F02D 29/06* (2006.01)

(56) References Cited

U.S. PATENT DOCUMENTS

| | | | |
|---|---|---|---|
| 5,432,710 A | 7/1995 | Ishimaru et al. | |
| 5,517,822 A | 5/1996 | Haws et al. | |
| 5,536,976 A | 7/1996 | Churchill | |
| 5,751,604 A | 5/1998 | Yamauchi | |
| 5,794,446 A | 8/1998 | Earley et al. | |
| 5,896,738 A | 4/1999 | Yang et al. | |
| 5,916,251 A | 6/1999 | Sibik | |
| 6,047,547 A | 4/2000 | Heaf | |
| 6,050,083 A | 4/2000 | Meckler | |
| 6,209,330 B1 | 4/2001 | Timmerman et al. | |
| 6,240,718 B1 | 6/2001 | Fetescu | |
| 6,250,080 B1 | 6/2001 | Shelor et al. | |
| 6,317,638 B1 | 11/2001 | Schreder et al. | |
| 6,422,018 B1 | 7/2002 | Tisdale et al. | |
| 6,584,793 B2 | 7/2003 | Fukushima et al. | |
| 6,591,225 B1 | 7/2003 | Adelman et al. | |
| 6,606,848 B1 | 8/2003 | Rollins, III | |
| 6,651,443 B1 | 11/2003 | Meckler | |
| 6,757,591 B2 | 6/2004 | Kramer | |
| 6,765,304 B2 | 7/2004 | Baten et al. | |
| 6,785,633 B2 | 8/2004 | Patanian et al. | |
| 6,838,781 B2 | 1/2005 | van de Loo | |
| 6,848,267 B2 | 2/2005 | Pierson | |
| 6,871,504 B2 | 3/2005 | Kuroki et al. | |
| 6,933,627 B2 * | 8/2005 | Wilhelm | 307/66 |
| 6,966,185 B2 | 11/2005 | Shimada et al. | |
| 6,988,024 B2 | 1/2006 | Funakura et al. | |
| 7,040,544 B2 | 5/2006 | Guyer | |
| 7,043,924 B2 | 5/2006 | Kuroki et al. | |
| 7,081,682 B2 | 7/2006 | Campion | |
| 7,124,586 B2 | 10/2006 | Negre et al. | |
| 7,127,896 B2 | 10/2006 | Shimada et al. | |
| 7,143,009 B2 | 11/2006 | Patanian | |
| 7,143,585 B2 | 12/2006 | Kuroki et al. | |
| 7,170,191 B2 | 1/2007 | Kang et al. | |
| 7,174,727 B2 | 2/2007 | Kim et al. | |
| 7,221,061 B2 | 5/2007 | Alger et al. | |
| 7,275,382 B2 | 10/2007 | Cho et al. | |
| 7,305,841 B2 | 12/2007 | Ryu et al. | |
| 7,350,365 B2 | 4/2008 | Kim et al. | |
| 7,356,383 B2 | 4/2008 | Pechtl et al. | |
| 7,459,799 B2 | 12/2008 | Aldridge et al. | |
| 7,466,034 B2 | 12/2008 | Kang et al. | |
| 7,567,859 B2 | 7/2009 | Subramanian et al. | |
| 7,600,695 B2 | 10/2009 | Kang et al. | |
| 7,615,878 B2 | 11/2009 | Shimizu et al. | |
| 7,629,701 B2 | 12/2009 | Campanile et al. | |
| 7,690,202 B2 | 4/2010 | Badeer et al. | |
| 7,718,290 B2 | 5/2010 | Ueda et al. | |
| 7,930,882 B2 | 4/2011 | Yuri | |
| 7,974,826 B2 | 7/2011 | Davari et al. | |
| 7,991,512 B2 | 8/2011 | Chandra et al. | |
| 8,035,239 B2 | 10/2011 | Horie et al. | |
| 8,065,040 B2 | 11/2011 | Kamat et al. | |
| 8,886,361 B1 * | 11/2014 | Harmon et al. | 700/291 |
| 2002/0035495 A1 | 3/2002 | Spira et al. | |
| 2003/0236593 A1 | 12/2003 | Schumacher | |
| 2004/0007879 A1 | 1/2004 | Ruggieri et al. | |
| 2005/0103032 A1 | 5/2005 | Pierson | |
| 2005/0206167 A1 * | 9/2005 | Gehret, Jr. | 290/2 |
| 2006/0116789 A1 | 6/2006 | Subramanian et al. | |
| 2007/0168174 A1 * | 7/2007 | Davari et al. | 703/18 |
| 2007/0204623 A1 | 9/2007 | Rollins, III | |
| 2007/0261421 A1 | 11/2007 | Pierson | |
| 2008/0018109 A1 | 1/2008 | Campanile et al. | |
| 2008/0034727 A1 | 2/2008 | Sutikno | |
| 2009/0062969 A1 | 3/2009 | Chandra et al. | |
| 2009/0145126 A1 | 6/2009 | Chillar et al. | |
| 2009/0276061 A1 * | 11/2009 | Sheth et al. | 700/29 |
| 2011/0088399 A1 | 4/2011 | Briesch et al. | |
| 2013/0239573 A1 * | 9/2013 | Brighenti et al. | 60/643 |
| 2014/0039707 A1 | 2/2014 | Curtis et al. | |
| 2014/0039708 A1 * | 2/2014 | Curtis et al. | 700/288 |

OTHER PUBLICATIONS

Office action dated Nov. 10, 2015 for U.S. Appl. No. 13/840,774.
Notice of allowance dated May 20, 2016 for U.S. Appl. No. 13/840,774.
US 6,105,361, 08/2000, Fetescu (withdrawn)

* cited by examiner

| Process Sensor (Subsystem Input) | Process Sensor (Subsystem Output) | Performance Indicators (Calculated Value) |
|---|---|---|

N.G Compressor
- Natural Gas Flowrate
- Natural Gas Inlet Pressure
- Natural Gas Inlet Temperature
- Compressor Power Input

- Natural Gas Outlet Pressure
- Natural Gas Outlet Temperature
- Natural Gas Flowrate

- Compressor Efficiency

Precooler
- Inlet Air Flowrate
- Inlet Air Temperature
- Inlet Air Pressure
- Inlet Cooling Fluid Flowrate
- Inlet Cooling Fluid Temperature
- Inlet Cooling Fluid Pressure

- Outlet Air Flowrate
- Outlet Air Temperature
- Outlet Air Pressure
- Outlet Cooling Fluid Flowrate
- Outlet Cooling Fluid Temperature
- Outlet Cooling Fluid Pressure

- Heat Removed from Air
- Heat Added to Cooling Fluid
- Heat Transfer Rate

Turbine/Generator Set
- Inlet Air Flowrate
- Inlet Air Temperature
- Inlet Air Pressure
- Natural Gas Flowrate

- % Load
- Generator Power Output
- Exhaust Flowrate
- Exhaust Temperature
- Exhaust Pressure

- Energy Input (Natural Gas)
- Energy Output (Exhaust)
- Turbine Efficiency
- Heat Rate

HRSG
- Inlet Exhaust Air Flowrate
- Inlet Exhaust Air Temperature
- Inlet Exhaust Air Pressure
- Inlet Natural Gas Flowrate
- Inlet Water Flowrate
- Inlet Water Temperature
- Inlet Ammonia Flowrate

- Steam Flowrate
- Steam Pressure
- Steam Temperature
- Outlet Exhaust Flowrate
- Outlet Exhaust Temperature
- Outlet Exhaust Pressure
- Outlet Exhaust Emissions ($NO_x$, $NH_3$, $CO$, $CO_2$, $SO_x$, $O_2$)

- Energy Output in Exhaust
- Energy Output in Steam
- Energy input from Turbine Exhaust
- Energy input from Gas
- Energy input from Ammonia
- Boiler Efficiency
- Heat Rate

*FIG. 7*

Chiller
- Steam Flowrate
- Steam Temperature
- Steam Pressure
- Inlet Condenser Temperature
- Inlet Condenser Water Flowrate
- Inlet Condenser Water Pressure
- Return Cooling Fluid Temp
- Return Cooling Fluid Pressure
- Return Cooling Fluid Flowrate

- % Load
- Outlet Condenser Temperature
- Outlet Condenser Water Flowrate
- Outlet Condenser Water Pressure
- Steam Condensate Temperature
- Steam Condensate Flowrate
- Outlet Cooling Fluid Temperature
- Outlet Cooling Fluid Pressure
- Outlet Glycol Flowrate

- COP/Chiller Efficiency
- Refrigeration Production
- Heat Input (from Steam)

TES
- Operational Mode (Build/Harvest)
- Inlet Cooling Fluid Temperature
- Inlet Cooling Fluid Flowrate

- Outlet Cooling Fluid Temperature
- Outlet Cooling Fluid Flowrate

- Refrigeration Storage In
- Refrigeration Storage Out

Cooling Tower
- Operational Mode (On/Off)
- Fan Speed
- Inlet Condenser Water Flowrate
- Inlet Condenser Water Temperature
- Water Make-up Flowrate
- Water Make-up Temperature
- Ambient Air Temperature
- Wet Bulb Temperature

- Blowdown Flowrate
- Blowdown Conductivity
- Outlet Condenser Water Flowrate
- Outlet Condenser Water Temperature
- Outlet Condenser Water Pressure
- Power Input

- Cooling Tower Efficiency
- Electrical Efficiency (Cooling/Power Input)

Cooling Fluid Distribution System
- Supply Cooling Fluid Flowrate
- Supply Cooling Fluid Temperature
- Supply Cooling Fluid Pressure
- Power Input

- Return Cooling Fluid Flowrate
- Return Cooling Fluid Temperature
- Return Cooling Fluid Pressure Note: Controlled Variables Shown in Bold. Not all of these variables can be controlled simultaneously

*FIG. 7*
*(Continued)*

NETWORKS OF COGENERATION SYSTEMS

CROSS-REFERENCE

This application claims the benefit of U.S. Provisional Applications No. 61/685,738, filed Mar. 23, 2012, No. 61/685,737, filed Mar. 23, 2012, No. 61/685,765, filed Mar. 23, 2012, No. 61/685,740, filed Mar. 23, 2012, Nos. 61/667,848, filed Jul. 3, 2012, and 61/667,832, filed Jul. 3, 2012, all of which applications are incorporated herein by reference.

BACKGROUND OF THE INVENTION

Cogeneration plants provide an economical and efficient source of electrical power and thermal energy to associated host facilities. There is a need for systems and methods to optimize the deployment and performance of cogeneration plants.

SUMMARY OF THE INVENTION

Provided herein are methods, compositions, and apparatus related to power cogeneration.

An aspect of the invention provides a cogeneration system comprising (i) a cogeneration plant operably connected to a host facility that receives a thermal and/or mechanical work product and, optionally, electrical power from the cogeneration plant under an agreement with the cogeneration plant owner, wherein the cogeneration plant comprises a plurality of operably connected modular transportable units; and (ii) a control system operably connected to the cogeneration plant comprising (a) a receiver system for receiving inputs from a plurality of sources of input wherein the sources of input comprise input from sensors in one or more of the modular units, inputs from the host facility, and inputs from indicators of market and/or other external conditions, (b) a processor system operably connected to the receiver system, configured to process the inputs and determine outputs for modulating the activities of a plurality of actuators or actuator systems in one or more of the modular units to achieve a desired result in the operation of the cogeneration plant based on the inputs and on the agreement; and (c) a transmitter system operably connected to the processor system for transmitting the outputs to the actuators or actuator systems. In certain embodiments, the modular transportable units exist in a first form that is a transportable form and second form that is an assembled form, and the first form and the second form are substantially the same for at least two of the modular transportable units, and wherein the sensors and actuators do not require substantial modification to convert from the transportable form to the assembled form. In certain embodiments, the sensors comprise at least 2 sensors for sensing inputs selected from the group consisting of a HRSG exhaust temperature, a steam flow rate, a generator output, an exhaust temperature, a thermal product carrier outlet temperature, a thermal product carrier inlet temperature, a thermal product carrier outlet flow rate, a thermal product carrier inlet flow rate, and/or at least one of a NOx, NH3, SOx, CO, CO2, particulate, and O2 emission. In certain embodiments, the receiver is configured to further receive at least 2 inputs indicating at least two environmental conditions at or near the cogeneration plant, wherein the environmental conditions are selected from the group consisting of temperature, humidity, wind speed, wind direction, time of day, and air pressure. In certain embodiments, the receiver is configured to further receive input indicating a desired future modulation in the conditions of the host facility, wherein the input is inputted from an interface for interaction between the system and an operator of the host facility. In certain embodiments, the receiver is further configured to receive at least 2 inputs indicating a market condition wherein the market conditions are selected from the group consisting of a price for a fuel for the cogeneration plant, a price for electrical energy exported from the cogeneration plant, a price for imported electrical energy to the cogeneration plant, a price for an incentive for the cogeneration plant, a price for a demand response action, a price for a thermal product produced by the cogeneration plant, a price for water, and a price for a variable maintenance price. In certain embodiments, the inputs from the host facility comprise an electrical energy demand, a thermal product demand, a thermal product carrier flow rate, an air temperature, a thermal product carrier temperature, a fan rate, a humidity, a set point for an air temperature, a set point for a thermal product carrier temperature, or any combination thereof. In certain embodiments, the processing of step (ii)(b) comprises a forecast step comprising forecasting a future value or range of values or a probability of a future value or range of values for one or more conditions selected from the group consisting of a fuel price, an electricity export price, an electricity import price, an ambient environmental condition, an emissions limit, an incentive for the cogeneration plant, a price for a demand response action, a price for a thermal product, a price for mechanical work product, a price for water, an electrical demand from the host facility, a thermal product demand from the host facility, and a mechanical product demand from the host facility. In certain embodiments, the control system further comprises a data storage unit for storing a timing and/or a value for a result that occurs after the change in the one or more outputs, and wherein the control system is configured to adjust the processing step based on one or more of the results stored in the data storage unit. In certain embodiments, the actuators comprise at least 2 actuators selected from the group consisting of an actuator or actuator system for controlling a pre-cooler, an actuator or actuator system for controlling a turbine, an actuator or actuator system for controlling a heat recovery steam generator, an actuator or actuator system for controlling a thermal product carrier producer, an actuator or actuator system for controlling a mechanical work product carrier producer, an actuator or actuator system for controlling a cooling tower, an actuator or actuator system for controlling one or more distribution pumps, and, an actuator or actuator system for controlling a thermal energy storage product producer. In certain embodiments, the control system is at least partially Web-based. In certain embodiments, the invention provides a cogeneration network comprising a plurality of cogeneration systems of any of the previous embodiments. In certain embodiments, the modular units comprise two or more of the following (i) a gas turbine module; (ii) a heat recovery steam generation (HRSG) module; (iii) a refrigeration module; (iv) a balance of plant module; (v) a cooling tower module; (vi) a stack module.

In another aspect, the invention provides a method for achieving a desired result during a time period for a modular cogeneration plant comprising (i) receiving inputs from (a) a cogeneration plant, wherein the cogeneration plant comprises a plurality of modular transportable units; (b) a first facility to which the cogeneration plant is obligated to provide electrical power under a first agreement and a second facility to which the cogeneration plant is obligated to provide a thermal product under a second agreement and, optionally, a third facility under which the cogeneration plant is obligated to provide a mechanical work product under a third agreement, (c) indicators of expenses or potential expenses for the cogeneration plant, and (d) indicators of revenues or potential revenues for the cogeneration plant; (ii) determining an output to modulate the activity of an actuator in the cogeneration plant, the first facility, the second facility, the third facility, or any combination thereof, based on the inputs and on the first agreement and the second agreement and the third agreement, wherein the output is determined to achieve a desired result in the time period for the operation of the cogeneration plant; and (iii) transmitting the output to the actuator or actuator system to modulate the activity of the actuator or actuator to approach the desired result; whereby the desired result for the cogeneration plant in the time period is achieved. In certain embodiments, the inputs from the cogeneration plant are from sensors in the modular transportable units of the cogeneration plant, wherein the modular transportable units exist in a transportable form and in an assembled form, and wherein the sensors are configured to be fully operational in the assembled form with no substantial modification from the transportable form. In certain embodiments, the output is an output to an actuator or actuator system in a modular transportable unit of the cogeneration plant, wherein the modular transportable units exist in a transportable form and in an assembled form, and wherein the actuator or actuator system is configured to be fully operational in the assembled form with no substantial modification from the transportable form. In certain embodiments, the inputs further comprise environmental data comprises ambient temperature, absolute pressure, relative pressure, precipitation, humidity, wind, time of day, or any combination thereof. In certain embodiments, at least two of the first facility, the second facility, and the third facility are the same facility. In certain embodiments, the facility is a refrigerated facility, a food and/or beverage processing facility, a university, a pharmaceutical facility, an oil and/or gas production facility, an EOR facility, a LNG facility, a process industry facility such as a refining facility, an ethanol facility, or a chemicals facility, a commercial building, a hospital, a waste water treatment facility, a landfill, or any combination thereof. In certain embodiments, the desired result is an optimum profit the cogeneration facility. In certain embodiments, the optimum profit is the profit that contributes to maximizing a total profit for a network comprising a plurality of cogeneration plants, wherein the cogeneration plant is part of the network. In certain embodiments, the determining of step (ii) is modulated or not modulated based on a result of a past determination for an output, or a plurality of results of a plurality of determinations for an output or a plurality of outputs. In certain embodiments, the determining of step (ii) is modulated or not modulated based on an input or plurality of inputs from an operator of the first facility or the second facility. In certain embodiments, the input from the first facility comprises information about one or more aspects of a process electric load. In certain embodiments, the input from the second facility comprises one or more aspects of a process thermal load. In certain embodiments, the inputs further comprise environmental data selected from the group consisting of ambient temperature, absolute pressure, relative pressure, precipitation, humidity, wind, time of day, or any combination thereof. In certain embodiments, the actuator or actuator systems to which the output is transmitted, comprises one or more actuators or actuator systems that control one or more of (i) a temperature within the cogeneration plant, the first facility, the second facility, or the third facility, (ii) a pressure within the cogeneration plant, the first facility, the second facility, or the third facility, (iii) a flow of a raw material (iv) an exhaust flow (v) a waste flow (vi) a thermal product carrier flow (vii) an electrical power flow (viii) a utility input, (ix) a supply input, (x) a state of operation of a first thermal product carrier producer, for example a refrigeration unit, (xi) a state of operation of a second thermal product carrier producer, for example a second refrigeration unit, (xii) a state of operation of a turbine, (xiii) a state of operation of a turbine precooler, (xiv) a state of operation of a duct burner (xv) a state of operation of a mechanical work product producer or (xvi) any combination thereof. In certain embodiments, at least part of the determining of step (ii) is performed at a location that is remote from the cogeneration plant, the first facility, the second facility, and the third facility, wherein the location is at least 5 miles from any of the cogeneration plant, the first facility, the second facility, or the third facility. In certain embodiments, the input is received, the output is sent, or both, via an Internet connection.

In yet another aspect, the invention provides a cogeneration system comprising a cogeneration plant that is operably connected to a host facility to which the cogeneration plant provides a thermal and/or mechanical work product and electrical power at a host site under an agreement, wherein the cogeneration plant comprises (i) a set of operably connected modular transportable units that comprises (a) a first modular transportable unit comprising a natural gas-fired turbine generator with a maximum power output of between 1 and 40 MW, (b) a second modular transportable unit comprising a HRSG for utilizing the exhaust gases of the turbine to generate steam and further comprising an emissions control unit to control NOx emissions, operably connected to the turbine, and (c) a third transportable unit comprising an exhaust stack unit with integrated emissions monitoring for NOx, operably connected to the HRSG; wherein the modular transportable units exist in a transportable form that is suitable for transport on an ordinary roadway and in an assembled form that is fixed at the host site, and wherein the first, second, and third modular transportable units each comprise at least one sensor and at least one actuator or actuator system, wherein the sensors are configured to transmit inputs to a control system for controlling the cogeneration plant and the actuators are configured to receive an output from the control system, with no substantial modification from their configurations in the transportable units to their configuration in the assembled units; and (ii) the control system comprises (a) a receiver system that receives inputs from the sensors in the modular units, signals from sensors in the host facility, signals from ambient environmental sensors, inputs from markets for natural gas, inputs from power markets, inputs from forecast systems that comprise a weather forecast system and a price forecast system, and inputs from an interface through which the operator of the host facility may enter changes in upcoming conditions at the host facility; (b) a processing system operably connected to the receiver system for processing the inputs and determining outputs for modulating the activities of a plurality of actuators or actuator systems in one or more of the modular units, wherein the plurality of actuators or actuator systems comprises the actuator or actuator systems in the first, second, and third modular transportable units, to achieve a desired result in the operation of the cogeneration plant based on the inputs and on the agreement; and (c) a transmitter system operably connected to the processor system for transmitting the outputs to the actuators or actuator systems; wherein the control system is at least partially Web-based and is configured to learn from an outcome of one or more previous outputs and adjust the determining of future outputs based on the learning, or on an override of an output or a plurality of overrides of outputs by an operator of the host facility, or a combination thereof. In certain embodiments, the cogeneration plant further comprises a forth modular transportable unit comprising a steam-driven compression refrigeration unit, operably connected to the HRSG. In certain embodiments, the system further comprises a fifth modular transportable unit comprising a cooling tower, operably connected to the refrigeration unit.

In a further aspect, the invention provides a method of manufacturing a modular cogeneration plant comprising (i) transporting a set comprising a plurality of modular transportable units to a host site comprising a host facility that requires a thermal product and/or a mechanical work product and, optionally, electrical power from the cogeneration plant, wherein (a) each of the modular transportable units contains one or more components, or parts of one or more components, of the cogeneration plant, and the components comprise a generator, a heat transfer unit, an air intake unit, and an exhaust unit; (b) the modular transportable units exist in a transportable form and an assembled form; and (c) at least two of the modular transportable units comprise at least one sensor and at least one actuator or actuator system, wherein the sensors are configured to transmit inputs to a control system for controlling the cogeneration plant and the actuators are configured to receive an output from the control system, with no substantial modification from their configurations in the transportable units to their configuration in the assembled units; and (ii) assembling the modules into a complete cogeneration plant wherein the modules are operably connected to provide a functioning cogeneration plant under the control of the control system, wherein the cogeneration plant is configured to provide the thermal product and/or mechanical work product and, optionally, electrical power to the host facility under an agreement between a provider of the cogeneration plant and a provider of the host facility. In certain embodiments, the control system is further configured to receive inputs from the host facility and from external sources and to determine outputs for the actuators to achieve a desired result for the operation of the cogeneration plant over a period of time based on the inputs from the sensors, the host facility, and the external sources, and on the agreement. In certain embodiments, the set of modular transportable units comprises at least 2 modular transportable units, wherein the modular transportable units are selected from the group consisting of a first module comprising an electrical generator; a second module comprising a heat recovery steam generator (HRSG); a third module comprising an exhaust stack; a fourth module comprising a component of a cooling tower; a fifth module comprising one or more pumps; a sixth module comprising a thermal product carrier producer and, optionally, a seventh module comprising a mechanical work product producer; wherein at least one of the modules is different from at least one of the other modules In certain embodiments, the modular transportable units comprise a total of at least 5 sensors to transmit inputs to the control system, wherein the sensors are configured to transmit the inputs with no substantial modification from their configurations in the transportable units to their configurations in the assembled units and wherein the sensors comprise sensors for a temperature, one or more sensors for a pressure, one or more sensors for a volume, one or more sensors for a first or a second state of one or more units that can exist in the first or the second state, one or more sensors for a power generation level, one or more electrical sensors, one or more acoustical sensors, one or more optical sensors, one or more chemical detection sensors, one or more pH sensors, one or more electrical potential sensors, or one or more current sensors, or any combination thereof. In certain embodiments, the control system is further configured to receive an input from the host facility comprising an electrical energy demand, a thermal product demand, a thermal product carrier flow rate, an air temperature, a thermal product carrier temperature, a mechanical work product demand, a mechanical work product carrier flow rate, a fan rate, a humidity, a set point for an air temperature within the host facility, or a set point for a thermal product carrier temperature, or any combination thereof. In certain embodiments, the control system is further configured to receive inputs from external sources. In certain embodiments, the external sources comprise sources of information about one or more market conditions comprising information of a price for a fuel for the cogeneration plant, a price for electrical energy exported from the cogeneration plant, a price for imported electrical energy to the cogeneration plant, a price for an incentive for the cogeneration plants, a price for a thermal and/or mechanical work product produced by the cogeneration plant, a price for water for the cogeneration plant, and/or a price for a variable maintenance contract for the cogeneration plant, or any combination thereof. In certain embodiments, the external sources comprise sources of information about environmental conditions comprising one or more of a temperature, a humidity, a wind speed, a wind direction, a time of day, a day of the year, or an air pressure, or any combination thereof. In certain embodiments, the receiver is configured to further receive input indicating a desired future modulation in the conditions of the host facility, wherein the input is inputted from an interface for interaction between the system and an operator of the host facility. In certain embodiments, the control system is configured to determine a change or no change for one or more of the outputs for one or more of the actuators based at least in part on a forecast step. In certain embodiments, the control system is configured to determine a forecast step, wherein the forecast step forecasts a future value or range of values, or a probability of a future value or range of values, for a fuel price, an electricity export price, an electricity import price, an ambient environmental condition, an emissions limit, an incentive for the cogeneration plant, a price for a thermal product, a price for water, an electrical demand from the host facility, a thermal product demand from the host facility, or a combination thereof. In certain embodiments, the control system is configured to adjust the determining of a change or no change in the one or more outputs on one or more of outcomes from one or more past outputs to the cogeneration plant. In certain embodiments, the actuators or actuator systems comprise 1, 2, 3, 4, 5, 6, or 7 of an actuator or actuator system for controlling a pre-cooler, an actuator or actuator system for controlling an electrical generator, e.g., a turbine, an actuator or actuator system for controlling a heat recovery steam generator, an actuator or actuator system for controlling a thermal product carrier producer, an actuator or actuator system for controlling a cooling tower, an actuator or actuator system for controlling one or more distribution pumps, and, optionally, an actuator or actuator system for controlling a thermal energy storage product producer. In certain embodiments, the control system is at least partially Web-based.

Another aspect of the invention relates to a cogeneration network comprising (i) a plurality of cogeneration systems, wherein each cogeneration system comprises a cogeneration plant operably connected to a host facility that receives a thermal product and/or mechanical work product and, optionally, electrical power from the cogeneration plant, and wherein at least one of the cogeneration plants comprises a plurality of operably connected modular transportable units; and (ii) a common controller for optimizing the operation of the cogeneration network that is operably connected to the plurality of cogeneration systems wherein the common controller (a) receives inputs from a plurality of sensors in or near each of the plurality of cogeneration systems; (b) processes the inputs to determine a plurality of outputs, and (c) transmits the outputs to a plurality of actuators in the plurality of cogeneration systems, whereby the operation of the network of cogeneration systems is optimized. In certain embodiments, the network comprises at least 2 cogeneration systems wherein at least one of the cogeneration systems comprises a plurality of operably connected modular transportable units. In certain embodiments, the sensors comprise sensors in the cogeneration plants, sensors in the host facilities, sensors for the environment at or near one or more of the cogeneration plants and/or host facilities, or sensors for operable connections between one or more of the cogeneration plants and it host facility, or any combination thereof. In certain embodiments, the sensors for the environment at or near one or more of the cogeneration plants comprise sensors for temperature, humidity, wind speed, wind direction, time of day, day of the year, air pressure, or any combination thereof. In certain embodiments, the common controller further receives input from one or more of the host facilities in one or more of the cogeneration systems, wherein the input comprises an electrical energy demand, a thermal product demand, a thermal product carrier flow rate, an air temperature, a thermal product carrier temperature, a fan rate, a humidity, a set point for an air temperature, a set point for a thermal product carrier temperature, or any combination thereof. In certain embodiments, the common controller further receives inputs from indicators of market conditions. In certain embodiments, the inputs of market conditions comprise inputs for local markets at the one or more cogeneration systems. In certain embodiments, the market conditions comprise 2 prices for a fuel for at least 2 of the cogeneration plants, 2 prices for electrical energy exported from for at least 2 of the cogeneration plants, 2 prices for imported electrical energy to at least 2 of the cogeneration plants, 2 prices for an incentive for at least 2 of the cogeneration plants, 2 prices for a thermal product produced by for at least 2 of the cogeneration plants, 2 prices for water for at least 2 of the cogeneration plants, or 2 prices for a variable maintenance price for at least 2 of the cogeneration plants, or any combination thereof. In certain embodiments, the common controller receives inputs from at least 10 sensors, wherein the sensors are located in at least 2 cogeneration systems. In certain embodiments, the modular transportable units exist in a first form that is a transportable form and second form that is an assembled form, and wherein the first form and the second form are substantially similar for at least two of the modular transportable units. In certain embodiments, the common controller further receives input indicating a desired future modulation in a condition of at least 1 host facility wherein the input indicating the desired future modulation is inputted from an interface for interaction between the system and an operator of the host facility. In certain embodiments, the sensors in one or more of the cogeneration systems comprise 2 or more sensors for sensing 2 or more of a boiler exhaust temperature, a steam flow rate, a generator output, an exhaust temperature, a thermal product carrier outlet temperature, a thermal product carrier inlet temperature, a thermal product carrier outlet flow rate, a thermal product carrier inlet flow rate, or at least one of a NOx, NH3, SOx, CO, CO2, particulates, or O2 emission; or any combination thereof. In certain embodiments, the modular transportable units of one of the cogeneration plants comprise at least 2 of a modular transportable unit comprising an electrical generator, a modular transportable unit comprising part or all of a heat recovery steam generator (HRSG), a modular transportable unit comprising part or all of a thermal product carrier producer, a modular transportable unit comprising part or all of a cooling tower, a modular transportable unit comprising part or all an exhaust stack, or a modular transportable unit comprising part or all a an air intake unit, or any combination thereof. In certain embodiments, the controller is configured so that the processing of step (ii)(b) may comprise a forecast step. In certain embodiments, the forecast step forecasts a future value or range of values, or a probability of a future value or range of values, for a fuel price, an electricity export price, an electricity import price, an ambient environmental condition, an emissions limit, an incentive for the cogeneration plant, a price for a demand response action, a price for a thermal product, a price for water, an electrical demand from a host facility, a thermal product demand from a host facility, wherein the future value or range of future values, or probability of a future value or range of future values, is a value or range of values or probability of a value or range of values for at least one of the cogeneration systems. In certain embodiments, the future value or range of values, or probability thereof, is a value or range of values, or probability thereof for at least 2 of the cogeneration systems. In certain embodiments, the controller is configured so that the processing step may comprise determining a change in one or more set points for one or more the actuators based at least in part on one or more of the forecast values or range of values. In certain embodiments, the common controller further comprises a data storage unit for storing a value for a timing and/or result that occurs after the change in the one or more set points. In certain embodiments, the controller is configured to adjust the processing step based on one or more of the results of a previous output, such as a result stored in the data storage unit, to improve the function of the network in the future. In certain embodiments, the optimization of the operation of the network optimizes the profit of the network over a desired time period. In certain embodiments, the optimization of the operation of the network optimizes an energy efficiency of the network over a desired time period. In certain embodiments, the actuators in a cogeneration plant of the system comprise an actuator or actuator system for controlling a pre-cooler, an actuator or actuator system for controlling a turbine, an actuator or actuator system for controlling a heat recovery steam generator, an actuator or actuator system for controlling a thermal product carrier producer, an actuator or actuator system for controlling a mechanical work product carrier producer, an actuator or actuator system for controlling a cooling tower, an actuator or actuator system for controlling one or more distribution pumps, or optionally, an actuator or actuator system for controlling a thermal energy storage product producer, or any combination thereof. In certain embodiments, the controller is configured to transmit outputs to at least 6 actuators spread over at least 2 cogeneration systems. In certain embodiments, the controller comprises a subcontroller for utilizing a thermal product carrier distribution system as a thermal storage system in at least one of the host facilities to both distribute a thermal product carrier and to store thermal energy. In certain embodiments, the common controller is at least partially Web-based. In certain embodiments, the controller is configured to update software, control logic, business logic, and/or algorithms remotely. In certain embodiments, the common controller is configured to implement network diagnostics for optimizing scheduling and/or management of planned and/or unplanned maintenance. In certain embodiments, the controller controls management of spare parts across standardized modular plants within the network.

In another aspect, the invention provides a system comprising (i) a first cogeneration plant that produces electrical power and a first thermal product and/or a first mechanical work product, operably connected to a first facility that utilizes at least a portion of the electrical power from the first cogeneration plant and to a second facility that utilizes at least a portion of the first thermal product and/or the first mechanical work product, wherein the first facility and the second facility may be the same or different; (ii) a second cogeneration plant that produces electrical power and a second thermal product and/or a second mechanical work product, operably connected to a third facility that utilizes at least a portion of the electrical power from the second cogeneration plant and to a fourth facility that utilizes at least a portion of the second thermal product and/or second mechanical work product, wherein the third facility and the fourth facility may be the same or different; and (iii) a control system operably connected to the first and second cogeneration plants and the first, second, third, and fourth facilities, wherein the control system is configured to (a) receive inputs from the first and second cogeneration plants, the first, second, third, and fourth facilities, and indicators of expenses or potential expenses for the first and second cogeneration plants, indicators of revenues or potential revenues for the first and second cogeneration plants, or for any combination thereof; (b) calculate a setpoint for an actuator or actuator system in the first cogeneration plant, the second cogeneration plant, the first facility, the second facility, the third facility, or the fourth facility, or any combination thereof, wherein the setpoint is based on the inputs, and is calculated to optimize a result for the first and second cogeneration plants in a time period; and (c) if the setpoint calculated in (ii) is different from the current setpoint for the actuator or actuator system, send output to the controller to modulate the activity of the actuator or actuator system to approach the setpoint. In certain embodiments, the desired result is an optimized profit for the first and second cogeneration plants. In certain embodiments, the desired result is an optimized energy efficiency for the first and second cogeneration plants.

In another aspect, the invention provides a network of cogeneration systems comprising a first cogeneration system and a second cogeneration system, wherein the first cogeneration system includes a first cogeneration plant that includes a plurality of modular transportable units that are operably connected and a first host facility that receives electric power, a thermal product, or a mechanical work product, or any combination thereof, from the first cogeneration plant under a first agreement, and the second cogeneration system includes a second cogeneration plant that includes a plurality of modular transportable units that are operably connected and a second host facility that receives electric power, a thermal product, or a mechanical work product, or any combination thereof, from the second cogeneration plant under a second agreement, and a common controller that comprises a receiving system configured to receive inputs from a plurality of sensors in a plurality of the modular transportable units in the first cogeneration plant and the second cogeneration plant, from the host facilities, and from external sources, a processing system configured to process the inputs to achieve an optimal operating result for the network while meeting an obligation in the first agreement and an obligation in the second agreement, and a transmitting system configured to transmit a plurality of outputs to a plurality of actuators or actuator systems in a plurality of the modular transportable units in the first cogeneration plant and the second cogeneration plant so as to achieve the optimal operating result for the network. In certain embodiments, the optimum result is an optimum profit for the network. In certain embodiments, the optimum result is an optimum energy efficiency for the network or part of the network. In certain embodiments, the modular transportable units exist in a first form that is a transportable form and second form that is an assembled form, and wherein the first form and the second form are substantially similar for at least two of the modular transportable units.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7 is an exemplary representation of plant sensor data points.

DETAILED DESCRIPTION OF THE INVENTION

Figure 1:
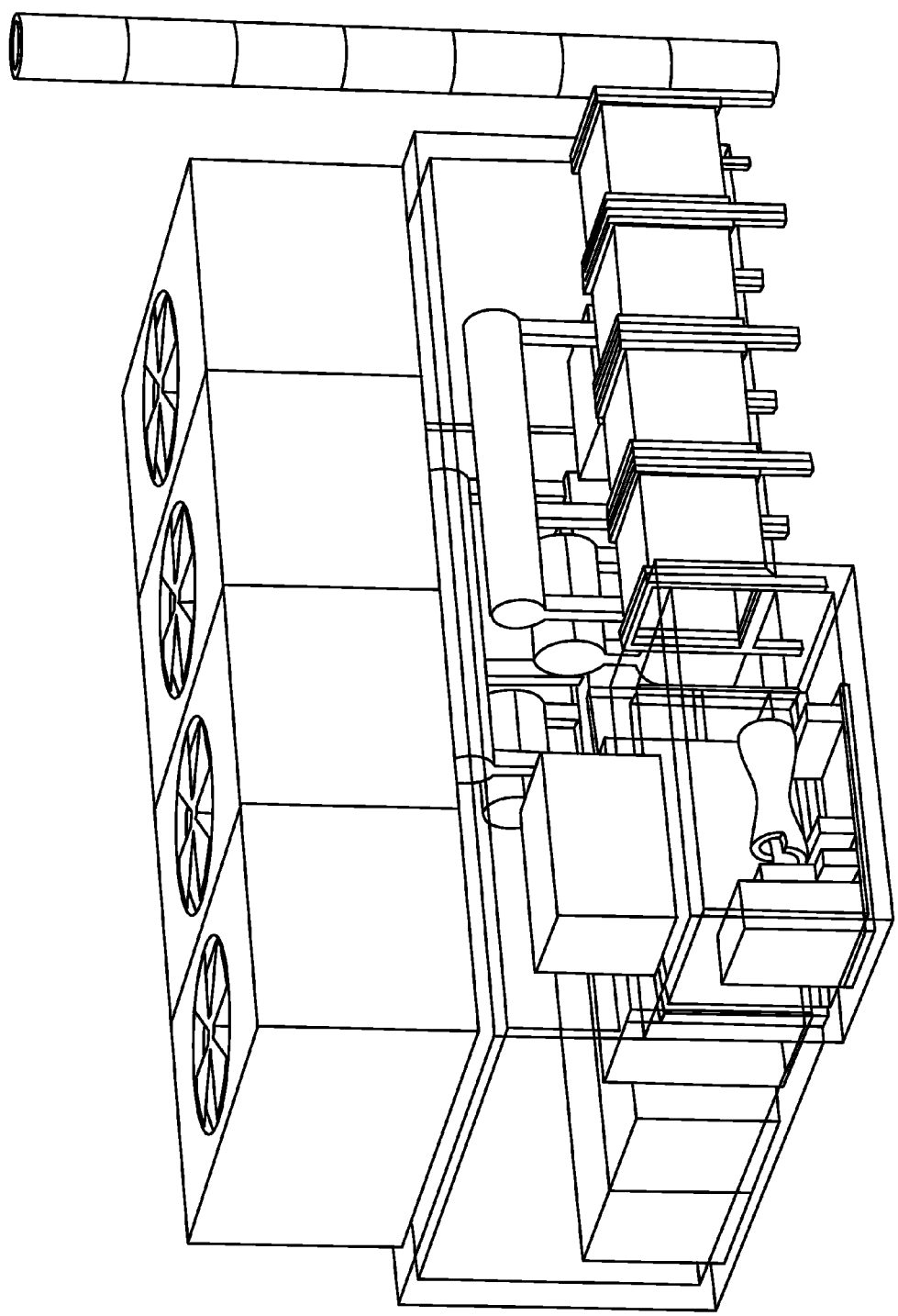
FIG. 1 is a representative view of an exemplary embodiment of a cogeneration plant assembled from modular transportable units.

The invention provides methods and systems related to cogeneration plants and systems, their manufacture, assembly, and use. Particular features of various embodiments of the invention include one or more of: systems and methods related to cogeneration plants with fully integrated controller for optimizing performance where the plant is assembled from modular transportable units; systems and methods for efficiently and rapidly meeting a particular customer need for such a unit; systems and methods related to networks of cogeneration systems under control of a common controller to optimize a performance and/or reliability of the network, where the cogeneration systems may include one or more cogeneration plants assembled from modular transportable units; systems and methods for optimizing a performance, e.g., a profit, or e.g. an energy efficiency, of a cogeneration plant or network of cogeneration plants; systems and methods to provide highly efficient cogeneration plants or systems where the plants or systems operate in an environment of varying electrical and/or thermal demand and/or mechanical work product demand; systems and methods for simultaneously distributing a thermal product carrier and storing thermal energy, systems and methods for simultaneously distributing a mechanical work product and storing mechanical energy, and the use of such systems and methods to improve the efficiency of a cogeneration plant or cogeneration system.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Unless otherwise indicated or apparent from context, percentages given herein are w/w. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

I. Cogeneration Plants and Host Facilities

The systems and methods of the invention are related to cogeneration plants that are connected to one or more host facilities at a host site. A cogeneration plant with its associated host facility or facilities to which it supplies electrical power and/or one or more thermal products and/or one or more mechanical work products is a cogeneration system. The cogeneration plant generates electric power and one or more thermal products, which is typically chilling or heating that is carried between the cogeneration plant and the facility by a heat transfer fluid such as a water product, e.g., hot water, steam, chilled water, or ice and/or one or more mechanical work products such as steam turbine driven compression. As referred to herein, "thermal product carrier" is used interchangeably with a "heat transfer fluid." Heat may be transferred to or from the heat transfer fluid in the cogeneration plant in a variety of ways that are known in the art. A unit that transfers heat to or from a heat transfer fluid is in some cases referred to as a "thermal product producer" or "thermal product carrier producer" herein. An example of such a unit is a refrigeration unit. In certain embodiments the cogeneration plant produces ice as a product, such as food grade ice. In certain embodiments, the cogeneration plant produces a mechanical work product, e.g., a compressed gas such as compressed air and/or a compressed refrigerant gas, for example, ammonia, that is supplied to one or more host facilities. In some of these embodiments the compressed gas, e.g., refrigerant gas, is used by the host facility in refrigeration units in the host facility. The mechanical work product producer may comprise one or more steam turbine driven gas compressors such as screw compressors or centrifugal compressors that produce a compressed gas. The compressed gase may be, e.g., a refrigerant such as ammonia and optionally ties in to an existing or new external refrigeration system at the host facility; for example, the cogeneration plant receives low pressure refrigerant gas from the host via a low pressure tie-in and returns high pressure refrigerant gas via a high pressure tie-in. The low pressure gas tie-in may be upstream of an existing electric motor driven compressor system and the high pressure gas tie-in may be downstream of the existing electric motor driven compressor system, and the resulting piping configuration may effectively bypass an existing compressor system. In such embodiments, the existing electric motor driven compressors may remain in place as peaking units and/or standby purposes.

The one or more host facilities may be any facility that is operably connected to the cogeneration facility and uses one or more of the produced electrical power and/or thermal and/or mechanical work product. In some cases a host facility will take only one or more thermal products from the cogeneration plant. In some cases a host facility will take only electrical power from a cogeneration plant. In some cases a host facility will take only mechanical work product from a cogeneration plant. In some cases a host facility will take both electrical power and one or more thermal and/or mechanical work products from the cogeneration plant. In some cases more than one host facility will take either electrical power, one or more thermal or mechanical work products, or any combination thereof, including electrical power, thermal product, and mechanical work product, from the cogeneration plant. It will be appreciated that a cogeneration plant can supply one, two, three, four, five, or more than five host facilities, and that each host facility may be supplied with some combination of one or more of electrical power, thermal product, and/or mechanical work product, and that the combination supplied to each host facility, or the quantity of each product in the combination, may vary with time. Exemplary host facilities include industrial plants, chemical plants, schools, hospitals, refrigerated facilities such agricultural facilities, and such as refrigerated warehouses, refineries, data centers, and other facilities well-known in the art, such as other facilities as described herein. In one embodiment, the host facility is an agricultural facility where agricultural products are kept chilled (refrigerated) after harvest, and other activities specific to the agricultural functions are performed, e.g., packaging for shipping, processing of agricultural products, and the like. The cogeneration plant may be under an agreement with the host facility or facilities to set the amount of electrical power and/or thermal product and/or mechanical work product that the cogeneration plant supplies to the host facility or facility under various conditions. The cogeneration plant often is also under an agreement with a utility to supply electrical power when it produces electrical power in excess of the requirement of its one or more host facilities. In some cases the cogeneration plant may also be under an agreement with one or more thermal product users to supply an excess thermal product, such as ice, for example, food grade ice, to the user, where the use is not a host facility and does not have an agreement with the cogeneration plant for a continuing supply of the thermal product. All of these relationships, and any other relationships with services or markets that the cogeneration plant has, such as maintenance, supply, supplies such as water or supplemental electrical power, are typically governed by either an agreement or by access to a market, or both.

A cogeneration plant generally includes a prime mover (eg, a gas turbine) with a generator (together, a power generator), or fuel cells, and a heat exchanger (also referred to as a heat transfer unit herein) for heat recovery. It can also include a thermal product carrier producer (sometimes referred to herein simply as a thermal product producer), such as thermally activated cooling system, for example a refrigeration unit. In some cases a cogeneration plant also includes a dehumidification system. The components are integrated into a single unit with electrical and mechanical connections. The type of power generator typically determines what type of thermally activated technologies can use the waste heat from the power generator. Cogeneration plants of embodiments of the invention may generate power using one or more microturbines, turbines, reciprocating engines, combustion turbines, back pressure steam turbines, condensing steam turbines, fuel cells, organic Rankine cycle units, solar thermal units, hybrid fossil/renewable units, or hybrid fossil/fossil units. In certain embodiments the power is generated in part or in whole in a turbine or turbines, such as one or more natural gas burning turbines operably connected to one or more electrical generators; in general a "turbine," as that term is used herein, refers to a turbine and its electrical generator, unless otherwise indicated. Although for convenience certain embodiments of the invention are described herein as using natural gas, any suitable gas may be used as a fuel for a turbine, such as natural gas, biogas, syngas, or other fuel gas. The excess thermal energy from the prime mover may be used in one or more components including a heat exchanger, a heat recovery steam generator (HRSG) a thermal product carrier producer such as a refrigeration unit, e.g. a steam-driven compression refrigeration unit or an absorption refrigeration unit, a mechanical work product producer such as a steam turbine driven compressor and the like, as are well-known in the art. Additional thermal energy may be supplied by one or more burners that augment the heat from the prime mover, e.g., one or more duct burners that supply heat to a HRSG by burning fuel from an auxiliary input, such as natural gas duct burners. Other components can include dehumidification components, which may use solid and/or liquid dessicant. In addition, cooling towers, exhaust stacks, and pumps are generally components of a cogeneration system. Fans may also be included.

Host facilities that may be supplied by a cogeneration plant or plants of the invention include, in addition to any facilities described herein, food and/or beverage processing facilities, universities, pharmaceutical facilities, oil and gas production facilities, e.g., offshore platforms, enhanced oil recovery facilities, liquefied natural gas facilities, process facilities, e.g., refining facilities, ethanol facilities, chemical facilities, commercial buildings, hospitals, waste water treatment plants, or landfills. In some cases the primary thermal product will be chilling, in some cases the primary thermal product will be heating, e.g., steam, and in some cases a mix of thermal products will be used, as will be apparent to those of skill in the art. In some cases, the mechanical work product will be compression of refrigerants for use in existing or external refrigeration units.

Figure 3:
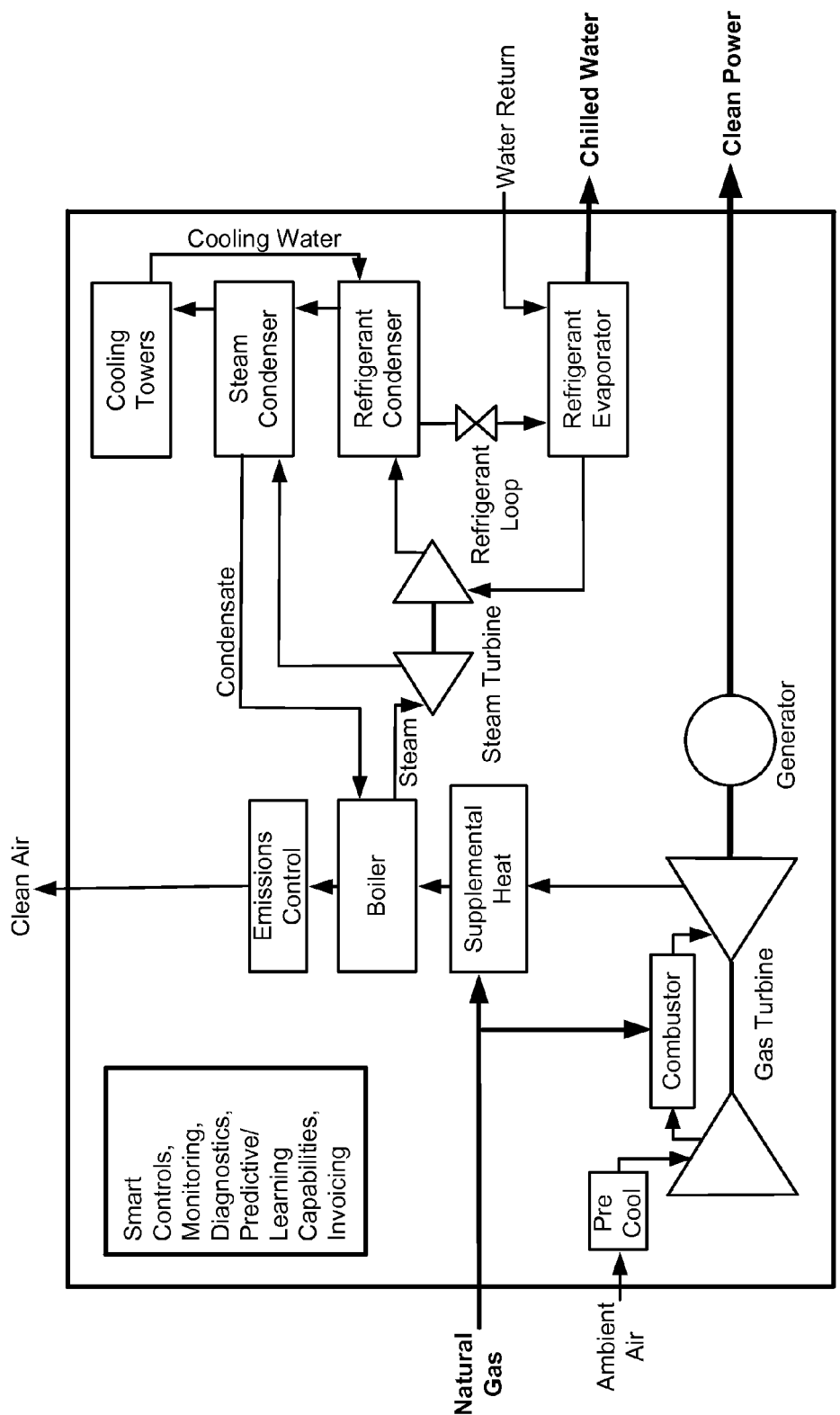
FIG. 3 is a schematic diagram of an exemplary cogeneration plant.

In certain embodiments of the invention, a cogeneration plant includes one or more gas turbine generators that generate electrical power, one or more HRSG units (e.g., HRSG), optionally with one or more duct burners that burn fuel gas to augment heat from the exhaust gases of the turbine, one or more refrigeration units, e.g., steam-driven compression refrigeration units, pumps, one or more exhaust stacks that may include emission monitoring equipment, one or more cooling towers, and one or more air intake units. Emissions control components may be present in one or more components of the plant in one or more of the modules, e.g. equipment for NOx control integrated into the HRSG unit. An exemplary embodiment is illustrated in FIG. 3, wherein a cogeneration plant includes a gas turbine and generator, a precooler for cooling ambient air supplied to the turbine, one or more sources of supplemental heat to supplement the heat from the exhaust of the turbine, one or more HRSGs, an emissions control system, a steam turbine, a refrigerant condenser, a refrigerant evaporator, a steam condenser, cooling towers, where the components are operably connected as shown in FIG. 3. A control system operably linked to the cogeneration plant may supply smart controls, monitoring, diagnostics, predictive and/or learning capabilities, and/or invoicing data.

II. Modularity

The cogeneration plants provided in various embodiments of the invention may be constructed partially or completely of modular transportable units that contain one or more of the components of the cogeneration plant. These modular transportable units, also referred to as modules or modular units herein, may be manufactured and/or stored at one or more centralized locations and dispatched to the host site for the cogeneration plant, where they are assembled into part or all of the cogeneration plant, generally with little or no modification of the individual units.

Modular Transportable Units

Modular transportable units are well known in the art and include the containerized shipping units that can be transported by truck, train, or ship. In certain embodiments, the entire functional portion of the cogeneration plant is constructed from modular units that are built and/or stored in one or more centralized facilities, e.g., one, two, three, four, five, or more than five facilities, and/or rapidly built according to pre-packaged specifications by a supplier, transported to the host site, and assembled into a complete cogeneration plant to provide the power and thermal product and/or mechanical work product needs of the host facility or facilities. Modular units are constrained only by the maximum size that is easily transported on normal roadways, trains, or ships, in particular embodiments this will be the size of a standard containerized unit.

One or more components of a cogeneration plant, or segments of one or components, is included in each modular transportable unit, and in certain embodiments the set of units dispatched to the cogeneration site provides a complete or substantially complete set of materials for rapidly and efficiently constructing a cogeneration plant suited to the needs of the particular host facility or facilities at the site. The modules and their components are compatible with little or no modification. In certain embodiments for examples in embodiments of larger systems, e.g., plants that are larger than about 15 MW, part of the plant may be supplied as modular transportable units and part of the plant may require onsite construction or fabrication due to the larger size. In all embodiments, however, a control system for the plant is fully integrated and prepackaged so that after the modules are assembled into the plant, the control system is ready to operate the plant without need for substantial, or any, modification to the control system or its sensors or actuators. The control system is described more fully below.

In certain embodiments, the modules are assembled at the host site to provide a fixed cogeneration plant. The modules are transported, e.g. by truck, and at the site the modular transportable units are removed from the wheeled base, e.g., by crane, forklift, or other suitable means, and assembled together. Thus, the units can be considered to have a transportable configuration, and an assembled configuration. In some cases, a modular transportable unit is used "as is" at the host site, i.e., in the same or substantially the same form in which it was transported; thus the transportable and assembled configuration for the module are the same, or in some cases substantially the same. The walls and roof of the unit remain attached and the unit is connected to other units via one or more docking sites, which may be covered or otherwise protected during transportation, as needed, then exposed for assembly. These modules, and others that are more substantially modified in assembly, may be configured with one or more docking sites to allow connection with other modules onsite with no substantial modification, i.e., the docking sites are configured so that operable connection to the other modules in the system requires little or no modification beyond joining pipes, electrical connections and the like. In some embodiments, adaptor units are provided to serve as adaptors between a docking site on one module and a dock on another module; these adaptors may be used when one module is sized significantly differently from another, as can happen with module gradations as discussed below. The modular units are compatible so that after onsite assembly the cogeneration plant is ready to go, i.e., "plug and play." Other units may require modification for use, such as removal of one or more walls, the roof, or all of the walls and roof. In some cases walls will be added to the final assembled cogeneration plant so that equipment is not exposed, etc. These walls, such as tilt-up walls, may be transported to the site, e.g. by truck, such as part of a modular transportable unit.

In a fixed configuration, the modular transportable units are fixed to a base, such as a concrete slab; the attachment may be reversible to allow units to be swapped out for maintenance, repair, or replacement, but when assembled some or all of the units are no longer mobile without modification, e.g., no longer are part of a trailer that includes a wheeled assembly. In certain embodiments, the modules are fixed and may not be easily removed. In certain embodiments, the modules may be readily disassembled and moved to a new host facility site. In other embodiments one or more of the modular transportable units may remain in a mobile state, e.g., as a wheeled trailer, that is attached to other units to complete the cogeneration plant. Some modular units may be fixed while others remain mobile in a given plant.

A modular transportable unit can contain one or more of a the components of a cogeneration plant, such as one or more prime mover, electrical generator, heat transfer unit such as a heat recovery steam generator (HRSG), thermal product carrier producer, mechanical work product producer, air intake unit, cooling tower unit, pumps, exhaust stack, and other components, as described more fully herein.

Alternatively, some components can be large enough that more than one modular unit is required for their transport, such as multiple units to transport a cooling tower or set of towers, air intakes, and the like.

In addition, two or more modules may contain parts of two or more components of a cogeneration plant, such that when the modules are connected, the components are completed. For example, one module may contain one section of a HRSG and one section of a refrigeration unit, and another module may contain the other sections, such that when the modules are connected on-site, the HRSG and the refrigeration unit are functional and complete.

Modular transportable units are partially or completely pre-assembled and/or available for rapid assembly based on pre-existing specifications by a suitable vendor, so that when a particular customer places an order, the suitable set of modular transportable units may be obtained rapidly and efficiently without the need for custom design and assembly.

Modular units included in cogeneration packages can include part or all of: air intake unit, prime mover unit, generator unit, HRSG unit, thermal product carrier producing unit, pump unit, cooling tower unit(s), and stack unit.

Sensors and Actuators

A cogeneration plant is under the control of control system, where the control system includes: a receiver system, a processor system, and a transmitter system. The receiver system receives inputs from a number of sources, as described more fully herein; one of the sources of input is sensors located in the cogeneration plant, and, in certain embodiments, in conduits to the host facility or facilities and/or in the host facility or facilities themselves. The processor system determines outputs for the control system based, in part, on the inputs. The transmitter system of the control system transmits output that may include signals that result in the modulation of the activity of one or more actuators or actuator systems in the cogeneration plant, conduits, and/or host facility or facilities. It will be appreciated that the control system that receives inputs, determines necessary actions, and sends outputs, may be partially or entirely removed from the cogeneration plant, e.g., Web-based or otherwise connected via the Internet. In certain embodiments some or all of the sensors and actuators that provide input and receive output from the control system may be wireless. Control systems of the invention are described more fully herein; this section describes the sensors and actuators or actuator systems that send inputs to the control system and receive outputs from the control system, respectively, as they are present in the modular transportable units.

These components are generally not provided in a single modular transportable unit. Rather, they are designed and constructed to integrate into a system spread throughout the cogeneration plant, from their various components in various modular transportable units in connection with components of the cogeneration plant, so that once the plant is assembled they are connected and ready to send inputs and receive outputs.

In some cases individual components, e.g., turbines, refrigeration units, and the like, may be supplied by manufacturers with their own sensors and/or actuators and control systems that are, e.g., set to manufacturers' set points; these are used as is or their function or logic is modified as necessary to allow seamless integration into the system as a whole and the most efficient operation according to the design of the system. In addition, certain operating systems presently used for one or more aspects of cogeneration plant control may be designed to receive input and send output to various components and sets of components; the control system of the invention may either "overlay" such operating systems, replace the system, or some combination thereof.

Sensors

The various components included in the modular transportable units contain sensors configured to send input to the control system; in addition, sensors may be included that operate on or around the modular transportable unit which may require some installation at a specific site, e.g., sensors for environmental conditions at the site.

Sensors that may be included in one or more of the modular transportable units may include sensors for temperature, flow rate, pressure, outputs, inputs, presence or concentration of one or more chemical species, electrical signals, or any other measurable quantity suitable for determining an operating condition in the cogeneration plant Some sensors may be supplied with a component by a supplier, such as one or more sensors supplied with a turbine, or with a refrigeration unit, etc., and may be either used as supplied or modified as necessary to be fully integratable into the final assembled plan, as described more fully herein. A sensor may provide simple on/off information or information over a continuum, e.g., a continuum of temperatures, or pressures, or flow rates, etc.

Flow rate sensors may include one or more sensors for a prime mover fuel flow rate, e.g., flow rate for natural gas to a natural gas turbine, a thermal product carrier flow rate, such as an output rate for chilled water from a refrigeration unit or an input rate of chilled water to a refrigeration unit, a steam flow rate, exhaust gas flow rates, and other rates as known in the art. Temperature sensors may include one or more sensors for exhaust gas temperature, temperature in a heat exchanger such as a HRSG exhaust temperature, ambient temperature sensors, and the like. Output sensors may include generator output sensors, and the like. Chemical species/concentration sensors may include, e.g., pH sensors, salt sensors, or emission monitoring sensors, such as for NOx, SOx, CO, CO2, O2, and/or particulates. Some or all of the sensors may be supplied or modified so as to provide wireless output to the control system, such as wireless output to a Web-based control system. One or more of the sensors may be configured to be easily replaced or modified as more efficient or more sensitive sensors are developed; in addition, the modular transportable units may be configured to have slots for one or more additional sensors to be added as they become available or are required; for example, an emissions control system may have a sensor for NOx but be configured to also accommodate sensors for, e.g., SOx and/or particulates as regulatory conditions demand.

In certain embodiments the modular transportable units of the cogeneration plant include at least 1, 2, 3, 4, 5, 7, 10, 15, 20, 25, 30, 35, 40, 45, 50, or more than 50 sensors, for example, 2-20, or 2-50, or 4-20, or 4-50, or 5-200, or 5-100, or 5-50 sensors, or 10-200, 10-100, or 10-50 sensors, or 30-500, 30-200, 30-100, or 30-50 sensors, or 50-500, 50-200, or 50-100 sensors, that are integrated into the particular components of the modular transportable units and ready to send output to the control system with little or no modification upon assembly of the modules. In certain embodiments, where the modular transportable units include at least a gas turbine and generator, a HRSG, a refrigeration unit, and a stack, the modular transportable units include at least 2, 3, 4, 5, 6, 7, 8, or more than 8 of sensors for sensing one or more of a HRSG exhaust temperature, a steam flow rate, a generator output, an exhaust temperature, a chilled water outlet temperature, a chilled water inlet temperature, a chilled water outlet flow rate, a chilled water inlet flow rate, and at least one of a NOx, NH3, SOx, CO, CO2, particulates, and/or O2 concentration. In certain embodiments a modular transportable unit containing the turbine contains integrated sensors for generator output and exhaust temperature, a modular unit for a refrigeration unit contains integrated sensors for chilled water outlet temperature, chilled water inlet temperature, and in some cases, chilled water outlet flow rate and/or chilled water inlet flow rate. In certain embodiments, a modular transportable unit for a HRSG includes a sensor for a steam flow rate and a HRSG exhaust temperature.

In some cases one or more sensors are included to sense a level and/or flow rate of an emissions control substance, such as an ammonia level/flow rate for controlling NOx emissions. In some cases one or more sensors are included to sense a level and/or flow rate for an additive to be added to a thermal fluid, such as glycol added to chilled water to decrease the freezing temperature; sensors may also be included to sense glycol or other additive concentration in the thermal fluid, e.g., chilled water, glycol temperature in to a refrigeration unit, glycol temperature out from a refrigeration unit.

On/off sensors may include one or more sensors for precoolers, turbine, HRSG, refrigeration unit, cooling tower, thermal energy storage, and the like.

In addition, sensors for one or more environmental conditions may be included with one or more of the modular transportable units, to be used at or near the cogeneration facility to provide input to the control system regarding ambient environmental conditions. Some or all of these sensors may remain attached to its unit or may be detached from the modular transportable unit(s) when deployed for use. These include sensors for one or more of temperature, humidity, wind speed, wind direction, and air pressure. Thus in certain embodiments, one or more sensors are used for sensing 1, 2, 3, 4, 5, 6 conditions from the set of conditions comprising temperature, humidity, wind speed, wind direction, and air pressure.

Other inputs regarding conditions at the cogeneration plant, at the one or more host facilities, and regarding market and other conditions, are provided to the control system as described elsewhere herein; however these inputs do not necessarily arise at the sensors that are part of the components of the modular transportable units.

As noted, one or more of the sensors in the components included in the modular transportable units may be a sensor supplied by a manufacturer of the component. Such a sensor may be modified as necessary to make its signal suitable to be received as an input for the control system when the component is integrated into the overall cogeneration plant. Such modification may include modification of the sensor itself, or modification of the signal from the sensor, or both. The end result of such modifications is that the modular transportable unit and its components are ready for sending inputs to the control system that may be used with the processing system of the control system, with little or no additional modification on-site In an exemplary embodiment of a cogeneration plant that supplies a thermal product, such as chilling where the vehicle for chilling is a cooling fluid, e.g., chilled water, as well as electrical power, to one or more host facilities, the cogeneration plant may include subsystems that include a natural gas compressor, an optional precooler, a natural gas turbine generator, a HRSG such as a boiler, one or more refrigeration units, optionally, one or more thermal energy storage systems (TES), one or more cooling towers, and a cooling fluid distribution system. Optionally, the system may also include a mechanical work product unit, e.g., a steam turbine driven compressor system. See FIG. 7. Sensors that provide input to the control system from the subsystem, and that may be included in modular transportable units that are assembled into the cogeneration plant, include: 1) for the fuel gas, e.g., natural gas, compressor (which may not be needed in systems where the pressure of fuel gas, e.g., natural gas, from the supply system is adequate) subsystem input sensors include sensors for fuel gas, e.g., natural gas flowrate, fuel gas, e.g., natural gas inlet pressure, fuel gas, e.g. natural gas inlet temperature, and compressor power input, and subsystem output sensors include sensors for fuel gas, e.g., natural gas outlet pressure, fuel gas, e.g., natural gas outlet temperature, and fuel gas, e.g., natural gas flowrate; 2) for the optional precooler, subsystem input sensors include sensors for inlet air flowrate, inlet air temperature, inlet air pressure, inlet cooling fluid flowrate, inlet cooling fluid temperature, and inlet cooling fluid pressure, and subsystem output sensors include sensors for outlet air flowrate, outlet air temperature, outlet air pressure, outlet cooling fluid flowrate, outlet cooling fluid temperature, and outlet cooling fluid pressure; 3) for the turbine generator, subsystem input sensors include sensors for inlet air flowrate, inlet air temperature, inlet air pressure, and natural gas flowrate, and subsystem output sensors include sensors for percent load, generator power output, exhaust flowrate, exhaust temperature, and exhaust pressure; 4) for the HRSG, subsystem input sensors include sensors for inlet exhaust air flowrate, inlet exhaust air temperature, inlet exhaust air pressure, inlet fuel gas, e.g., natural gas flowrate (for duct burner), inlet water flowrate, inlet water temperature, inlet ammonia flowrate (for NOx control), and subsystem output sensors include sensors for steam flowrate, steam pressure, steam temperature, outlet exhaust flowrate, outlet exhaust temperature, outlet exhaust pressure, outlet exhaust emissions (including one or more of NOx, NH3, CO2, CO, SOx, particulates, or O2); 5) for the refrigeration unit or refrigeration units, subsystem input sensors include sensors for steam flowrate, steam temperature, steam pressure, inlet condenser temperature, inlet condenser water flowrate, inlet condenser water pressure, return cooling fluid temperature, return cooling fluid pressure, return cooling fluid flowrate, and subsystem output sensors include sensors for percent load, outlet condenser temperature, outlet condenser water flowrate, outlet condenser water pressure, steam condensate temperature, steam condensate flowrate, outlet cooling fluid temperature, outlet cooling fluid pressure, and outlet glycol flowrate; 6) for the optional thermal energy storage unit, the subsystem input sensors include sensors for operational mode (build/harvest), inlet cooling fluid temperature, inlet cooling fluid flowrate, and the subsystem output sensors include sensors for outlet cooling fluid temperature and outlet cooling fluid flowrate; 7) for the cooling tower or cooling towers, the subsystem input sensors include sensors for operational mode (on/off), fan speed, inlet condenser water flowrate, inlet condenser water temperature, water make-up flowrate, water make-up temperature, ambient air temperature, and wet bulb temperature, and the subsystem output sensors include sensors for blowdown flowrate, blowdown conductivity, outlet condenser water flowrate, outlet condenser water temperature, outlet condenser water pressure, and power input; 8) for the cooling fluid distribution system, the subsystem input sensors include sensors for supply cooling fluid flowrate, supply cooling fluid temperature, supply cooling fluid pressure, and power input, and the subsystem output sensors include sensors for return cooling fluid flowrate, return cooling fluid temperature, and return cooling fluid pressure.

For the system shown in FIG. 7, several points serve as places where variables may be controlled, e.g., by actuators or actuator systems. These are shown in bold in FIG. 7 and include fuel gas, e.g., natural gas flowrate for the fuel gas, e.g., natural gas compressor, fuel gas, e.g., natural gas outlet pressure for the fuel gas, e.g., natural gas compressor; inlet air temperature, inlet cooling fluid flowrate, outlet air temperature for the optional precooler; inlet air flowrate, fuel gas, e.g., natural gas flowrate, percent load, and generator power output for the turbine/generator set; inlet fuel gas, e.g., natural gas flowrate, inlet water flowrate, inlet ammonia flowrate, and steam pressure for the HRSG; steam flowrate, percent load, outlet cooling fluid temperature, and outlet glycol flowrate for the refrigeration unit or refrigeration units; operational mode (build/harvest), inlet cooling fluid temperature, inlet cooling fluid flowrate, and outlet cooling fluid temperature for the optional TES; operational mode (on/off), fan speed, and blowdown flowrate for the cooling tower or towers. Actuators and actuator systems are discussed below; it will be apparent to one of skill in the art what actuators or actuator systems would be necessary or useful in accomplishing control of the controlled variables and such actuators or actuator systems are included in the overall system, e.g., as part of the modules of modular transportable units to be assembled into the system.

Actuators and Actuator Systems

The various components contained in the modular transportable units also contain one or more actuators or actuator systems for effecting any changes determined by the control system for the operation of the cogeneration plant. These actuators may include on/off actuators as well as actuators that operate over a continuum. Actuators may include one or more of actuators to control a flow rate, e.g., via a valve, a pump, a fan, etc., actuators to control an electrical signal, actuators to control mechanical systems, and the like.

Actuators of the invention may include one or more of an actuator or actuator system for controlling a pre-cooler, an actuator or actuator system for controlling a turbine, an actuator or actuator system for controlling a heat recovery steam generator, an actuator or actuator system for controlling a thermal product carrier producer, an actuator or actuator system for controlling a cooling tower, an actuator or actuator system for controlling one or more distribution pumps, and, optionally, an actuator or actuator system for controlling a thermal energy storage product producer.

Some actuators may be supplied with a component by a supplier, and may be either used as supplied or modified as necessary to be fully integratable into the final assembled plant. The actuators in the modules are configured such that once the modules are assembled into the final cogeneration plant, they are ready to receive an output signal from the control system and control their respective actuators or actuator systems such that the function of the particular component is modulated according to the signal from the control system. Such modification may include modification of the actuator itself, or modification of the signal to the actuator, or both. For example, an actuator or actuator system supplied by the manufacturer of a turbine may not allow operation of the turbine below 50% of turbine capacity as a safeguard against exceeding emissions limits, but it may be determined that the turbine can be operated at levels below that limit without exceeding emissions limits The actuator or its controlling software may be modified so that should the control system for the cogeneration plant send an output calling for the turbine to be operated at below 50%, the actuator will respond with the appropriate action, and the modified actuator or controlling software will be included in the turbine supplied in the modular transportable unit for the turbine so that once at the cogeneration plant site and assembled the turbine can be operated according to control system outputs with little or no further modification. The end result of such modifications is that the modular transportable unit and its components are ready for receiving outputs from the control system that may be used to modulate the operation of the cogeneration plant to conform to the output of the control system, with little or no additional modification on-site. Some or all of the actuators or actuator systems may be supplied or modified so as to receive wireless input from the control system, such as wireless input from a Web-based control system.

In certain embodiments the modular transportable units of the cogeneration plant include at least 1, 2, 3, 4, 5, 7, 10, 15, 20, 25, 30, 35, 40, 45, 50, or more than 50 actuators, for example, 1-10, or 1-20, or 2-10, or 2-20, or 5-200, or 5-100, or 5-50 actuators, or 10-200, 10-100, or 10-50 actuators, or 30-500, 30-200, 30-100, or 30-50 actuators, or 50-500, 50-200, or 50-100 actuators, that are integrated into the particular components of the modular transportable units and ready to receive input from the control system and control their respective units with little or no modification upon assembly of the modules.

Sets of Modules

The invention provides for the ability to both modularize and customize a cogeneration plant by using sets of pre-assembled or pre-specified modules that allow the supplier of the cogeneration plant to mix-and-match various units of the sets to provide a customized cogeneration plant for a particular site according to the needs of one or more host facilities at the site as well as, in some cases, agreements with other entities, such as utilities, suppliers, etc. In certain embodiments, sets of modules are stored at one or more centralized locations, and/or are rapidly available from suppliers, where the sets of modules provide building blocks for cogeneration plants of a variety of power and thermal product and/or mechanical work product configurations.

This allows for supplying the needs of various cogeneration sites and their associated host facilities, which will vary from site to site, in terms of electrical power requirements, thermal product requirements, mechanical work product requirements, degree of expected fluctuations in the requirements, local emissions controls, variations in the details of the supply agreement between the owner of the cogeneration plant and the host facility or facilities, variations in agreements between the plant and local utilities and/or suppliers, and the like.

Sets of modules on hand at one or more centralized sites, or available for rapid manufacture, can include subsets of modules that include members that provide various functions variously sized. Individual members from two or more subsets are combined to form an individual set suitable for a particular host site, and the set is transported to the host site and assembled into a fully functional cogeneration plant suitable for the host facility or host facilities at the site.

For example, one subset of modules may provide individual members an electrical generator, such as a turbine generator, for example a natural gas powered turbine generator. Different members of the subset may be sized differently, and the sizes are graduated to provide a selection of turbine capacities, so that the proper capacity for a particular site may be selected. Similar subsets may be used for cooling towers, exhaust stacks, pumps, heat transfer units such as heat recovery steam generators, e.g., boilers, thermal product carrier producers, e.g., refrigeration units, air intake units, and the like, where the members of each subset are sized in different sizes, and where different members of different subsets are compatible for assembly into a complete cogeneration plant; in some cases, one or more modifiers or adaptors can be used to match members of different subsets that are sized significantly differently for a particular cogeneration plant. The modules may be manufactured as individual members to be assembled into a set that is either part of, or, more typically, all of the cogeneration plant.

Depending on the needs of a particular host site or host sites, a given power unit can be combined with one or more heat transfer and/or thermal product carrier production and/or mechanical work product production units to supply the necessary thermal and/or mechanical work product(s) in combination with the necessary power for that particular site or sites. This can be determined by, e.g., one or more contractual agreements between the provider of the cogeneration unit and the host site facility or facilities. In addition, the provider of the cogeneration plant may modulate size and unit selection based on present or projected future thermal product markets, present or projected future mechanical work product markets, power markets, emissions control regulation, and the like. As described herein, depending on the projected market for various power and thermal combinations, modules may contain one or more functional units of one or more sizes.

Modules may also contain submodules that can be switched out depending on changing conditions or other variables at a given site or sites or improvements in technology. For example, emissions control submodules may used for natural gas-fired turbine emissions that control for NOx, as part of the standard modules (since NOx is a regulated emission from natural gases in virtually every location) and additional modules may be available to be added to the appropriate module based on anticipated additional emissions controls in some areas, e.g., more stringent emissions controls in some areas may require the addition of emissions control submodules in natural gas-fired systems for SOx and/or particulates, as well as perhaps swapping out the existing NOx submodule for a more efficient module based on more stringent NOx emissions controls.

Various module subset combinations correspond to various predictable sets needed for known or projected cogeneration needs, and pre-manufactured sets of modules can be maintained to allow quick turnaround when a customer order is placed, or the specifications for such modules can be stored and available for rapid manufacture.

In an exemplary embodiment, the module sets include a first subset for a natural gas-fired turbine generator, a second subset for air intake, a third subset for exhaust, a fourth subset for heat transfer units, e.g., HRSGs, a fifth subset for thermal product carrier producers, e.g. refrigeration units, a sixth subset for cooling units, e.g., towers, and a seventh subset for pumps, and, optionally (or instead of the thermal product carrier producer) a subset for mechanical work product producers. Some or all of the subsets may be used to assemble a set of modular transportable units to be used at a particular site. All sets will include members from the turbine, air intake, exhaust, pumps, and heat transfer subsets; some sets will also include members from the thermal product carrier producing and cooling subsets and/or members from the mechanical work product producer subset.

The gas-fired turbine subset includes individual members that include two or more of a modular transportable unit containing a turbine rated at between 0.1 and 1.0 MW, a modular transportable unit containing a turbine rated at between 1 and 2 MW, a modular transportable unit containing a turbine rated at between 2 and 5 MW, a modular transportable unit containing a turbine rated at between 5 and 10 MW, and a modular transportable unit containing a turbine rated at between 10 and 40 MW. It will be appreciated that if a turbine is supplied by a supplier it may be constrained to the size limit provided by that supplier, e.g., in the 1-2 MW range turbines are available rated at 1.2, 1.5, 1.7 MW and the like, similarly in the 2-5 MW range, turbines are available at 2.9, 3.5, 4.6 MW and the like.

Some other subsets of the module set are sized mostly according to the turbine and will be included in any set, such as the air intake subset and exhaust subset.

For example, the module set also includes a subset for air intake units, where the individual members of the subset are sized according to the sizes of the individual members of the gas turbine subset. These members could thus include one or more modular transportable units to provide air intake for a turbine between 0.1 and 1 MW, one or more modular transportable units to provide air intake for a turbine between 1 and 2 MW, one or more modular transportable units to provide air intake for a turbine between 2 and 5 MW, one or more modular transportable units to provide air intake for a turbine between 5 and 10 MW, one or more modular transportable units to provide air intake for a turbine between 10 and 40 MW.

The module set also includes a subset for exhaust stack units, where the individual members of the subset are sized according to the sizes of the individual members of the gas turbine subset. These members could thus include one or more modular transportable units to provide exhaust stack capacity for a turbine between 0.1 and 1 MW, one or more modular transportable units to provide exhaust stack capacity for a turbine between 1 and 2 MW, one or more modular transportable units to provide exhaust stack capacity for a turbine between 2 and 5 MW, one or more modular transportable units to exhaust stack capacity for a turbine between 5 and 10 MW, one or more modular transportable units to provide exhaust stack capacity for a turbine between 10 and 40 MW.

Other parts of the module set are sized to be ready to meet particular customer combinations of electric power and/or thermal product and/or mechanical work product needs, which will vary from site to site, both in terms of the proportion of total turbine output that is needed for projected electrical power vs. thermal product needs vs. mechanical work product needs, or any combination thereof, and the proportion of thermal product needs that will be carried by a heated thermal product carrier vs. chilled thermal product carrier. Thus, there may be a subset with variously sized modular units for heat transfer, such as HSRG units, e.g., boilers, and subsets with variously sized units for chilling, e.g., compression-type refrigeration units such as steam-driven compression-type refrigeration units, and subsets for cooling towers, where the members of the subsets are sized to provide the desired optionality in terms of meeting expected customer needs. In a simple case, a site will require electrical power and only steam, e.g., to heat a facility and/or to supply thermal energy for a process. In such a case a member of the HRSG subset may be used but not a member of the refrigeration unit subset nor, perhaps, a member of the cooling tower subset. In a more complex case, a site may be have need for electric power, heating, and chilling, and in that case the complete set of modular transportable units would include a turbine, HRSG, air intake, exhaust, refrigeration unit, and cooling modules.

Thus, other subsets of the set of modular transportable units may be more variously sized than the turbine, air intake, and exhaust subsets. For example, in certain embodiments the set of modular transportable units may include a subset of modular transportable units that contain a heat transfer unit, e.g., a HRSG, such as a HRSG. The members of the subset are sized according to the anticipated thermal product needs of various sites. In addition, for sets of modules to be assembled for sites requiring chilling, the set of modular transportable units may include a subset of modular transportable units that contain one or more refrigeration units, e.g., one or more steam-driven compression refrigeration units, and another subset of modular transportable units that contain cooling towers to match cooling requirements for the steam and refrigerant condensers of the various refrigeration units. Thus in certain embodiments the set of modular transportable units include a subset of modular transportable units whose members include a modular transportable unit for a steam-driven compression type refrigeration unit for producing between 60 and 600 tons of refrigeration, a modular transportable unit for a steam-driven compression type refrigeration unit for producing between 600 and 1200 tons of refrigeration, a modular transportable unit for a steam-driven compression type refrigeration unit for producing between 1200 and 3000 tons of refrigeration, and, optionally, a modular transportable unit for a steam-driven compression type refrigeration unit for producing between 3000 and 6000 tons of refrigeration and, optionally, a modular transportable unit for a steam-driven compression type refrigeration unit for producing between 6000 and 24,000 tons of refrigeration, and, optionally, a modular transportable unit for a steam-driven compression type refrigeration unit for producing between 24,000 and 48,000 tons of refrigeration.

The subset of modular transportable units that includes cooling towers is sized to match the refrigeration units in the subset of modular transportable units that include a refrigeration unit, e.g., a modular transportable unit(s) for a cooling tower(s) with sufficient cooling capacity for a steam-driven compression type refrigeration unit for producing between 60 and 600 tons of refrigeration, a modular transportable unit(s) for a cooling tower(s) with sufficient cooling capacity for a steam-driven compression type refrigeration unit for producing between 600 and 1200 tons of refrigeration, a modular transportable unit(s) for a cooling tower(s) with sufficient cooling capacity for a steam-driven compression type refrigeration unit for producing between 1200 and 3000 tons of refrigeration, and, optionally, a modular transportable unit(s)

for a cooling tower(s) with sufficient cooling capacity for a steam-driven compression type refrigeration unit for producing between 3000 and 6000 tons of refrigeration and, optionally, a modular transportable unit(s) for a cooling tower(s) with sufficient cooling capacity for a steam-driven compression type refrigeration unit for producing between 6000 and 24,000 tons of refrigeration, and, optionally, a modular transportable unit(s) for a cooling tower(s) with sufficient cooling capacity for a steam-driven compression type refrigeration unit for producing between 24,000 and 48,000 tons of refrigeration.

The set modular transportable units may also include a subset of modular transportable units that contains pumps, where the members of the subset are sized according to the various probable configurations of the other subsets.

For smaller turbines, e.g., in the 0.1 to 1 MW range and in the 1-2 MW range, or in the 2-5 MW range or even 5-10 MW range, individual modular units that are member of a subset, e.g., a turbine subset, may also include components that are members of another subset, e.g., an HRSG (e.g., boiler) subset. The combining of components of one subset with another into single modular transportable units is constrained by the size of the container for the modular transportable unit, which must be transportable on commonly available transport modes such as roads and railways, and by the types of units that can logically be packaged together given their connection, venting, intake, and other needs. Such combinations will be readily apparent to one of ordinary skill in the art. Exemplary combinations include the following: In certain embodiments a single mobile transportable unit may contain a turbine and an air inlet; or a turbine and a HRSG; or a turbine, air inlet, and HRSG; or a turbine, HRSG, and exhaust stack; or a refrigeration unit and pumps; or stack and emissions monitor; or HRSG and emissions control; or HRSG, emissions control, stack, and emissions monitoring; or a cooling tower and pumps; or air turbine, HRSG, emissions control, stack, and emissions monitoring. It will be appreciated that the foregoing combinations are exemplary and that any suitable combination to allow a module to be used at a certain type of host site is part of the invention. The number and type of functions that are combined into a single module depend on the sizing requirements of the assembled package and its configuration.

A complete set of modules for a functioning cogeneration plant can include, in certain embodiments, 2, 3, 4, 5, 6, 7, 8, 9, 10, or more than 10 modules, e.g., modules chosen from subsets of modules as described herein. This set may be assembled from members of the appropriate subsets, using subset members of appropriate size for each particular function required at the cogeneration site. Such an arrangement allows the supplier of the cogeneration plant to respond closely to customer needs but to efficiently, economically, and rapidly transport and assemble the required plant.

In certain embodiments, the invention provides a set of modular transportable units, where the set includes a first unit that contains a turbine, a second unit that include a HRSG, e.g., a boiler, a third unit that includes a thermal product carrier producer, a fourth unit that includes air intake units, a fifth unit that includes cooling tower unit, a sixth unit that includes an exhaust stack, and a seventh unit that includes pumps. In certain embodiments the invention provides a set of modular transportable units, where the set includes a first unit that contains a natural gas turbine, a second unit that include a HRSG, a third unit that includes a refrigeration unit, a fourth unit that includes air intake units, a fifth unit that includes cooling tower unit, a sixth unit that includes an exhaust stack, and a seventh unit that includes pumps. In certain embodiments the invention provides a set of modular transportable units, where the set includes a first unit that contains a natural gas turbine, a second unit that include a HRSG, a third unit that includes a compression refrigeration unit, a fourth unit that includes air intake units, a fifth unit that includes cooling tower unit, a sixth unit that includes an exhaust stack, and a seventh unit that includes pumps. In certain embodiments the invention provides a set of modular transportable units, where the set includes a first unit that contains a natural gas turbine, a second unit that include a HRSG with exhaust emissions control equipment, a third unit that includes a steam-driven compression refrigeration unit, a fourth unit that includes air intake units, a fifth unit that includes cooling tower unit, a sixth unit that includes an exhaust stack with exhaust emissions monitoring for at least NOx, and a seventh unit that includes pumps. In certain embodiments the first, second, third, fourth, fifth, sixth, and seventh modular transportable units are different units. In certain embodiments at least two of the modular transportable units are the same. In certain embodiments at least three of the modular transportable units are the same. In certain embodiments at least four of the modular transportable units are the same.

Figure 8:
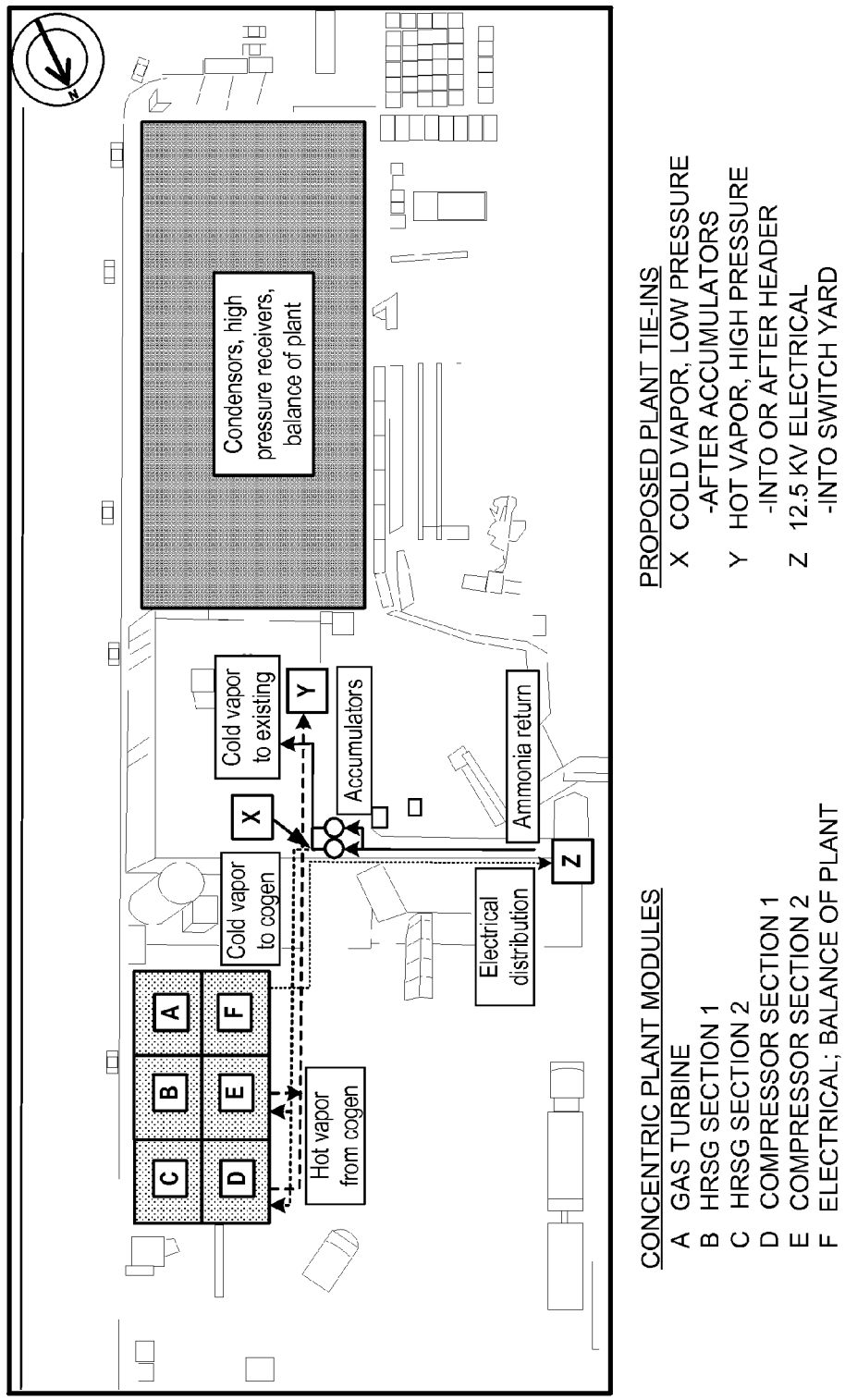
FIG. 8 is a schematic diagram of an exemplary cogeneration plant that ties into an existing facility to supply mechanical work product.

In certain embodiments the invention provides units, e.g., modular units, to be combined for industrial and/or agricultural refrigeration applications, for example, in applications where the air temperature to be achieved is lower than 40, 39, 38, 37, 36, 35, 34, 33, or 32 degrees F. The modules include modules to provide a gas turbine, HRSG, one or more steam turbines, and one or more refrigerant compressors (e.g. one or more screw compressors, centrifugal compressors, or other type of compressor). In some embodiments, the units tie into the host facility by tieing in to existing low pressure vapor refrigerant line upstream of existing compressors, e.g., electric motor driven compressors, and returning to high pressure vapor refrigerant lines downstream of existing compressors, e.g., electric motor driven compressors, and upstream of existing refrigerant condenser cooling towers. For example, in certain embodiments the system may be used to bypass an existing refrigeration unit or units. The units may remain operational for use as backup to the system and/or for use in peak requirement situations. An example of embodiments of these types is shown in FIG. 8. In certain embodiments, the system boundaries may be extended to include low pressure vapor accumulators, refrigerant condenser cooling towers and/or high pressure vapor receivers. Further, the expanded equipment may be modularized and/or incorporated into other modules.

In certain embodiments, the invention provides modules configured to provide a mechanical work product, such as a compressed gas, to a host facility, where the host facility may then use the compressed gas and return a product where the gas has been used, for example, to provide chilling, back to the cogeneration plant. For example, the modules may include one or more steam driven turbine compression systems for compressing a refrigerant gas, such as ammonia gas, that can be used by the host facility in a refrigeration system, then returned to the cogeneration plant. In these embodiments, the cogeneration plant supplies the compressed gas instead of, or in addition to, a thermal product such as chilled water. One or more host facilities may be supplied with one or more combinations of compressed gas, thermal product such as chilled water, or both.

Modular Financial Packages

In addition, the templates for one or more aspects of financial packages available to potential host facility customers may be partially or completely standardized. This allows a provider of cogeneration services, e.g., a build-own-and-operate provider, to easily and quickly offer a package of options to a potential customer who can then choose a combination suitable for their particular situation. In this sense, financial packages are also modularized and can be included as part of an overall cogeneration package by a provider.

In certain embodiments the invention provides systems and methods related to a network that includes two or more cogeneration systems. The systems may be controlled by a common controller.

III. Control

Certain embodiments of the invention include systems and methods for controlling a cogeneration plant, e.g., to achieve an optimum result, such as a maximum profit, and/or maximal energy efficiency from the cogeneration plant. In certain embodiments a network of cogeneration plants is controlled by a common controller, e.g., to achieve an optimum result such as a maximum profit and/or maximum energy efficiency from the network. As used herein, "control system" and "controller" are synonymous. For convenience the control systems are often described as for a single cogeneration plant but it is to be understood that such descriptions apply equally to cogeneration plants that are part of a network controlled by a common control system.

Control systems of the invention include a receiver system for receiving inputs, a processor operably connected to the receiver system for determining one or more outputs based at least in part on the inputs, and a transmitter system operably connected to the processor for transmitting outputs. The control system receives inputs from the cogeneration plant and from other sources, as detailed below, and sends output to at least the cogeneration plant and, in some cases, to other destinations.

Figure 2:
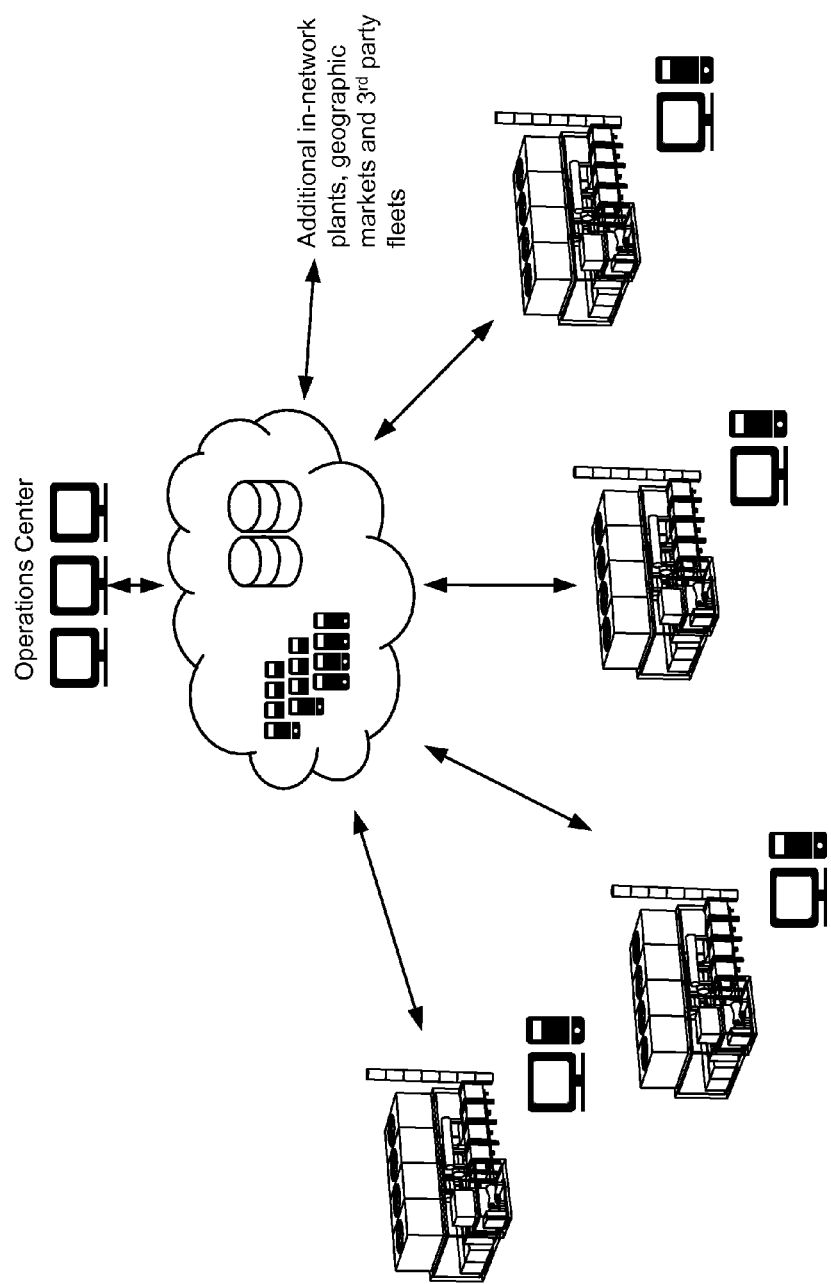
FIG. 2 is a schematic diagram of an exemplary embodiment of a network of cogeneration systems.
Figure 6A:
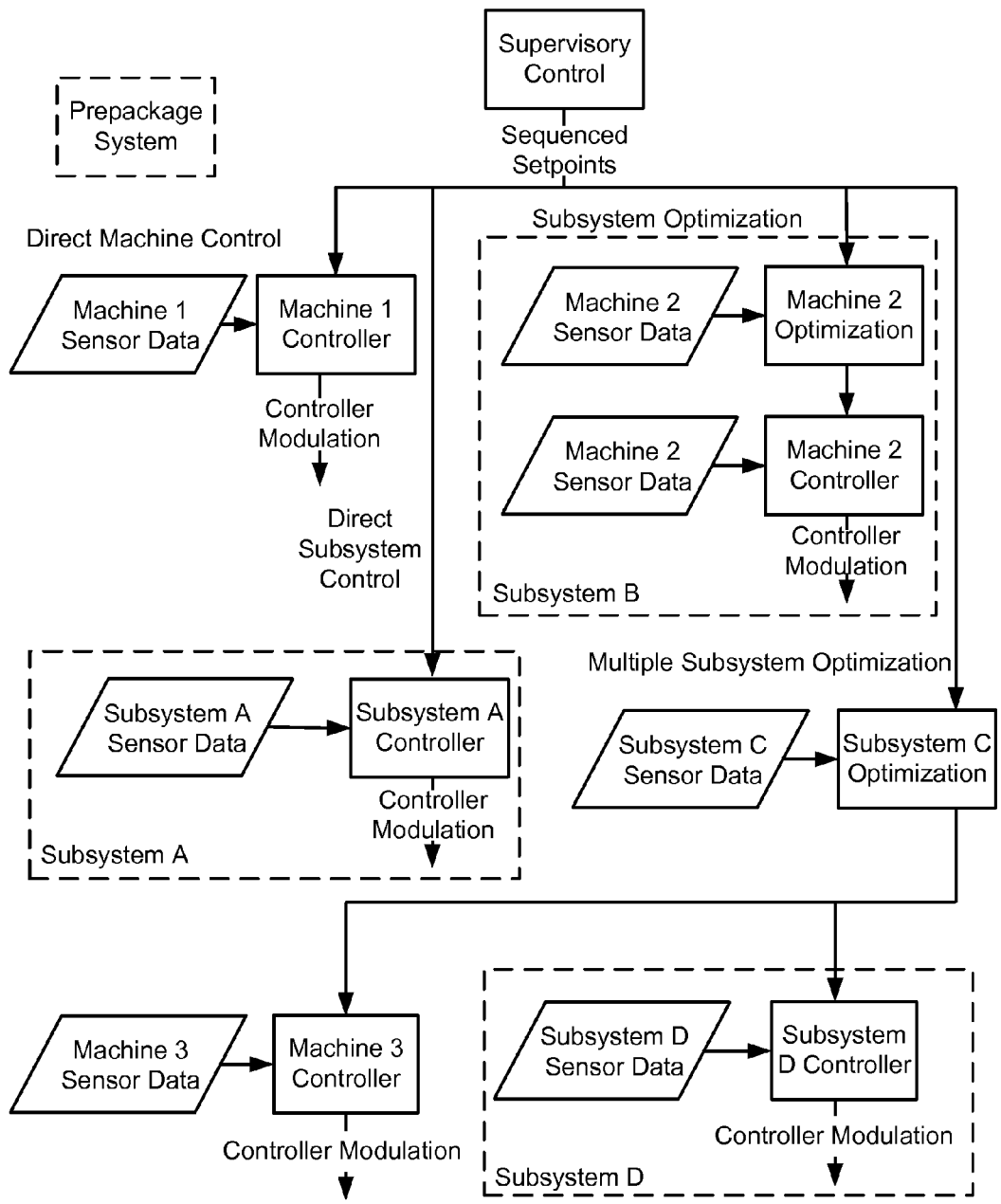
FIG. 6A is a schematic diagram of a general scheme for subsystem optimization and machine control.
Figure 6B:
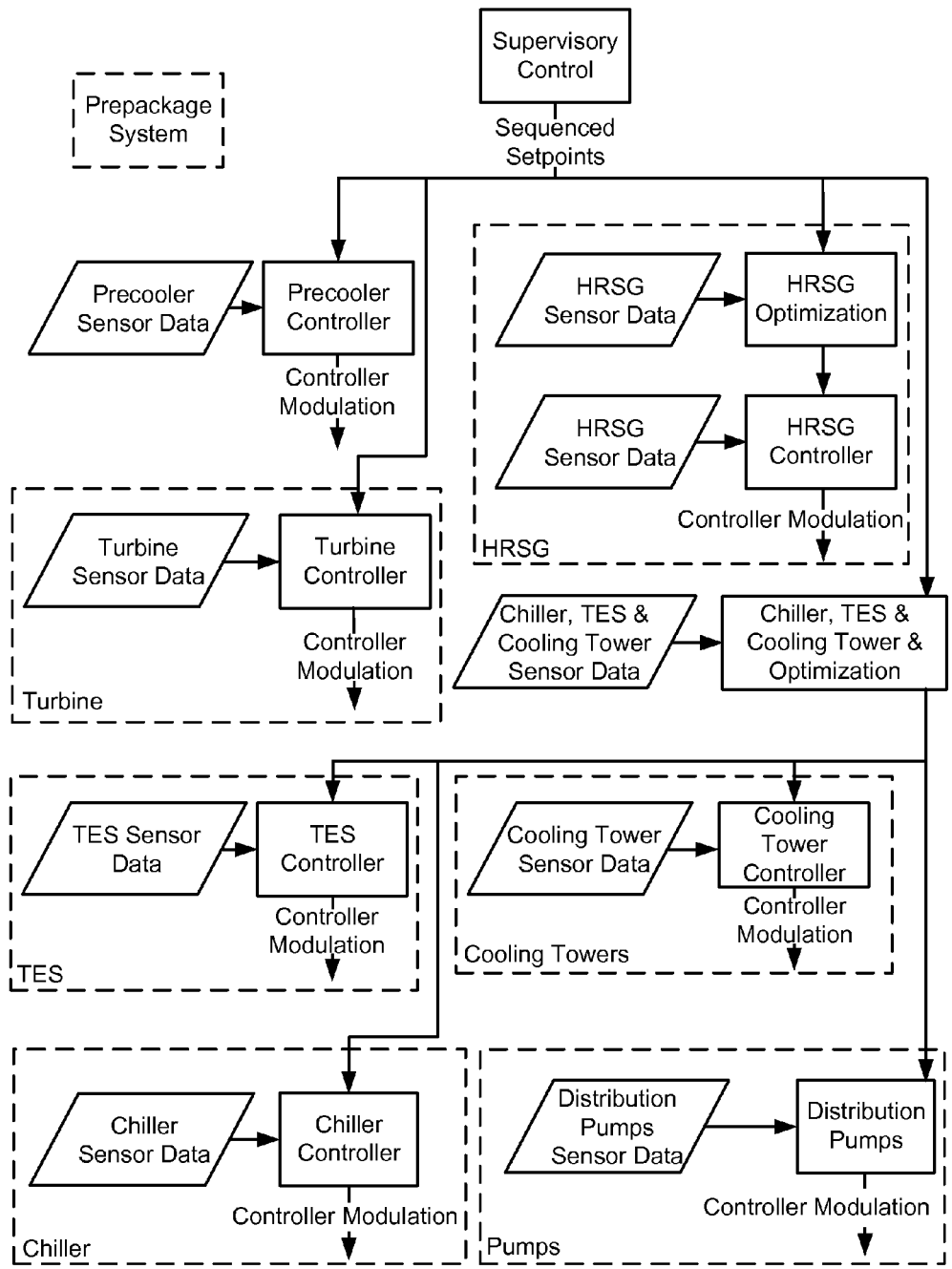
FIG. 6B is a schematic diagram of an exemplary scheme for subsystem optimization and machine control.

At the level of the cogeneration plant itself, the control system may operate at one or more of five levels, or combination of levels: 1) at the level of direct reception of input from sensors at various parts of the cogeneration plant and direct output to actuators or actuator systems at the cogeneration plant, where the outputs are based on the processing of the control system; 2) at the level of inputs from subsystems and/or outputs to subsystems where the outputs are based on the processing of the control system; 3) at the level of inputs from groups of multiple subsystems and/or outputs to groups of multiple subsystems, where the outputs are based on the processing of the control system; 4) at the level of inputs from the entire cogeneration plant and/or outputs for the entire cogeneration plant, where the outputs are based on processing of the control system; and/or 5) at the level of inputs from a network of cogeneration systems and outputs to a particular cogeneration plant or group of plants, based on the processing of the control system. An example of a general scheme embodying elements of levels 1)-4) is shown in FIG. 6A. An example of a specific scheme embodying elements of levels 1)-4) is shown in FIG. 6B. A network of cogeneration plants is depicted in FIG. 2.

The first level of input, output, and control is specific to specific sensors and actuators or actuator systems, see, e.g., FIG. 6A showing direct machine control and FIG. 6B showing an example of a precooler under direct control. This may be the case for a component system that is built to the specifications of the supplier, e.g., modular design specifications, for the overall cogeneration plant, where inputs from the sensors, and output to the actuators may all move to and from the control system directly, with little or no intervening level of processing. Sensors and/or actuators under direct control may be found as well as in piping systems between subsystems, valves, conduits between subsystems, electrical connections, and the like.

The second level of input, output, and control may be used for subsystems, e.g., vendor-supplied subsystems where the subsystem is supplied with sensors, actuators or actuator systems, and, typically, some degree of control logic built-in, and the control system operates at the level of the input from the sensors, input from processors, and other input as provided by the supplied subsystem, processes these values to achieve subsystem optimization within the context of the overall system, and sends output which is taken by the subsystem to implement actuator or actuator system changes based on the built-in actuators and processing of the subsystem. This level of processing by the control system can also occur for subsystems that are made to specifications, e.g., modular design specification, for the overall cogeneration plant; in these cases some combination of direct control and subsystem control may be used, as appropriate for achieving an optimal result. See, e.g., FIG. 6A Subsystem A and subsystem B, corresponding in FIG. 6B to a turbine and two HRSG units, respectively.

The third level of input, output, and control may take information from multiple subsystems, multiple direct machine control modules, or a combination of subsystems and direct machine control modules, and send appropriate outputs based on the processing of the control system, where the outputs may be directed toward direct machine control and/or subsystem control, to optimize the operation of the multiple subsystems and/or direct machine control modules. See FIG. 6A, multiple subsystem optimization, and FIG. 6B, where an example is shown of optimization of a precooler, turbine subsystem, and HRSG subsystem. Another example of such multiple subsystem optimization may be, e.g., the optimization of one or more refrigeration units, HRSGs, distribution pumps for chilled product carrier (i.e., heat transfer fluid such as a chilled water product, e.g. a water/glycol mix) and, optionally, fans in a chilled facility, to optimize the overall performance of the subsystem such as to keep the operation of the refrigeration unit as close to optimal efficiency as possible (see further description of thermal energy distribution and storage as described herein). These are of course merely exemplary embodiments and exact combinations will be determined by sources of components (made to specification or supplied according to vendor specification), logical groupings of subsystems, and the like.

The fourth level will occur in the control system to optimize combinations of any of the first three levels as may be required or desired for a particular combination of, modular transportable units and their corresponding components for a cogeneration plant. The fourth level of control optimizes operation of the entire plant to produce a desired result, e.g., an optimum profit and/or an optimum energy efficiency for the plant.

The fifth level will occur for a cogeneration plant that is part of a network of cogeneration systems, where the control system achieves a result for the network as w whole, such as an optimum profit for the network or part of the network and/or an optimum energy efficiency for the network or part of the network.

Combinations of input and output may be utilized that combine one or more of the levels above, as appropriate to achieve control of the cogeneration plant while allowing the necessary components and control logic to be such that little or no modification is required on assembly of the plant in order for the control system to be functional to achieve a desired result for the cogeneration plant. For example, direct input may be taken from a specific sensor, processed in a processing unit, and complex output may be sent to multiple subsystems. A specific example is a sensor senses and transmits to a processing system a single temperature reading for the chilled water-glycol outlet from the refrigeration unit evaporator, the processing system determines a set of actions required and the processor system sends outputs to the refrigeration unit, HRSG and turbine. This is merely exemplary and it will be appreciated that any combination of inputs, processing, and outputs from any of the five levels described may be used to achieve control of the cogeneration plant. Control functions such as this are handled in the greater context of optimizing plant or network operation.

In all cases of control at any level, in embodiments in which one or more modular units are used in the assembly of the cogeneration plant, the control system is configured so that, on assembly of the modules, little or no modification to the modules or aspects of the control system is required for the control system to be fully capable of optimizing a result for the cogeneration plant. The necessary control logic and, if necessary, hardware, is incorporated into the modules, so that integrating any sensors, actuators, subsystems, multiple subsystems, other control logic, and the entire system, may occur without the necessity for modifying components of the modules in a substantial way, and on assembly of the modules into the final cogeneration plant, the control system is ready to operate the plant to achieve a desired result. In certain embodiments, no modification of any components in the modules is necessary. For example, where the modules contain, e.g., a turbine supplied by a vendor where control is at the subsystem level, the necessary control logic and, if necessary, hardware, for integrating the vendor product into the control system as a whole is already implemented and in place in the module and/or in the control system. Similar considerations are true for the control of multiple subsystems, the system as a whole, and, in the case of a system that is part of a cogeneration network, the integration of the system into the network.

Part or all of the control system may be remote from the cogeneration plant or plants that it controls, e.g., Web-based. In some embodiments, part of the control system is at the cogeneration plant and part is remote. In some embodiments, the entire control system is remote. In either case, some or all of the inputs and/or outputs to and from the control system may be transmitted wirelessly. It will be appreciated that partially or completely Web-based systems may be distributed over many different areas. In certain embodiments, control system, e.g. Web-based control systems, allow for one or more of a remote update for pricing models, utility tariffs, demand response events, government incentives, software upgrades, algorithms and control modules, and/or predictive databases. In certain embodiments, control system, e.g. Web-based control systems, allow for audit grade reporting for one or more of: one or more of metering, virtual sub-metering, billing/invoicing, and/or account management.

Figure 4:
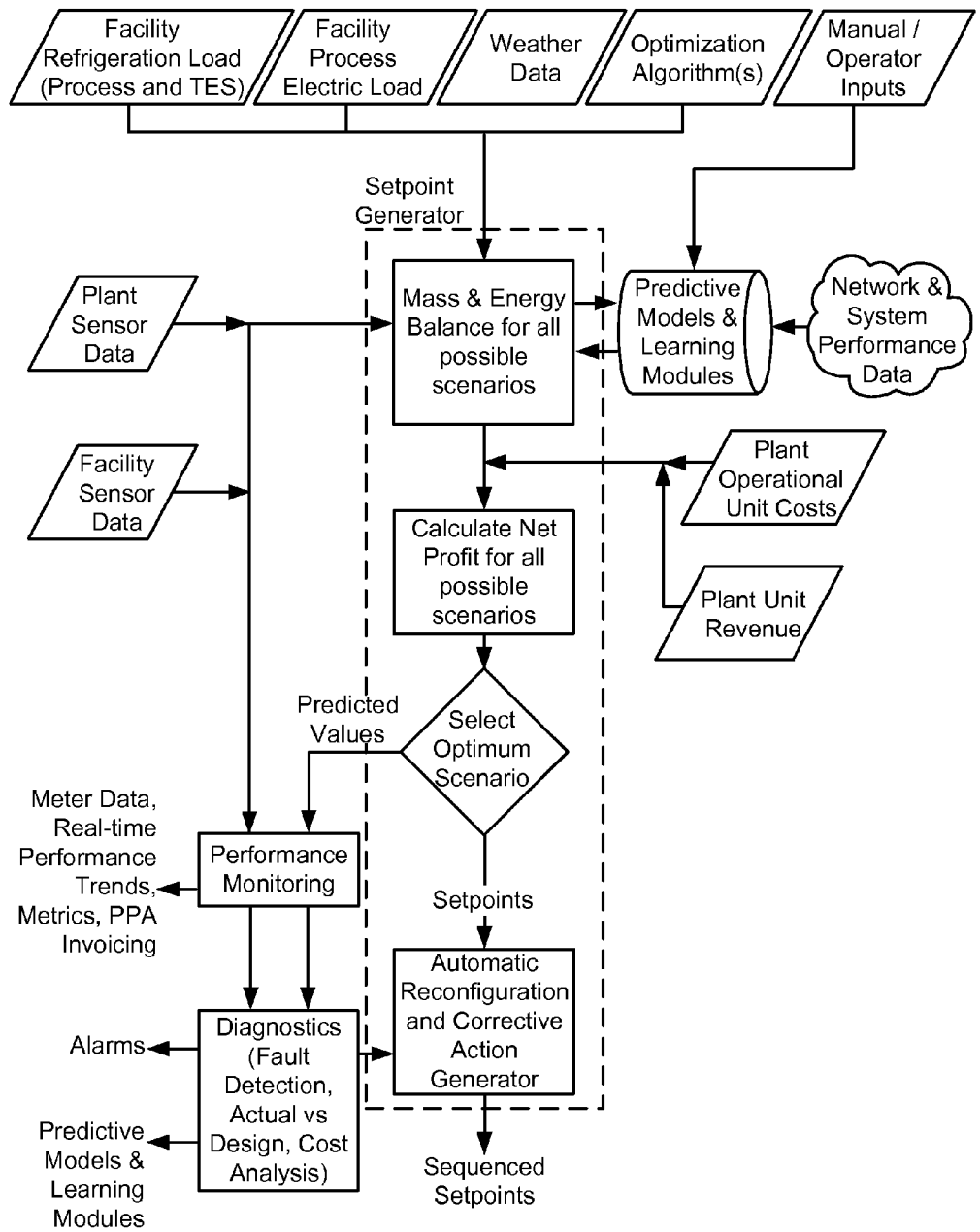
FIG. 4 is a schematic diagram of an exemplary overview of a control system.
Figure 5:
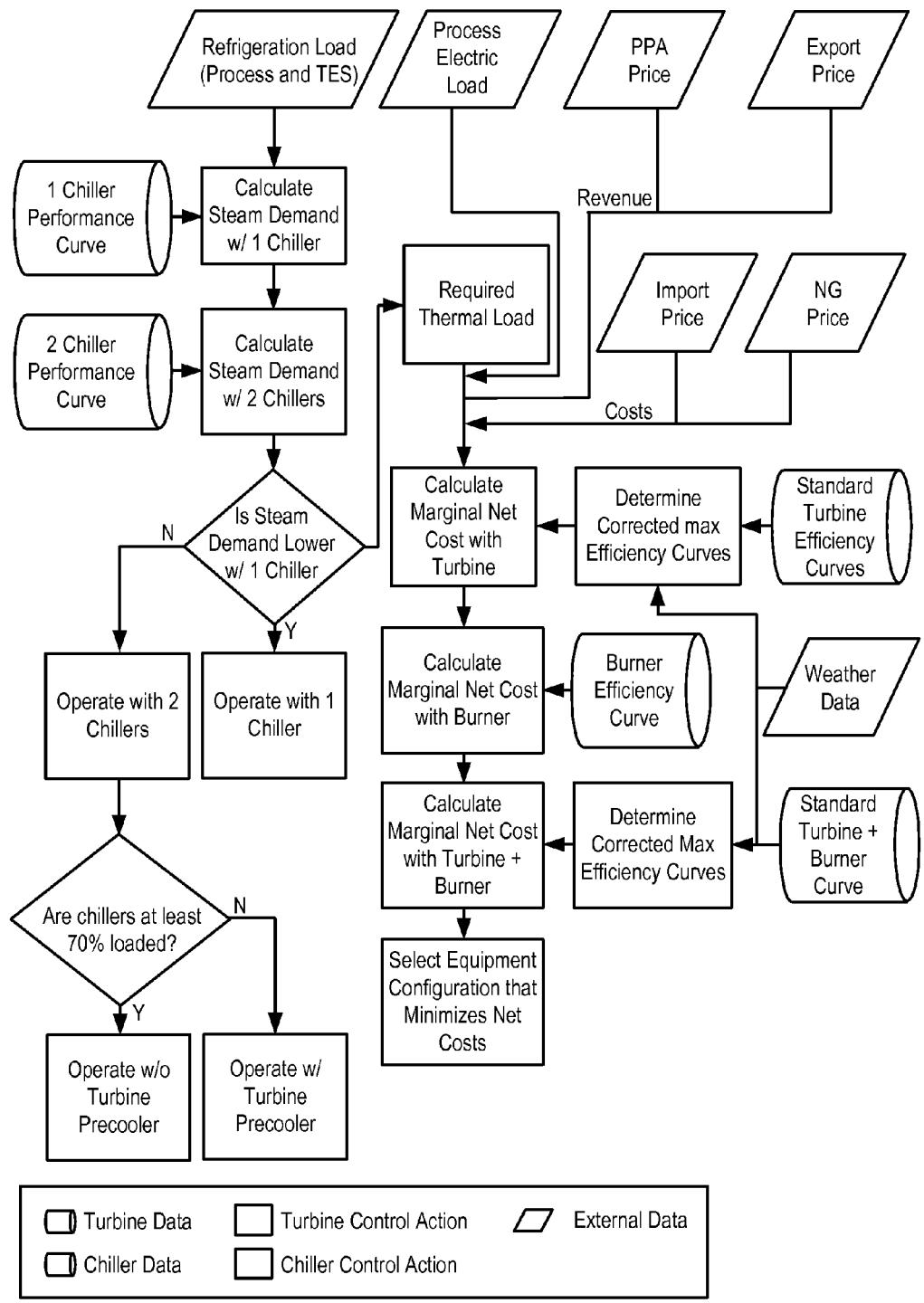
FIG. 5 is a diagram of levels of inputs and outputs and control for a control system for a cogeneration plant.

An example of a scheme for a control system along with inputs and outputs is given in FIG. 4, which shows a set point generator. In this example, the set point generator receives inputs for a facility thermal demand load, such as a facility refrigeration load, a facility process electric load, weather data, and optimization algorithms, as well as cogeneration plant sensor data, and facility sensor data. Manual/operator inputs and/or inputs from a network and system performance data, are processed by predictive models and/or learning modules, to supply further input to the set point generator. Plant operational unit costs and plant unit revenue are also input to the set point generator. The set point generator generates predicted values which are further processed with performance monitoring and/or diagnostics in a feedback loop back to the set point generator, which outputs sequenced set points. Further outputs from the control system as a whole can include meter data, real-time performance trends, metrics, and PPA invoicing, as well as alarms and predictive models and learning modules. The set point generate utilizes mass and energy balance for all possible scenarios, calculate, e.g., net profit for all possible scenarios (in some embodiments, energy efficiency for all possible scenarios, which may be combined with net profit or used alone), selects an optimum scenario and generates predicted values and set points. Set points and feedback from the feedback loop are processed in an automatic reconfiguration and corrective action generator.

The exemplary set point generator of FIG. 4 may be considered one embodiment of a control system of the invention. The set point generator, predictive modules, learning modules, performance monitoring processing, and/or diagnostics monitoring shown in FIG. 4, in various combinations, are also embodiments of control systems of the invention. For example, in one embodiment, the invention provides a control system for controlling a cogeneration plant that include a set point generator, one or more predictive models, one or more learning modules, one or more performance monitoring modules, and one or more diagnostics modules, where the set point generator receives input indicating a facility thermal product load, such as a facility refrigeration load, and/or mechanical work product load, a facility process load, weather data, and, optionally, optimization algorithms, and where the performance models and learning modules receive input from manual/operator inputs and, optionally, from a network for system and performance data for other cogeneration plants and facilities, and sends input to the set point generator, and where the set point generator further receives inputs for cogeneration plant operational unit costs and cogeneration plant unit revenue, and from cogeneration plant sensors and facility sensors, and where the set point generator sends outputs to the performance monitoring module and the performance monitoring module sends outputs to the diagnostics module, which sends input back to the set point generator, in a feedback loop, and where the set point generator sends outputs of sequenced set points. The system of FIG. 4 also illustrates a maintenance optimization embodiment in that the diagnostics module may compare monitored performance to predicted values and determine probable causes for discrepancies, which in turn may be eliminated or mitigate as desired by alterations in a maintenance schedule or routine.

Inputs

The control system may receive input from the cogeneration plant or plants that it controls, from the distribution system for its electrical power and/or thermal products, and/or mechanical work products, from one or more host facilities associated with the cogeneration plant or plants, from the environment around the cogeneration plant or plants and/or the host facility or facilities, and from external sources such as databases and other indicators of market conditions, weather, etc., and/or from any other suitable source.

In addition the control system may receive as input updates or modifications to its programs, e.g., software updates, which may modulate the control system function. These updates or modifications may be received on average every 6 months to one year, or every one to 6 months, or every one week to one month, or every one day to one week, or even more often, e.g., an average of an update or modification every day or less. In embodiments where the control system learns and modifies its behavior, some updates and modifications may be due to such learning. In a control system for a network of cogeneration plants, the control system may automatically update based on learning from any one or combination of more than one of the cogeneration plants. This may be in the form of automatic change of the program, or may come from a source outside the control system, or both. Thus, for example, the control system may receive update to algorithms via the Cloud (the Internet), without the need to physically modulate a control system at a particular cogeneration plant or even physically visit a particular cogeneration plant.

A control system of the invention may be configured to receive any number of suitable inputs in a given time period. For example, a control system may be configured to receive at least 10, at least 20, at least 50, at least 100, at least 200, at least 500, at least 1000, at least 2000, at least 5000, or at least 10,000 inputs in a given time period, on average. The time period may be, e.g., a minute, 5 minute, 10 minutes, 30 minutes, an hour, or a day. For example, in certain embodiments a control system of the invention is configured to receive an average of at least 100 inputs per 10 minute interval. In certain embodiments a control system of the invention is configured to receive an average of at least 500 inputs per 10 minute interval. In certain embodiments a control system of the invention is configured to receive an average of at least 1000 inputs per 10 minute interval.

Control systems that control a network of cogeneration plants may be configured to receive even more inputs in a given time period. For example, a control system that controls a network of cogeneration plants may be configured to receive at least 20, at least 50, at least 100, at least 200, at least 500, at least 1000, at least 2000, at least 5000, at least 10,000, or at least 20,000 inputs in a given time period, on average. The time period may be, e.g., a minute, 5 minute, 10 minutes, 30 minutes, an hour, or a day. For example, in certain embodiments a control system of the invention for controlling a network of cogeneration plants is configured receive an average of over 1000 inputs per 10 minute interval. In certain embodiments a control system of the invention for controlling a network of cogeneration plants is configured receive an average of over 5000 inputs per 10 minute interval. In certain embodiments a control system of the invention for controlling a network of cogeneration plants is configured receive an average of over 10,000 inputs per 10 minute interval.

Inputs from Cogeneration Plants

The receiving system is configured to receive inputs from the cogeneration plant or plants that it controls. These inputs may be from sensors, as described herein. In embodiments where the cogeneration plant is a modular cogeneration plant, the sensors are fully integrated into the modules and into the plant assembled from the modules. Further input for a particular cogeneration plant may include the time of day for the plant, the time of year, or the day of the week.

Inputs from Distribution System

Inputs from the distribution system for the cogeneration plant include inputs regarding the distribution of electrical power and distribution of thermal product or products. Examples of inputs from the thermal distribution system include input regarding an incoming (return) thermal product carrier, e.g. cooling fluid such as chilled water, flowrate, an outgoing (supply) thermal product carrier, e.g. cooling fluid such as chilled water, flowrate, an incoming (return) thermal product carrier, e.g. cooling fluid such as chilled water, temperature, an outgoing (supply) thermal product carrier, e.g. cooling fluid such as chilled water, temperature, an incoming (return) thermal product carrier, e.g. cooling fluid such as chilled water, pressure, and an outgoing (supply) thermal product carrier, e.g. cooling fluid such as chilled water, pressure, and a power input to the distribution system. Similar inputs may be received regarding the distribution of a mechanical work product.

Inputs from Host Facilities

Inputs from host facilities include inputs regarding an electrical energy demand, a thermal product demand, a thermal product carrier flow rate, an air temperature, a thermal product carrier temperature, a fan rate, a humidity, a set point for an air temperature, a set point for a thermal product carrier temperature, a mechanical work product demand, a mechanical work product carrier flow rate, or any combination thereof. A thermal product may be chilling, supplied (carried) by a chilled water product such as chilled water or ice, or a heating, supplied (carried) by heated water product, such as hot water or steam. The host facility or facilities may have several different areas where there are corresponding set points for various conditions, e.g., temperature and/or humidity, so that the control system may receive temperature and/or set point inputs for at least 2, 3, 4, 5, 6, 7, 8, 9, 10, 12, 15, 20, 30, 40, 50, 60, 70, 80, 90, or 100 areas of the host facility. Corresponding fan rates may also be input. See the following section on combined thermal distribution and energy storage for possible inputs into the controller from the host facility or facilities.

Input from a host facility may also include input from an operator of the host facility, i.e., facility operator-generated inputs, regarding one or more aspects of the operation of the facility, for example, a change in a desired temperature in the facility, or a change in scheduling, and the like, as described herein.

Other conditions, such as $CO_2$ concentration in one or more areas of the host facility, may also serve as input to the control system.

The control system may also receive input from an interface for an operator of a host facility. The interface may allow the operator to input into the control system a desired future modulation in the conditions of the host facility, such as inputting a desire to be able to run an unscheduled shift at the plant, or remove a scheduled shift, desired changes in set points, and the like. The control system may be configured to receive such input and to adjust operating conditions of the cogeneration plant accordingly. In addition, the control system receives inputs regarding operator overrides of the control system outputs, and, in some cases, answers to queries from the control system as to the reason for the overrides, as described more fully elsewhere herein.

In addition, the input from the host facility may include some or all of the transport logistics for products of the host facility, or any other suitable input regarding the operation of the host facility.

Inputs from the Environment

The control system may also be configured to receive inputs regarding one or more environmental conditions around the cogeneration plant and/or its host facility or facilities, including one or more of temperature, humidity, wind speed, wind direction, time of day, and air pressure. Other environmental inputs for areas outside that of the cogeneration plant or its host facility or facilities may also be input as appropriate, e.g., weather patterns or conditions for other areas.

Inputs from External Sources

The control system is also configured to receive inputs from one or more external sources. These sources include any suitable and available sources to allow the control system to conduct the processing to provide outputs. The sources include market sources, databases, weather sources, etc. Market sources provide input regarding market conditions for markets relevant to the operating of the cogeneration plant, including a price for a fuel for the cogeneration plant, a price for electrical energy exported from the cogeneration plant, a price for imported electrical energy to the cogeneration plant, a price for an incentive for the cogeneration plant, a price for a demand response action offered by the electric utility, a price for a thermal product produced by the cogeneration plant, a price for mechanical work product produced by the cogeneration plant, a price for water, and/or a price for a variable maintenance price. The criteria on which an incentive or incentives is based may include environmental criteria, reliability criteria, technological criteria, size criteria, availability criteria, or a combination thereof.

Processing System

The control system processes the inputs and determines one or more set points for one or more actuators within the cogeneration plant or plants, where the actuators are as described herein. In certain embodiments where a cogeneration plant is made of modular transportable units, at least some of the actuators are actuators within modular transportable units that are part of a cogeneration plant or plants. In some cases the control system determines set points for actuators within one or more host facilities. The control system may determine other output as well, such as output to a utility indicating that electric power is available from the cogeneration plant for sale to the utility, or to a facility that is not a host facility indicating that thermal product and/or mechanical work product is available from the cogeneration plant, or the like.

In addition to inputs, the processing system also uses information from one or more agreements with one or more host facilities for providing electric power and/or thermal product and/or mechanical work product to the one or more host facilities. In a simple case, the cogeneration plant (i.e., the owner or operator of the cogeneration plant) is under an agreement with a host facility to provide it with electric power and a thermal product, e.g., chilling to a chilled facility, and/or mechanical work product. However, any number of host facilities may be in any number of agreements with a given cogeneration plant and the processing takes into account all relevant agreements. The terms of additional agreements may also be used by the processing system, such as agreements with utilities to purchase excess electric power from the cogeneration plant, often using real time pricing (RTP), whose values can be part of the inputs to the control system, maintenance agreements, labor agreements, supply agreements, agreements with facilities to purchase excess thermal product, agreements with facilities to purchase excess mechanical work product, agreements regarding emissions control and/or incentives, agreements regarding emissions credits, and any other suitable agreements that could affect how the cogeneration plant or plants is operated. For some or all of these agreements, there may be periodic inputs to the processing system to update current conditions of the agreement, e.g., current pricing or current options available under the agreement, e.g., RTP as mentioned.

The processing system may also use information from one or more sources regarding a particular cogeneration plant and/or its components, e.g., performance curves. For example, the processing system may use information, e.g., performance curves, regarding the manufacturers specifications for one or more components, such as for one or more prime movers, e.g., turbines, one or more heat transfer systems, such as HSRG, e.g., HRSGs, one or more thermal product carrier producers, such as refrigeration units, e.g., steam-driven compression refrigeration units, one or more mechanical work product producers, and the like. The processing system may use information for the plant and/or various components that was determined during the commissioning of the plant. The processing system may use information that is gathered during the running of the plant, e.g., updated performance curves for the various components.

The processing may include determining the outputs that will lead to desired result, such as an optimal result for a cogeneration plant, such as a maximum profit for the cogeneration plant over a desired time period, or maximum energy efficiency for the cogeneration plant over a desired time period. In some cases part of the processing may be directed to optimizing maintenance as well as optimizing operations, such as by using a diagnostics unit to compare predicted values with actual values for various set points and results determined by the processor, see, e.g., FIG. 4. In certain embodiments, the processing system may also allow for the integration with, monitoring, and optionally, control, of existing or future energy efficiency and/or renewable energy systems; for example, a solar installation, variable speed equipment in the facility, or predictive models of energy consuming equipment in the facility may be incorporated into the processing of the processor system. In the case of a control system that controls more than one cogeneration plant, i.e., a network of cogeneration plants, the processing may include determining the outputs that will lead to an optimal result for the network of plants, such as a maximum profit for the network or a maximum energy efficiency for the network, over a desired time period. It will be appreciated that in such network control systems the optimum result for the network as a whole may not be optimum for any one particular cogeneration plant in the network.

Forecasting

The processor system may use one or more forecast steps in determining its output, e.g., in determining a set point or set points for one or more actuators. The forecast step may include forecasting a future value or range of values for a particular quantity, and may also include a probability of occurrence for the value or range of values at the forecast time (which may be a single time or range of times). The forecast step or steps may include 1, 2, 3, 4, 5, 6, 7, 8, 9, 10, or more than 10 forecast scenarios. The forecast step or steps may include a forecast and/or probability for a value or range of values of a fuel price (e.g., a natural gas price), an electricity export price, an electricity import price, an ambient environmental condition (e.g., weather, such as a prediction of change of air temperature), an emissions limit, an incentive for the cogeneration plant, a price for a thermal product, a price for a mechanical work product, a price for water, an electrical demand from a host facility, and/or a thermal product demand from a host facility, and/or a mechanical work product demand from a host facility.

Learning

The processor system may also have learning capability. The processor system may, for example, include a data storage unit for storing a value corresponding to a result that occurs after a change in one or more set points. It can compare the result with a predicted and/or ideal result, and based on the comparison, improve the ability of the control system to reach a desired result, such as an optimum result, e.g. an optimum profit, for the cogeneration plant. Learning capabilities may extend far beyond such simple comparisons, and any suitable learning system may be incorporated in the processor system software.

Profiles and Peer Sites

At any single cogeneration plant such learning will result in profile for that cogeneration plant, which includes the set of algorithms, databases, and other parts of a processing system, that most closely approximates the predicted behavior of the plant, based on plant component specifications, past behavior of the plant, past behavior of one or more host sites, and/or past environmental conditions and their changes, and the like. The profile for the plant changes as the system continues to learn at the particular site, and/or as the system learns from other sites.

A profile for a cogeneration plant includes performance curves for the major components of the plant, such as one or more prime mover/generators, e.g., one or more turbine generators, one or more heat transfer systems such as HRSGs, e.g., HRSGs, one or more thermal product carrier producers such as one or more refrigeration units, e.g., steam-driven compression refrigeration units and/or absorption refrigeration units, and one or more cooling towers. An initial set of performance curves may be the off-the-shelf curves provided by each of the manufacturers of the components. Another set may be produced during commissioning of the cogeneration plant. Further modification of the performance curves will continue as the cogeneration plant is operated, and the modifications incorporated into the processing of the control system; this may continue as the plant is operated over time. In a network of cogeneration plants, one or more of the performance curves of one or more plants may be used to enhance control of other plants; e.g., if a first cogeneration plant has been in operation longer than other plants at peer sites, the information on performance over time of the first plant can be incorporated into the information used to control the other plants. Even if the plants aren't under a common controller this may be done; however, the use of a common controller allows virtually instantaneous adjustment for some or all of the plants in the network as performance curves and other performance information is received and processed from one or more plants.

Such learning from peer site allows a forecast of asset degradation, in that one can see how components in one plant in a network age under certain conditions, and use that info to refine algorithms for others. This can be used for larger components, eg. turbines, refrigeration units, and the like, but also lower level components, like pipes or blades.

In addition, a particular plant may have one or more peer sites, that is, sites where conditions are similar enough that what is learned at one site may be applicable to the other sites. A collection of peer sites that is grouped together according to one or more criteria is a peer group. For example, cogeneration plants that are located in various parts of an agricultural area, where the plants are connected to facilities for keeping agricultural products chilled, could be one set of peer sites that is grouped in a peer group.

The criteria for including one or more sites in a peer group can be determined with various degrees of rigor, and the system can learn what criteria produce the best results for peer sites included in a group according to those criteria. For example, a peer group can be established based on the host site being a chilled facility, but the criteria may be further refined so that one peer group includes only host facilities that are chilled agricultural product facilities (or even one particular type of agricultural product facility) and another peer group includes only host facilities that are meat storage facilities (or even particular types of meat storage facilities, such as fish storage vs. beef storage). It will be appreciated that the criteria for inclusion in a peer group may be made as broad or narrow as desired, and that the system can learn and change over time to include more or fewer plants in a particular peer group, based on results using particular peer groups. The system can also set up any number of "thought experiments" where it virtually groups plants into peer groups but does not yet change any of the operating conditions at one plant based on the others, but instead predicts what would have happened should one or more criteria in one or members of the virtual group have been changed based on the behavior of one or more other members. If the results of such thought experiments indicate that a particular grouping would result in better performance at individual plants and/or in the system as a whole, the criteria for that grouping may be incorporated into actual groupings and actual changes of operating conditions at one or more plants. The system is capable of a virtually infinite number of such thought experiments, and may learn through modeling, empirically, or both, and in some cases may continually adjust peer groupings based on ever-changing and ever-refined groupings and results.

In addition, a plant may belong to more than one peer group, where the different peer groups are based on different criteria, and the control system can determine whether what is learned in one of a plant's peer groups is applicable to that particular plant or not. For example, one peer group may be based on size of turbine, or type of turbine, or size and type of turbine, and a plurality of plants with a particular size and/or type of turbine may belong to that particular peer group, which learns from its members, e.g., changes in performance curves over time in the plants that have been on-line the longest may be incorporated into control system processing systems for the other, younger plants to predict maintenance and repair behavior, and other characteristics, more precisely. A plant in one "turbine" peer group may also belong to other peer groups based on other criteria, e.g., plants located in hot areas with high chilling demands for their host sites, and learn from other plants for specific conditions for this peer group. A single plant may belong to 1, 2, 3, 4, 5, 6, 7, 8, 9, 10, or more than 10 peer groups and learn from one or more members of one or more of its peer groups, and adjust its control logic according to what is learned at the other plants. In addition or instead of the thought experiments described above, the system can perform actual experiments to determine how tight or loose the criteria are for a particular peer group to generate useful learning—for example, for a turbine peer group where members are plants with turbines in a range of particular sizes and of a particular type, the system can experiment to see whether expanding or contracting the range of sizes achieves a better or worse result for the peer group as a whole, or whether, e.g., adding more criteria to narrow the peer group is useful, e.g., the group might be narrowed to only include plants in areas with certain weather patterns. These are mere exemplary groupings to illustrate the concept of multiple and/or shifting peer groups, and it will be appreciated that the system may be set up to learn over time what peer groups provide optimal feedback, and that such learning will typically be continuous and shifting.

Thus, the profile for a particular cogeneration plant can change according to what is learned locally at its host site, what is learned at one or more peer sites, or a combination of both. In certain embodiments, some or all of the peer sites are sites within a network of cogeneration plants, and software updates based on changes of profile at one peer site may be shared with some or all of the other peer sites a particular peer group. This may be done automatically, e.g., automatic software updates, or manually, or a combination of both.

In certain embodiments, the control system learns from operator actions. The cogeneration plant will supply electrical power and/or thermal product and/or mechanical work product to one or more host sites. Typically at one or all of the host sites, the operator of the host site will have the ability to override the action that the control system has determined and cause the system to take another action or not take a particular action. In many cases, operator overrides occur with a certain pattern, e.g., the operator requests more or less electric power or more or less thermal product or more or less mechanical work product than the control system has determined, or a different time interval or ramp-up or ramp-down curve than the control system has determined, or the like, in a way that becomes predictable with enough overrides. For example, at a chilled facility, an operator may override the control system output that calls for actions to lead to a certain temperature in some or all of the facility, and the override temperature may be higher or lower than the control system temperature. The control system in these embodiments can sense overrides, detect the pattern, and adjust its processing to take into account the pattern. This can occur at a single plant, or multiple plants in a network, some or all of which may learn from operator actions, e.g., overrides, at the others. Additional information may also be used in the learning, for example, the control system may query the operator regarding conditions that prompted an override or other action. As a cogeneration plant or set of plants learns to predict the actual behavior of operators at one ore more of their host facilities, the control system may adjust to provide optimum performance given the actual pattern of operator demands. Such learning will typically be continuous and the results refined over time.

In certain embodiments, the control system may perform an experiment on one or more cogeneration plants. The experiments may be "thought experiments" or real experiments.

The system can also set up any number of "thought experiments" where it virtually groups plants into peer groups but does not yet change any of the operating conditions at one plant based on the others, but instead predicts what would have happened should one or more criteria in one or members of the virtual group have been changed based on the behavior of one or more other members. If the results of such thought experiments indicate that a particular grouping would result in better performance at individual plants and/or in the system as a whole, the criteria for that grouping may be incorporated into actual groupings and actual changes of operating conditions at one or more plants. The system is capable of a virtually infinite number of such thought experiments, and may learn through modeling, empirically, or both, and in some cases may continually adjust peer groupings based on ever-changing and ever-refined groupings and results.

In real experiments, for example in one or more cogeneration plants in a network, one or more outputs is changed to be different from the output of the current processing system, e.g., a turbine may be operated at a different level than called for by the current processing system, and the results evaluated to determine if the change in output produced a better or worse result than would have been expected from the current processing system output, for example, a higher or lower profit than would otherwise have occurred. It will be appreciated that, so long as customer agreements with the host facilities are met, such experiments may be conducted as often as desired by the operator of the cogeneration plant. The control system can then adjust the algorithms used by the processing system according to the results. In a network of cogeneration plants, a plant or a set of plants may be used for experiments to determine if certain changes can further optimize operations, and the results of at least some experiments will lead to less than optimal results for the plant or set of plants, as described herein for peer groups. The learning from experiments will ultimately optimize the operation of the network as a whole, as the results of successful experiments are incorporated into improvements in software which can be distributed virtually instantaneously to all plants in the network, or to subsets of plants, for example, to peer sites for the plant or plants at which the experiments were performed. Even the results of failed experiments can be used to further optimize operations by, e.g., changing probabilities used in forecasts, or by changing the weighting of one or more possible results from one or more scenarios being compared by the system, etc.

Other methods by which the control system may learn and/or improve its performance include, e.g., artificial intelligence, machine learning, and evolutionary algorithms.

The processing system is configured to determine the outputs that will cause a desired result, such as an optimal profit, or an optimal energy efficiency, for the cogeneration plant or plants, as described herein. Other desired results may include, e.g., lower carbon emissions, which may be useful to comply with regulations or to obtain revenues for carbon credits, e.g., in a cap and trade system (e.g., Europe) or other mechanism by which a plant gets money for lowering emissions. The same may be true for other emissions, such as pollutants. Although in certain embodiments the emissions credits may contribute to maximizing profits, in other embodiments the emissions credits have more weight and may in some cases be maximized or increased even at the expense of maximum profit.

The processing system may periodically update its control logic based on any or all of the learning methods described herein. The processing system may update its control logic an average of at least monthly, or at least biweekly, or at least weekly, or at least daily, or more than once per day. The processing system may also send out periodic updates to subsystems within individual cogeneration plants or sets of cogeneration plants, e.g., members of a peer group, based on learning by the processing system and/or based on other factors. This is the case especially when some plants have certain parts of the processing system within the plant itself.

Outputs

The outputs of the control system govern the action of one or more actuators or actuator systems at the cogeneration plant or plants under the control of the control system. Other outputs may be directed to a host facility or facilities, the operator or owner of the cogeneration plant, or any other suitable destination. In certain embodiments where one or more of the cogeneration plants to which outputs are directed is a plant assembled from modular transportable units, at least some of the actuators are part of one or more modular transportable units that have been assembled into the cogeneration plant.

The actuators to which output is directed may be any suitable actuator such as those described herein. These actuators may include on/off actuators as well as actuators that work over a continuum. Actuators may include one or more of actuators to control a flow rate, e.g., via a valve, a pump, a fan, etc., actuators to control an electrical signal, actuators to control mechanical systems, and the like. Actuators of the invention may include one or more of an actuator or actuator system for controlling a pre-cooler, an actuator or actuator system for controlling a turbine, an actuator or actuator system for controlling a heat recovery steam generator, an actuator or actuator system for controlling a thermal product carrier producer, an actuator for controlling a mechanical work product producer, an actuator or actuator system for controlling a cooling tower, an actuator or actuator system for controlling one or more distribution pumps, and, optionally, an actuator or actuator system for controlling a thermal energy storage product producer.

A control system of the invention may be configured to transmit any number of suitable outputs in a given time period. For example, a control system may be configured to transmit at least 6, at least 7, at least 8, at least 9, at least 10, at least 12, at least 14, at least 16, at least 18, at least 20, at least 50, at least 100, at least 200, at least 500, at least 1000, at least 2000, at least 5000, or at least 10,000 outputs, to a corresponding number of actuators, in a given time period, on average. The time period may be, e.g., a minute, 5 minute, 10 minutes, 30 minutes, an hour, or a day. For example, in certain embodiments a control system of the invention is configured to transmit an average of at least 20 outputs per 10 minute interval. In certain embodiments a control system of the invention is configured to transmit an average of at least 100 outputs per 10 minute interval. In certain embodiments a control system of the invention is configured to transmit an average of at least 200 outputs per 10 minute interval.

Control systems that control a network of cogeneration plants may be configured to transmit even more outputs in a given time period. For example, a control system that controls a network of cogeneration plants may be configured to transmit at least 20, at least 50, at least 100, at least 200, at least 500, at least 1000, at least 2000, at least 5000, at least 10,000, or at least 20,000 outputs to a corresponding number of actuators in a given time period, on average. The time period may be, e.g., a minute, 5 minutes, 10 minutes, 30 minutes, an hour, or a day. For example, in certain embodiments a control system of the invention for controlling a network of cogeneration plants is configured transmit an average of over 200 outputs per 10 minute interval. In certain embodiments a control system of the invention for controlling a network of cogeneration plants is configured transmit an average of over 1000 outputs per 10 minute interval. In certain embodiments a control system of the invention for controlling a network of cogeneration plants is configured transmit an average of over 2000 outputs per 10 minute interval.

In embodiments where the control system controls a cogeneration plant that is assembled from modular transportable units, the various necessary components for the control system that are required for the function of the control system, e.g. sensors for input to the control system from the cogeneration plant, and actuators or actuator systems for receiving outputs from the control system, are fully integrated into the modular transportable units from which the cogeneration plant is assembled, so that the fully assembled plant has the necessary sensors, actuators, and systems, connected in fully integrated workable assembly, to provide input to a controller and receive output from the controller to achieve an optimum result for the cogeneration plant, or for the network of cogeneration systems of which it is a part, e.g., an optimum profit. The modular transportable units are designed so that, in their final configuration in the fully assembled cogeneration plant, the control system is ready to use for optimum result, without substantial modification and preferably with no modification. The modular transportable units are also configured to receive input from outside sources, such as from the one or most host facilities, in a manner suited to optimizing the performance of the cogeneration plant.

In some cases, one or more of the host facilities has the capacity to install the necessary sensors and/or actuators to seamlessly integrate with the cogeneration plant, for example, if the host facility or facilities is built at the same time or after the cogeneration plant is built. In many cases, the host facility or facilities will already exist and the cogeneration plant will be required to retrofit or use existing sensors, actuators, and/or control systems. The appropriate modules of the cogeneration facility can be provided with suitable adaptors for adapting to the input, from the host facility or facilities, either as an integral part of the module or as one or more accessories that is chosen based on the particular host facility or facilities to which a unit is sent. In addition, a controller input adapter unit may be used to adapt inputs from the host facility to be suitable to be sent to the cogeneration plant controller, as well as to adapt outputs from the controller to be suitable for transmission to the host facility or facilities, given the particular configuration of the host facility or facilities. Packages of sensors, actuators, and or control systems may be also used by the supplier of the cogeneration plant as part of the package sent to the host site. Such packages may be made up of standard subunits kept in supply or readily accessible to the supplier, based on known or predictable configurations of host facility equipment.

IV. Networks of Cogeneration Systems

In certain embodiments the invention provides networks of cogeneration systems, where each system includes a cogeneration plant that is operably connected to a host facility or facilities that receive a thermal product and/or electrical power and/or mechanical work product from the plant, and a common controller for the cogeneration systems that receives inputs from more than one sensor at or near each of the cogeneration systems, processes the inputs to determine a plurality of outputs, and transmits the outputs to a plurality of actuators in the systems, whereby the operation of the network is optimized. Optimization of the network can include optimizing the profit for the network and/or optimizing the energy efficiency for the network, or part of the network.

In certain embodiments, at least one of the cogeneration plants in at least one of the cogeneration systems includes more than one operably connected modular transportable units in the assembled plant.

In certain embodiments, the network includes at least 2, 3, 4, 5, 6, 7, 8, 9, 10, or more than 10 cogeneration systems, such as at least 20 cogeneration systems, or at least 50 cogeneration systems, or at least 100 cogeneration systems. In certain embodiments, the network includes 2-5000 systems. In certain embodiments, the network includes 5-5000 systems. In certain embodiments, the network includes 10-5000 systems. In certain embodiments, the network includes 100-5000 systems. In certain embodiments, the network includes 100-5000 systems. In certain embodiments, the network includes at least 2, 3, 4, 5, 6, 7, 8, 9, 10, or more than 10 cogeneration systems where a cogeneration plant in each system includes a modular transportable unit, such as a plurality of modular transportable units that are operably connected into the final plant. It will be appreciated that the network may expand or contract, so that the exact number of plants in the network does not necessarily remain constant. The common controller may be configured to easily and automatically accommodate expansion or contraction in the number and type of cogeneration systems in the network, and to accommodate expansion or contraction in inputs and outputs.

The embodiments in which a cogeneration plant includes modular transportable units include any of the units and connections described herein, including any of the sensors and actuators that are part of the mobile transportable units. Thus, in certain embodiments, the common controller for the cogeneration network receives inputs from at least 1, 2, 3, 4, 5, 6, 7, 8, 9, 10, 15, 20, 25, 30, 50, 100, 150, 200, 250, 500, 1000, 5000, 10,000 or more than 10,000 sensors. In certain embodiments, the common controller is configured to receive and process inputs from at least 1, 2, 3, 4, 5, 6, 7, 8, 9, 10, 15, 20, 25, 30, 50, 100, 150, 200, 250, 500, 1000, 5000, 10,000 or more than 10,000 sensors. In certain embodiments the common controller is further configured to receive inputs from at least 1, 2, 3, 4, 5, 6, 7, 8, 9, 10, 15, 20, 25, 30, 50, 100, 150, 200, 250, 500, 1000, 5000, 10,000 or more than 10,000 sources that are not sensors. In certain embodiments the common controller is configured to transmit outputs to at least at least 1, 2, 3, 4, 5, 6, 7, 8, 9, 10, 15, 20, 25, 30, 40, 50, 60, 70, 80 90, 100, 120, 140, 160, 180, 200, 250, 300, 350, 400, 450, 500, 600, 700, 800, 900, 1000, 5000, 10,000 or more than 10,000 actuators. In certain embodiments, some or all of the sensors and actuators are configured to integrate into their particular cogeneration system, and into the control system for the network, with little or no modification.

Other attributes of the common control system for a network of cogeneration systems are as described previously for control systems in general, and any or all of these attributes may be present in a common control system for a given network of cogeneration systems.

In certain embodiments, one or more third party cogeneration plants, i.e., cogeneration plants owned by an entity other than the entity that owns the cogeneration plants in the network, or renewable generation plants, or other distributed energy plants may connect to the network. The third-party plant may be in one way communication with the network or two way communication with the network. One way communication may be either providing new data to the network without receiving network information, or receiving information from the network, e.g., receiving beneficial information from the network such as receiving such information in return for consideration, for example payment, without providing data to the network.

In one embodiment the invention provides a network of cogeneration systems where the network includes a first cogeneration system and a second cogeneration system, where the first cogeneration system includes a first cogeneration plant that includes a plurality of modular transportable units that are operably connected and a first host facility that receives electric power and/or a thermal product from the first cogeneration plant under a first agreement, and the second cogeneration system includes a second cogeneration plant that includes a plurality of modular transportable units that are operably connected and a second host facility that receives electric power and/or a thermal product from the second cogeneration plant under a second agreement, optionally a third host facility that receives mechanical work product from a third cogeneration system under a third agreement, and a common controller that contains a receiving system for receiving inputs from a plurality of sensors in a plurality of the modular transportable units in the first cogeneration plant and the second cogeneration plant, from the host facilities, and from external sources, a processing unit for processing the inputs to achieve a desired operating result, such as an optimal operating result for the network while meeting an obligation in the first agreement and an obligation in the second agreement, and a transmitting unit for transmitting a plurality of outputs to a plurality of actuators in a plurality of the modular transportable units in the first cogeneration plant and the second cogeneration plant so as to achieve the desired operating result, e.g., an optimal operating result for the network. The optimal operating result may be a result in a desired period of time, such as an average result over a week, a month, a quarter, more than one quarter, or a year. In certain embodiment, the optimal operating result for the network is an optimal profit for the network, e.g., the highest profit for the network. In certain embodiments, the optimal operating result is an optimal energy efficiency for the network or part of the network, e.g., a maximal energy efficiency.

The optimal result for the network may be achieved while one or more of the cogeneration systems does not achieve an optimal result. This can happen in a variety of ways. As described elsewhere herein, the control system may perform experiments at one or more of the cogeneration systems in the network in order to determine if a better or worse result is achieved by changing one or more operating conditions at the system(s); if the result is a worse result, the particular system may not achieve an optimum result but the rest of the network may be optimized to avoid the worse result and thus function overall at a more optimal level. In another example, it may be more profitable for the network as a whole to have one or more of the cogeneration plants supplied with a fuel, e.g., natural gas, under a single supply and/or hedging agreement that optimizes fuel costs for the network overall, even though the supply and/or hedging agreement may require a particular cogeneration plant to take the fuel at a price that is higher than a price that is locally available to the plant. In yet another example, multiple cogeneration systems may supply, e.g., a thermal product to the same end user, e.g., a company that operates several different cold storage facilities. The overall agreement with the end user, covering some or all of its commonly-owned facilities, may not provide for optimal operation of one or more plants within the group of commonly owned facilities, but the group as a whole may be operated to produce an optimal result for the group, e.g., an optimal profit.

In embodiments where the network include a group of cogeneration systems that are operated by a single end-user, part of the inputs and outputs of the control system may include inputs and outputs related to relationships between the facilities, to optimize the use of electrical power, thermal product, mechanical work product, or any combination thereof, so that the operator of the network achieves a better result and the end-user is not harmed and, preferably, also has an improved result. For example the network control system may link with the logistics function of the end-user to divert shipments between host facilities in such a way that the operations of the end-user are not harmed and, preferably, are improved, while at the same time the operations of the cogeneration network as a whole is improved.

In certain embodiments, the invention provides systems and methods for providing mechanical work to existing or new host facility systems.

VI. Combined Thermal Distribution and Storage Systems

In certain embodiments the invention provides systems and methods for storing thermal energy and distributing a thermal product carrier that includes (i) a thermal product carrier producer that produces a thermal product carrier; (ii) a distribution system that distributes the thermal product carrier to a facility that uses the thermal product carrier according to a need for a thermal product; and (iii) a controller operably connected to the distribution system and to the thermal product carrier producer, where the controller is configured to modulate the operation of a first part of the distribution system and a second part of the distribution system based on inputs from the facility and from the distribution system, such that that the energy required to provide the thermal product carrier to the facility that uses it according to the need for it is optimized.

In certain embodiments the invention provides systems and methods for storing chilling potential and distributing chilling potential that include (i) generating a chilled water product with a refrigeration unit in a cogeneration plant; (ii) transporting the chilled water product to a facility that requires a time-varying amount of chilling potential; (iii) distributing the chilled water product to one or more areas in the facility; (iv) running the chilled water product through a coil in the one or more areas of the facility; and (v) moving air in the one or more areas across the coil with a variable-speed fan; (vii) controlling the speed of the fan according to the chilling needs of the area, such that during low chilling need periods the fan runs slowly or is turned off, and during high chilling need periods the fan runs more quickly, and such that the chilled water product in the coil varies in temperature, thus storing chilling potential during low demand times and releasing it during high demand times.

In some of these embodiments, the thermal product carrier carrier, e.g., the chilled liquid, undergoes a phase change in part of the system, e.g., from liquid to solid, such as from liquid water to ice. In certain embodiments, the ice may comprise food-grade ice. A part of the system may be constructed so as to allow the phase change, e.g. constructed so as to allow the expansion from liquid water to ice, and to convert the thermal product carrier from one state to another and back again. In some embodiment the thermal product carrier, e.g. water, remains in a single phase, e.g., liquid water.

In certain embodiments the invention includes systems and methods for peak shifting a thermal product carrier producer load, such as a refrigeration unit load, by storing and releasing thermal energy from the thermal product carrier producer, e.g., refrigeration unit, in a distribution system for the thermal product carrier. In this way the thermal product carrier producer, e.g., refrigeration unit, can operate closer to its optimal operating load for more of the time than would otherwise occur. For example, the system and methods may allow a refrigeration unit to operate within a certain percentage of its most efficient operating load, e.g. within 5%, or 10%, or 20% of its most efficient operating load, for a certain average amount of time, e.g., at least 70%, at least 80%, or at least 90% of the time, on average, over a given time period, e.g. one month, two months, three months, or the like.

For example, in certain embodiments, the invention provides systems and methods for storing chilling potential and distributing chilling potential that include (i) a refrigeration unit that produces a chilled water product, wherein the refrigeration unit operates continuously at between 60-100% load at least 90% of the time; (ii) a refrigeration unit exit conduit that transports the chilled water product to a facility in need of chilled water product, wherein the conduit is operably connected to the refrigeration unit and to the facility; (iii) a distribution system within the facility, operably connected to the refrigeration unit exit conduit, that distributes the chilled water product to one or more areas in the facility in need of chilling; (iv) a heat transfer system operably connected to the distribution system, comprising a heat-conductive chilled water product conduit and a fan to move air across the heat-conductive chilled water conduit, for transferring heat from the area in need of chilling to the chilled water product, to produce a desired degree of chilling in the area, wherein the fan is a variable-speed fan; and (v) a collection system operably connected to the heat transfer system for collecting chilled water product exiting the heat transfer system; (vi) a refrigeration unit return conduit operably connected to the collection system and to the refrigeration unit, that transports chilled water product from the facility to the refrigeration unit; and (vii) a control system operably connected to the facility, the refrigeration unit, and the fans, where the control system is configured to (a) receive inputs from sensors that detect temperature in the facility, temperature of the chilled water product at various points in the system, load of the refrigeration unit, flow rates of the chilled water product at various points in the system, and fan speeds for the fans in the facility, and inputs from indicators of desired temperature in one or more areas of the facility; (b) calculate a fan rate, a flow rate for chilled water product, a load level for the refrigeration unit, a vent level for a thermal vent, or any combination thereof and (c) calculate a set point for a fan, a chilled water product valve, a thermal vent valve, a refrigeration unit load controller, or any combination thereof, based on the calculation of (b); and (d) output a signal or signals to adjust a fan speed, a chilled water product valve position, a load level for a refrigeration unit load controller, or any combination thereof.

The systems and methods taking advantage of the heat capacity of the thermal product carrier, its volume and, in some cases where part of the thermal product carrier undergoes a phase change, its heat of fusion or heat of vaporization.

The system and methods will be described in terms of a chilling system for a refrigerated facility but this is merely exemplary.

A cogeneration plant may provide chilling, carried by chilled water, to a refrigerated facility, where the chilled water is produced by one or more refrigeration units, output to the facility through one or more outlets, distributed to the facility through a distribution system that distributes the water to various parts of the facility, e.g. various rooms or areas, collected after it has moved through the facility into on or more input conduits and returned to the refrigeration unit or refrigeration units as one or more inputs. Individual areas receive the chilled water from the distribution system in one or more arrangements suitable to increase the heat transfer capacity from the air to the chilled water, e.g., as coiled pipes. One or more variable-speed fans is used to pass air across the coiled pipe to transfer heat from the air to the water inside the pipe, thus cooling the area. Individual areas or groups of areas are controlled by thermostats, which receive input on the air temperature in the area, and send output to the fans depending on the set point for the area. As long as the area remains at that desired temperature, the transfer of heat from the air to the chilled water may be accomplished by any combination of water temperature, water flow rate, and air flow rate.

In the systems and methods of this aspect of the invention, the refrigeration unit or refrigeration units that produce the chilled water are run at or near their optimal capacity for as much of the time as possible. During times when the refrigerated facility needs little or no cooling, e.g., at night or during cooler days or seasons, the variable speed fans are turned down or off by the control system, so that water in the distribution system is allowed to decrease in temperature as the refrigeration unit continues to cool it and little or no heat is transferred to it in the distribution system. The system may be configured so that at some minimum temperature, below which the chilled water will undergo a phase change to ice, the refrigeration unit rate or refrigeration unit rates is reduced, but up to that point the refrigeration unit or refrigeration units are allowed to operate at or near their optimal efficiency rates. The minimum temperature may be reduced by the addition of, e.g., glycol to the chilled water. This may occur in some cases on an ongoing basis, with glycol or water addition and bleeding occurring to keep the mixture at the proper concentration for the given conditions. The water acts as a buffer system and allows the refrigeration unit or refrigeration units to continue to run at a higher rate than they would otherwise run, e.g., if the chilling of the facility were controlled during times of low chilling demand by decreasing the rate of operation of the refrigeration units. Instead, variable speed fans are controlled to reduce heat transfer. The temperature to which the water is allowed to go is limited by the volume of water, the refrigeration unit rate, and the amount of additive, e.g., glycol, in the water. These factors combine to give a certain amount of buffering for "chilling potential," thus allowing the refrigeration unit or refrigeration units to run at a higher rate during low-demand periods, and allow chilling potential to be stored in water in the distribution system, and a lower rate during high-demand periods, when stored chilling potential is released from the water in the distribution system; thus the system and methods are peak-shifting methods for thermal product carrier producers, e.g., refrigeration units.

In some configurations a bypass unit may be included in the distribution system. The bypass unit may serve as a source of additional volume for the chilled water when the temperature of the water becomes low enough that, even with all fans off, the temperature of the air in one or more areas of the refrigerated facility may dip below the set point for that area or areas; the bypass unit serves as a volume that is not in thermal transfer contact with these areas where some or all of the chilled water output from the refrigeration unit may be directed until chilling demands of the area or area increase. In some cases the bypass unit may also include one or more areas where the chilled liquid may be allowed to become cold enough to undergo a phase change, e.g., water freezing to ice, and ice melting to water, to add additional heat storage capacity to the unit.

In some embodiments, the system and methods may utilize deliberate and controlled phase change in order to maximize thermal energy storage capacity. This can happen, e.g., in a bypass unit as described. It may also occur as, e.g., ice formation on coils in the facility, for example combined with a method of harvesting or melting the ice to recoup the thermal product.

Systems and methods may also include mechanisms for controlling for humidity and dew point.

In certain embodiments, a cogeneration system of the invention includes a subcontroller for utilizing a thermal product carrier distribution system and temperature maintenance system in the host facility to both distribute a thermal product carrier and to store thermal energy. The subcontroller may receive inputs for one, 2, 3, 4, 5, 6, 7, 9, 10 or more than 10, or more than 20, or more than 50, or more than 100, air temperatures within the host facility, inputs for set points for one, 2, 3, 4, 5, 6, 7, 9, 10 or more than 10, or more than 20, or more than 30, or more than 50, or more than 100 air temperatures within the host facility, and inputs for one, 2, 3, 4, 5, 6, 7, 9, 10 or more than 10, or more than 20, or more than 30, or more than 50, or more than 100 fan rates for variable speed fans within the host facility. The subcontroller may process the inputs to determine whether or not one or more of the set points should be altered, and, if so, by how much, in order to minimize perturbations in the rate of a refrigeration unit or refrigeration units in the cogeneration system, for example, to keep the refrigeration unit or refrigeration units within a certain percentage of its optimal efficiency operating rate for as much of the time as possible, on average. In certain embodiments, the subcontroller processes the inputs based on keeping the refrigeration unit or refrigeration units within a range that is 1, 2, 3, 4, 5, 6, 7, 8, 9, 10, 11, 12, 13, 14, 15, 16, 17, 18, 19, 20, 22, or 25% of the optimum efficiency percentage and the lower limit of the range is within 1, 2, 3, 4, 5, 6, 7, 8, 9, 10, 11, 12, 13, 14, 15, 16, 17, 18, 19, 20, 22, or 25% of the optimum efficiency percentage, generally for as much time as possible. These set points may include one or more set points for the fans in the facility, e.g., set points for 1, 2, 3, 4, 5, 6, 7, 8, 9, 10, 11, 12, 13, 14, 15, 16, 17, 18, 19, 20, or more than 20, or more than 30, or more than 50, or more than 100 fan rates for variable speed fans within the host facility, based at least in part on the range of percentages. The processing may be based, at least in part, on predicted alterations in one or more external temperatures at the host facility or facilities. The predicted alterations may be based on one or more of the time of day, the day of the year, a weather forecast, or a previous alteration in the external temperature, or any combination thereof. Inputs used to make the prediction may come from any suitable source, such as time keepers, databases, external weather prediction services, internal weather prediction services, and the like. The inputs to the processor, and its processing, may further include input regarding one or more inlet temperatures and/or inlet flow rates for one or more refrigeration units, one or more outlet temperatures and/or flow rates for one or more refrigeration units, one or more operating loads for one or more refrigeration units, and any other suitable inputs.

In certain embodiments, the control system for a cogeneration plant includes: (a) in its receiving system receivers for input from sensors that sense temperature in one or more areas of a facility to which the cogeneration plant distributes chilled water, and sensors that sense inlet and outlet temperatures and/or flow rates at the inlet and outlet for one or more refrigeration units; (b) a processing unit for processing the input from (a) to produce output to adjust actuators so that the thermal load of the refrigeration unit or refrigeration units is peak-shifted to a higher rate for a low chilling period and a lower rate for a high chilling period than would otherwise occur without the processing; and (c) in its transmitting system, transmitting units for transmitting the output from (b) to one or more actuators or actuating systems that control one or more of refrigeration unit output rate, and the rate of one or more variable-speed fans within the host facility that move air across one or more parts of the distribution system for the chilled water.

Such systems and method of storing thermal energy in a thermal product carrier distribution system may be incorporated into suitable systems and methods as described herein; e.g., the control system for any of the systems or methods described herein may include receiver for receiving inputs from the appropriate sensors in the appropriate facility, processing that includes appropriate logic for producing output, where the output goes to the appropriate actuators or actuator systems, e.g., actuators or actuator systems that control the speed of one or more variable speed fans, refrigeration unit output, and the like.

VII. Methods and Systems

In certain embodiments the invention provides a cogeneration system comprising: (i) a cogeneration plant operably connected to a host facility that receives a thermal or mechanical work product and, optionally, electrical power from the cogeneration plant under an agreement with the cogeneration plant, where the cogeneration plant comprises a plurality of operably connected modular transportable units; and (ii) a control system operably connected to the cogeneration plant comprising (a) a receiver system for receiving inputs from a plurality of sources of input wherein the sources of input comprise input from sensors in one or more of the modular units, inputs from the host facility, and inputs from indicators of market conditions, (b) a processor system operably connected to the receiver system for processing the inputs and determining outputs for modulating the activities of a plurality of actuators or actuator systems in one or more of the modular units achieve a desired result in the operation of the cogeneration plant based on the inputs and on the agreement; and (c) a transmitter system operably connected to the processor system for transmitting the outputs to the actuators or actuator systems. The output may include outputs based on one or more set points determined by the processor system. The desired result may be an optimum profit for the cogeneration plant. In certain embodiments the modular transportable units exist in a first form that is a transportable form and second form that is an assembled form, and the sensors and actuators are configured so that when the transportable forms are assembled into the assembled form, the sensors or actuators are ready to transmit inputs to and receive outputs from the control system without substantial modification, or in some cases with no modification, from the transportable form to the assembled form. In some cases, no modification is required.

In certain embodiments of the system, a thermal product is moved from the cogeneration plant to the facility by a heat transfer fluid (thermal product carrier), which in certain embodiments may comprise water or steam. In certain embodiments the heat transfer fluid (thermal product carrier) comprises a chilled water product, such as chilled water or ice, which may further comprises an additive, such as glycol.

In certain embodiments of the system, mechanical work is moved from the cogeneration plant to the facility by a compressed gas, such as a refrigerant, e.g., ammonia, or such as compressed air.

In certain embodiments of the system, the cogeneration plant comprises at least 4 modular transportable units.

The host facility may receive electrical power from the cogeneration plant under the agreement.

The cogeneration plant may comprise an electrical generating system operably connected to a heat transfer unit, such as a heat recovery steam generator (HRSG), such as where the electrical generating system is contained in at least a first modular transportable unit and the heat transfer unit, such as a HRSG, is contained in at least a second modular transportable unit. The cogeneration plant may further comprise a thermal product carrier producer operably connected to the heat transfer unit, e.g., HRSG, in some cases the thermal product carrier producer is contained in at least a third modular transportable unit. The system may further comprise a cooling tower or towers, air intake unit, and an exhaust stack, wherein the cooling tower or towers, air intake unit, and stack are operably connected with the electrical generating system, the HRSG, and the thermal product carrier producer, if present. In some cases, at least one of the cooling tower, air intake unit, or exhaust unit is contained in at least a fourth modular transportable unit. The thermal product carrier producer comprises a refrigeration unit, such as a steam-driven compression type refrigeration unit. The electrical generator may comprise a gas turbine generator, such as a natural gas-driven turbine. The system may also comprise a mechanical work product producers operably connected to the HRSG; in some cases the mechanical work product producer is contained in an additional modular transportable unit. The mechanical work product producer may comprise one or more steam turbine driven gas compressors such as screw compressors or centrifugal compressors that produce a compressed gas. The compressed gas may be, e.g., a refrigerant such as ammonia and optionally ties in to an existing or new external refrigeration system at the host facility; for example, the cogeneration plant receives low pressure refrigerant gas from the host via a low pressure tie-in and returns high pressure refrigerant gas via a high pressure tie-in. The low pressure gas tie-in may be upstream of an existing electric motor driven compressor system and the high pressure gas tie-in may be downstream of the existing electric motor driven compressor system, and the resulting piping configuration may effectively bypass an existing compressor system. In such embodiments, the existing electric motor driven compressors may remain in place as peaking units and/or standby purposes.

In some embodiments of the system, one or more of the modular transportable units may comprise a system for controlling emission of at least 1, 2, 3, 4, 5, or all of NOx, NH3, SOx, CO, CO2, or particulates.

In certain embodiments, the sensors in one or more of the modular units comprise a sensors for 2, 3, 4, 5, 6, 7, 8, or more than 8 of sensing a HRSG exhaust temperature, a steam flow rate, a generator output, an exhaust temperature, a thermal product carrier outlet temperature, a thermal product carrier inlet temperature, a thermal product carrier outlet flow rate, a thermal product carrier inlet flow rate, a mechanical work product carrier outlet flow rate, a mechanical work product carrier inlet flow rate, and/or at least one of a NOx, NH3, SOx, CO, CO2, particulate, or O2 emission.

In certain embodiments, the actuator or actuator systems control one or more of (i) a temperature within the cogeneration plant, the first facility, or the second facility, (ii) a pressure within the cogeneration plant, the first facility, or the second facility (iii) a flow of a raw material (iv) an exhaust flow (v) a waste flow (vi) a thermal product carrier flow (vii) an electrical power flow (viii) a utility input, (ix) a supply input, x) a state of operation of a first thermal product carrier producer, for example a refrigeration unit, (xi) a state of operation of a second thermal product carrier producer, for example a second refrigeration unit, (xiii) a state of operation of a turbine, (xii) a state of operation of a turbine precooler, (xiv) a state of operation of a duct burner (xv) a state of operation of a mechanical work product producer, or (xvi) any combination thereof.

In certain embodiments the actuators or actuator systems comprise 1, 2, 3, 4, 5, 6, or 7 of an actuator or actuator system for controlling a pre-cooler, an actuator or actuator system for controlling a turbine, an actuator or actuator system for controlling a heat recovery steam generator, an actuator or actuator system for controlling a carrier producer, an actuator or actuator system for controlling a cooling tower, an actuator or actuator system for controlling one or more distribution pumps, and, optionally, an actuator or actuator system for controlling a thermal energy storage product producer.

In some systems, the receiver is configured to receive inputs indicating one or more environmental conditions at or near the cogeneration plant, such as environmental conditions that comprise at least 1, 2, 3, 4, 5, or 6 conditions from the set of conditions comprising temperature, humidity, wind speed, wind direction, time of day, and air pressure.

If the controller/receiver is configured to receive inputs regarding market conditions, in some cases the market conditions may comprise 1, 2, 3, 4, 5 or all of a price for a fuel for the cogeneration plant, a price for electrical energy exported from the cogeneration plant, a price for imported electrical energy to the cogeneration plant, a price for an incentive for the cogeneration plant, a price for a demand response action, a price for a thermal product produced by the cogeneration plant, a price for a mechanical work product produced by the cogeneration plant, a price for water, and/or a price for a variable maintenance price.

In some cases the inputs from the host facility may comprise an electrical energy demand, a thermal product demand, a thermal product carrier flow rate, a mechanical work product demand, a mechanical work product carrier flow rate, an air temperature, a thermal product carrier temperature, a fan rate, a humidity, a set point for an air temperature, a set point for a thermal product carrier temperature, or any combination thereof.

In certain embodiments, the control system is configured to receive inputs from an operator of the host facility as described herein, such as inputs from an interface for the operator to input desired alterations in scheduling, etc.

In certain embodiments, the control system is configured to forecast and/or learn in any manner as described herein. For example, in certain embodiments, the control system is configured to make a forecast of one or more future conditions of one or more inputs, expenses, revenues, or any combination thereof, for one or more future timepoints, and adjusting the determination of the output based on the prediction. In certain embodiments, the determining of step (ii) is modulated or not modulated based on a result of a past determination for an output, or a plurality of results of a plurality of determinations for a plurality of outputs. In some cases, the determining of step (ii) is modulated or not modulated based on an input or plurality of inputs from an operator of the host facility, such as an override or a plurality of overrides of an output or plurality of outputs from the control system. Such forecast and learning functionalities are described in more detail elsewhere herein.

In certain embodiments the control system includes a subcontrol system for utilizing a thermal product carrier distribution system and temperature maintenance system to both distribute a thermal product carrier and to store thermal energy, as described herein. For example, in certain embodiments the subcontroller receives inputs for one, 2, 3, 4, 5, 6, 7, 9, 10 or more than 10 air temperatures within the host facility, inputs for set points for one, 2, 3, 4, 5, 6, 7, 9, 10 or more than 10 air temperatures within the host facility, and inputs for one, 2, 3, 4, 5, 6, 7, 9, 10 or more than 10 fan rates within the host facility. The subcontroller controls fan rates and/or thermal product carrier producer loads to keep the thermal product carrier producer operating at or near a certain percentage of its optimal operating load. The subcontroller is described further elsewhere herein.

In certain embodiments, part or all of the control system is at a location remote from the cogeneration plant and host facility, e.g., part or all of the control system is Web-based.

In certain embodiments, the system is configured to operate over a three month, four month, five month, six month, 8 month, 10 month, or 12 month period at an average efficiency of at least 80, 81, 82, 83, 84, 85, 87, 88, 89, 90, 91, 92, 93, 94, or 95% when the host facility electrical power demand and/or the host facility thermal product demand and/or mechanical work product demand vary by at least an average of 5, 6, 7, 8, 9, 10, 11, 12, 13, 14, 15, 16, 17, 18, 19, 20, 22, 25, 27, 30, 32, 35, 37, 40, 45, 50, 55, 60, 65, 70, 75, 80, 85, 90, 95, or 100% daily during the period. It will be understood that the percent variation is calculated as the percent of the highest demand that is represented by the lowest demand.

In certain embodiments the system is part of a cogeneration network comprising a plurality of cogeneration systems as described above. In this case, the desired result of the operation of a cogeneration plant within the network is designed to help achieve a desired result for the operation and/or maintenance of the network, such as to help optimize the operation and/or maintenance of the network, e.g. to optimize a profit and/or energy efficiency for the network.

In certain embodiments the invention provides a method for achieving a desired result during a time period for a modular cogeneration plant comprising (i) receiving inputs from (a) a cogeneration plant, wherein the cogeneration plant comprises a plurality of modular transportable units; (b) a first facility to which the cogeneration plant is obligated to provide electrical power under a first agreement and a second facility to which the cogeneration plant is obligated to provide a thermal product under a second agreement, (c) indicators of expenses or potential expenses for the cogeneration plant, and (d) indicators of revenues or potential revenues for the cogeneration plant; (ii) determining an output to modulate the activity of an actuator in the cogeneration plant, the first facility, the second facility, or any combination thereof, based on the inputs and on the first agreement and the second agreement, wherein the output is determined to achieve a desired result in the time period for the operation of the cogeneration plant; and (iii) transmitting the output to the actuator or actuator system to modulate the activity of the actuator or actuator to approach the desired result; whereby the desired result for the cogeneration plant in the time period is achieved. The desired result is, in certain embodiments, an optimal profit for the cogeneration plant in the time period. The time period is, in certain embodiments, In certain embodiments of the method, a plurality of the inputs from the cogeneration plant are from sensors in the modular transportable units of the cogeneration plant, wherein the modular transportable units exist in a transportable form and in an assembled form, and wherein the sensors are configured to be fully operational in the assembled form with no substantial modification from the transportable form, as described elsewhere herein, e.g., the sensors are configured to be fully operational in the assembled form with no modification from the transportable form. The sensors may be any suitable sensors as described herein.

In certain embodiments of the method, where the output is an output to an actuator or actuator system in a modular transportable unit of the cogeneration plant, and where the modular transportable units exist in a transportable form and in an assembled form, the actuator or actuator system is configured to be fully operational in the assembled form with no substantial modification from the transportable form, as described elsewhere herein, e.g., to be fully operational with no modification. The actuators may be any suitable actuators or actuator systems as described herein.

In certain embodiments of the method, the cogeneration plant is part of a network of cogeneration systems, as described herein. In these methods the desired result may be a desired result for the cogeneration network and not necessarily the cogeneration plant itself, such as an optimum profit for the cogeneration network.

In certain embodiments, the control system is configured to forecast as described herein, and/or to learn, as described herein, such as to learn from operator overrides of outputs of the control system, or any other suitable form of learning as described herein.

In certain embodiments part or all of the control system is remote from the cogeneration plant.

In certain embodiments the invention provides a cogeneration system comprising a cogeneration plant operably connected to a host facility to which the cogeneration plant supplies a thermal or mechanical work product and, optionally, electrical power, and control system operably connected to the cogeneration plant and the facility, wherein the control system comprises: (i) a receiver system for receiving inputs from a plurality of sources of input wherein the sources of input comprise input from sensors in one or more of the modular units, inputs from the host facility, and inputs from indicators of market conditions, (ii) a processor system operably connected to the receiver system for processing the inputs and determining outputs for modulating the activities of a plurality of actuators or actuator systems in the cogeneration plant achieve a desired result in the operation of the cogeneration plant based on the inputs and on the agreement, wherein the processor system is configured to learn from an outcome of one or more previous outputs and adjust the determining of future outputs based on the learning, or on an override of an output or a plurality of overrides of outputs by an operator of the host facility, or a combination thereof; and (iii) a transmitter system operably connected to the processor system for transmitting the outputs to the actuators or actuator systems.

In certain embodiments of these systems, the system comprises a plurality of cogeneration plants operably connected to a plurality of host facilities, where the control system is a common control system for the plurality of cogeneration plants, and further where the learning comprises learning from an outcome of an output at a first cogeneration plant in the plurality of cogeneration plants and applying the learning to the determining step for an output for a second cogeneration plant in the plurality of cogeneration plants, where the first and the second cogeneration plants are different.

In certain embodiments the sensors and/or actuators or actuator system are part of modular transportable units, as described elsewhere herein, such as sensor and/or actuators that require no substantial modification to be fully operable when the units are converted from transportable to assembled forms.

In certain embodiments the invention provides a cogeneration system comprising a cogeneration plant that is operably connected to a host facility to which the cogeneration plant provides a thermal or mechanical work product and electrical power at a host site under an agreement, wherein the cogeneration plant comprises (i) a set of operably connected modular transportable units that comprises (a) a first modular transportable unit comprising a natural gas-fired turbine generator with a maximum power output of between 1 and 40 MW, (b) a second modular transportable unit comprising a HRSG for utilizing the exhaust gases of the turbine to generate steam and further comprising an emissions control unit to control NOx emissions, operably connected to the turbine, and (c) a third transportable unit comprising an exhaust stack unit with integrated emissions monitoring for NOx, operably connected to the HRSG; wherein the modular transportable units exist in a transportable form that is suitable for transport on an ordinary roadway and in an assembled form that is fixed at the host site, and wherein the first, second and third modular transportable units each comprise at least one sensor and at least one actuator or actuator system, wherein the sensors are configured to transmit inputs to a control system for controlling the cogeneration plant and the actuators are configured to receive an output from the control system, with no substantial modification from their configurations in the transportable units to their configuration in the assembled units; and (ii) the control system that comprises (a) a receiver system that receives inputs from the sensors in the modular units, signals from sensors in the host facility, signals from ambient environmental sensors, inputs from markets for natural gas, inputs from power markets, inputs from forecast systems that comprise a weather forecast system and a price forecast system, and inputs from an interface through which the operator of the host facility may enter changes in upcoming conditions at the host facility; (b) a processing system operably connected to the receiver system for processing the inputs and determining outputs for modulating the activities of a plurality of actuators or actuator systems in one or more of the modular units, wherein the plurality of actuators or actuator systems comprises the actuator or actuator systems in the first, third, and fourth modular transportable units, to achieve a desired result in the operation of the cogeneration plant based on the inputs and on the agreement; and (c) a transmitter system operably connected to the processor system for transmitting the outputs to the actuators or actuator systems; wherein the control system is at least partially Web-based and is configured to learn from an outcome of one or more previous outputs and adjust the determining of future outputs based on the learning, or on an override of an output or a plurality of overrides of outputs by an operator of the host facility, or a combination thereof.

In certain embodiments of the cogeneration system the first, second and third modular transportable units are different. In certain embodiments, the cogeneration plant further comprises one or more additional modular transportable units comprising a steam-driven compression refrigeration unit, operably connected to the HRSG. In certain embodiments the cogeneration system further comprises a sixth modular transportable unit comprising a cooling tower, operably connected to the refrigeration unit In certain embodiments the invention comprises steam turbine driven compressors to provide mechanical work such as compression.

In certain embodiments the invention provides a method of manufacturing a modular cogeneration plant comprising (i) transporting a set comprising a plurality of modular transportable units to a host site comprising a host facility that requires a thermal product and/or mechanical work product and, optionally, electrical power from the cogeneration plant, wherein (a) each of the modular transportable units contains one or more components, or parts of one or more components, of the cogeneration plant, and the components comprise a generator, a heat transfer unit, an air intake unit, and an exhaust unit; (b) the modular transportable units exist in a transportable form and an assembled form; and (c) at least two of the modular transportable units comprise at least one sensor and at least one actuator or actuator system, wherein the sensors are configured to transmit inputs to a control system for controlling the cogeneration plant and the actuators are configured to receive an output from the control system, with no substantial modification from their configurations in the transportable units to their configuration in the assembled units; and (ii) assembling the modules into a complete cogeneration plant wherein the modules are operably connected to provide a functioning cogeneration plant under the control of the control system, wherein the cogeneration plant is configured to provide the thermal product and/or mechanical work product and, optionally, electrical power to the host facility under an agreement between a provider of the cogeneration plant and a provider of the host facility.

In certain embodiments of the method, the components of the cogeneration plant contained in the modular transportable units further comprise a refrigeration unit and a cooling tower for the refrigeration unit; in certain embodiments the modular transportable units further comprise pumps.

In certain embodiments of the method the control system also receives inputs from the host facility and from external sources and determines outputs for the actuators to achieve a desired result for the operation of the cogeneration plant over a period of time based on the inputs from the sensors, the host facility, and the external sources, and on the agreement.

In certain embodiments the set of modular transportable units comprises at least 2, 3, 4, 5, 6, 7, or more than 7 modular transportable units. In certain embodiments, the number of modular transportable units is determined, at least in part, by the thermal and/or electrical power agreed to be provided from the cogeneration plant to the facility.

In certain embodiments of the method, the cogeneration plant is capable of supplying 1-40 MW of electrical power to the host facility.

In certain embodiments, the method further comprises production of the agreement between the provider of the cogeneration plant and the provider of the host facility e.g., where the agreement is produced at least in part by selection of a plurality of financial modules by the host facility from a menu of financial modules. In certain embodiments, the financial modules comprise a module for financing, a module for a lower electrical demand limit, a module for an upper electrical demand limit, a module for a lower thermal product demand limit, a module for an upper thermal product demand limit, a module for lower mechanical work product demand limit, a module for upper mechanical work product demand limit, a module for average mechanical work product demand, a module for average electrical demand, a module for average thermal product demand, or a price limit module, or any combination thereof.

In certain embodiments, the modular transportable units may be drawn from subsets of modular transportable unit and the set assembled according to the requirements of the agreement. Subsets of modular transportable units are as described herein.

In certain embodiments of the method, the set of modular transportable units comprises at least two of: a first module comprising an electrical generator; a second module comprising a heat recovery steam generator (HRSG); a third module comprising an exhaust stack; a fourth module comprising a component of a cooling tower; a fifth module comprising one or more pumps; a sixth module comprising at least one air intake unit; and a seventh module comprising a thermal product carrier producer; wherein at least one of the modules is different from at least one of the other modules. In certain embodiments the set of modular transportable units comprises at least three, at least four, at least five, at least six, or all seven of the abovementioned modules. In certain embodiments, the first module and the second module are the same module. Other combinations of components, as described herein, may be used in other embodiments. In certain embodiments the electric generator comprises an internal combustion engine, a steam turbine, or a natural gas turbine, e.g., in certain embodiments the electric generator comprises a natural gas turbine. In certain embodiments the HRSG comprises a HRSG.

In certain embodiments of the method, the modular transportable units comprise at least 2, 3, 4, 5, 6, 7, 8, 9, 10, 11, 12, 13, 14, 15, 16, 17, 18, 19, 20, 22, 25, 30, 35, 40, 45, 50, 60, 70, 80, 90, 100, or more than 100 sensors to transmit inputs to the control system, wherein the sensors are configured to transmit the inputs with no substantial modification from their configurations in the transportable units to their configurations in the assembled units. The sensors may be any sensors as described herein, such as one or more sensors for a temperature, one or more sensors for a pressure, one or more sensors for a volume, one or more sensors for a first or a second state of one or more units that can exist in the first or the second state, one or more sensors for a power generation level, one or more electrical sensors, one or more acoustical sensors, one or more optical sensors, one or more chemical detection sensors, one or more pH sensors, one or more electrical potential sensors, or one or more current sensors, or any combination thereof. For example, in certain embodiments the sensors comprise a HRSG exhaust temperature sensor, a steam flow rate sensor, a generator output sensor, an exhaust temperature sensor, a thermal product carrier outlet temperature sensor, a thermal product carrier inlet temperature sensor, a thermal product carrier outlet flow rate sensor, a thermal product carrier inlet flow rate sensor, or at least one of a NOx, SOx, CO, CO2, particulates, or O2 emission sensor, or any combination thereof.

In certain embodiments of the method, the actuators or actuator systems comprise 1, 2, 3, 4, 5, 6, or 7 of an actuator or actuator system for controlling a pre-cooler, an actuator or actuator system for controlling an electrical generator, e.g., a turbine, an actuator or actuator system for controlling a heat recovery steam generator, an actuator or actuator system for controlling a thermal product carrier producer, an actuator or actuator system for controlling a cooling tower, an actuator or actuator system for controlling one or more distribution pumps, and, optionally, an actuator or actuator system for controlling a thermal energy storage product producer.

In certain embodiments, the inputs from the host facility comprise an electrical energy demand, a thermal product carrier demand, a thermal product carrier flow rate, an air temperature, a thermal product carrier temperature, a fan rate, a humidity, a set point for an air temperature within the host facility, or a set point for a thermal product carrier temperature, or any combination thereof. In certain embodiments, the external sources comprise sources about one or more market conditions, such as conditions for one or more local markets at the cogeneration plant location. In certain embodiments, the market conditions comprise 1, 2, 3, 4, 5, 6, or all of a price for a fuel, e.g., natural gas, for the cogeneration plant, a price for electrical energy exported from the cogeneration plant, a price for imported electrical energy to the cogeneration plant, a price for an incentive for the cogeneration plants, a price for a thermal product carrier produced by the cogeneration plant, a price for water for the cogeneration plant, and/or a price for a variable maintenance contract for the cogeneration plant. In certain embodiments, the incentives comprise one or more of an incentive for meeting a target.

In certain embodiments, the external sources of input to the control system comprise sources of information about environmental conditions, such as a temperature, a humidity, a wind speed, a wind direction, a time of day, a day of the year, or an air pressure, or any combination thereof.

In certain embodiments, the receiver further receives input indicating a desired future modulation in the conditions of the host facility for example an input indicating a desired future modulation is inputted from an interface for interaction between the system and an operator of the host facility.

In certain embodiments of the method the control system is configured to forecast determines a change or no change for one or more of the outputs for one or more of the actuators based at least in part on a forecast step, such as a forecast step that forecasts a future value or range of values for 1, 2, 3, 4, 5, 6, 7, 8, 9, 10, or more than 10 of a fuel price, an electricity export price, an electricity import price, an ambient environmental condition, an emissions limit, an incentive for the cogeneration plant, a price for a thermal product, a price for water, an electrical demand from the host facility, a thermal product demand from the host facility. In certain embodiments, the forecast step forecasts a probability for the occurrence of one or more of the future values or range of values. Further embodiments of forecast steps are as described herein.

In certain embodiments, the control system the control system adjusts the determining of a change or no change in the one or more outputs on one or more of outcomes from one or more past outputs to the cogeneration plant. This may be done in any manner as described herein.

In certain embodiments of the method, the control system comprises a subcontroller for utilizing a thermal product carrier distribution system and temperature maintenance system that are at least partially located in the host facility to both distribute a thermal product carrier and to store thermal energy. Inputs and outputs for the subcontroller and processing methods are as described elsewhere herein.

In certain embodiments of the method, the cogeneration plant is configured to operate over a three month, four month, five month, six month, 8 month, 10 month, or 12 month period at an average efficiency of at least 80, 81, 82, 83, 84, 85, 87, 88, 89, 90, 91, 92, 93, 94, or 95% when the host facility electrical power demand and/or the host facility thermal product demand vary by at least an average of 5, 6, 7, 8, 9, 10, 11, 12, 13, 14, 15, 16, 17, 18, 19, 20, 22, 25, 27, 30, 32, 35, 37, 40, 45, 50, 55, 60, 65, 70, 75, 80, 85, 90, or 95% daily during the period.

In certain embodiments of the method, the control system is at least partially Web-based. In certain embodiments the input is transmitted from at least one of the sensors to the control system wirelessly, for example all of the inputs are transmitted wirelessly. In certain embodiments, one or more of the outputs is transmitted from the control system to an actuator wirelessly, for example, all of the outputs are transmitted wirelessly.

In certain embodiments of the method, a cogeneration network is established including installing a plurality of cogeneration systems according to any of the embodiments above or combination of embodiments. In certain embodiments, the optimization of the operation of a cogeneration plant, or a plurality of cogeneration plants, or all of the cogeneration plants, within the network is designed to help optimize the operation of the network, such as to optimize a profit and/or energy efficiency for the network.

In certain embodiments the invention provides a cogeneration network comprising (i) a plurality of cogeneration systems, wherein each cogeneration system comprises a cogeneration plant operably connected to a host facility that receives a thermal product and, optionally, electrical power from the cogeneration plant, and wherein at least one of the cogeneration plants comprises a plurality of operably connected modular transportable units; and (ii) a common controller for optimizing the operation and/or maintenance of the cogeneration network that is operably connected to the plurality of cogeneration systems wherein the common controller (a) receives inputs from a plurality of sensors in or near each of the plurality of cogeneration systems; (b) processes the inputs to determine a plurality of outputs, and (c) transmits the outputs to a plurality of actuators in the plurality of cogeneration systems, whereby the operation of the network of cogeneration systems is optimized.

In certain embodiments, the network comprises at least 2, 3, 4, 5, 6, 7, 8, 9, 10 or more than 10 cogeneration systems.

In certain embodiments, at least 2, 3, 4, 5, 6, 7, 8, 9, 10 or more than 10 of the cogeneration systems comprise a plurality of operably connected modular transportable units. The units may be any suitable units as described herein.

In certain embodiments, the sensors comprise sensors in the cogeneration plants, sensors in the host facilities, sensors for the environment at or near one or more of the cogeneration plants and/or host facilities, or sensors for operable connections between one or more of the cogeneration plants and it host facility, or any combination thereof. In certain of these embodiments, the sensors for the environment at or near one or more of the cogeneration plants comprise sensors for temperature, humidity, wind speed, wind direction, time of day, day of the year, air pressure, or any combination thereof.

In certain embodiments, the common controller further receives input from one or more of the host facilities in one or more of the cogeneration systems, wherein the input comprises an electrical energy demand, a mechanical work product demand, a thermal product demand, a thermal product carrier flow rate, an air temperature, a thermal product carrier temperature, a fan rate, a humidity, a set point for an air temperature, a set point for a thermal product carrier temperature, or any combination thereof, or any other input as described herein.

In certain embodiment, the common controller further receives inputs from indicators of market conditions. In certain embodiments, the inputs of market conditions comprise inputs for local markets at the one or more cogeneration systems. In certain embodiments, the market conditions comprise 1, 2, 3, 4, 5 or all of a price for a fuel for at least 1, 2, 3, 4, 5 or more than 5 of the cogeneration plants, a price for electrical energy exported from for at least 1, 2, 3, 4, 5 or more than 5 of the cogeneration plants, a price for imported electrical energy to at least 1, 2, 3, 4, 5 or more than 5 of the cogeneration plants, a price for an incentive for at least 1, 2, 3, 4, 5 or more than 5 of the cogeneration plants, a price for a thermal product produced by for at least 1, 2, 3, 4, 5 or more than 5 of the cogeneration plants, a price for water for at least 1, 2, 3, 4, 5 or more than 5 of the cogeneration plants, and/or a price for a variable maintenance price for at least 1, 2, 3, 4, 5 or more than 5 of the cogeneration plants.

In certain embodiments of the network, the common controller receives inputs from at least 1, 2, 3, 4, 5, 6, 7, 8, 9, 10, 15, 20, 25, 30, 50, 100, 150, 200, 250, 500, 1000, or more than 1000 sensors, for example more than 5000 sensors. The sensors in some embodiments are located in at least 2, 3, 4, 5, 6, 7, 8, 9, 10 or more than 10 cogeneration systems. The sensors may be any type of sensor as described herein. In certain embodiments, the sensors in one or more of the cogeneration systems comprise sensors for 2, 3, 4, 5, 6, 7, 8, or more than 8 of sensors for sensing a HRSG exhaust temperature, a steam flow rate, a generator output, an exhaust temperature, a thermal product carrier outlet temperature, a thermal product carrier inlet temperature, a thermal product carrier outlet flow rate, a thermal product carrier inlet flow rate, at least one of a $NO_x$, $SO_x$, $CO$, $CO_2$, particulate, or $O_2$ emission.

In certain embodiments of the network, the actuators or actuator systems in a cogeneration plant of the system comprise 1, 2, 3, 4, 5, 6, or 7 of an actuator or actuator system for controlling a pre-cooler, an actuator or actuator system for controlling a turbine, an actuator or actuator system for controlling a heat recovery steam generator, an actuator or actuator system for controlling a thermal product carrier producer, an actuator or actuator system for controlling a cooling tower, an actuator or actuator system for controlling one or more distribution pumps, and, optionally, an actuator or actuator system for controlling a thermal energy storage product producer.

In certain embodiments of the network, the controller transmits outputs to at least 1, 2, 3, 4, 5, 6, 7, 8, 9, 10, 15, 20, 25, 30, 50, 100, 150, 200, 250, 500, 1000, or more than 1000 actuators in the plurality of cogeneration plants of the network. In certain embodiments, the controller transmits outputs to an average of at least 2, 3, 4, 5, 6, 7, 8, 9, 10, 15, 20, 25, 30, or more than 30 actuators per cogeneration system.

In certain embodiments of the network, the common controller further receives input indicating a desired future modulation in a condition of at least 1, 2, 3, 4, 5, 7, 10, 12, or more than 12 host facilities, such as a desired future modulation that is inputted from an interface for interaction between the system and an operator of the host facility.

In certain embodiments of the network, the modular transportable units of one of the cogeneration plants comprise a modular transportable unit comprising an electrical generator, a modular transportable unit comprising a heat recovery steam generator (HRSG), a modular transportable unit comprising a thermal product carrier producer, a modular transportable unit comprising a cooling tower, a modular transportable unit comprising an exhaust stack, or a modular transportable unit comprising a an air intake unit, or any combination thereof.

In certain embodiments of the network, at least two of the cogeneration plants comprise modular transportable units wherein for each of the two plants the modular transportable units comprise a modular transportable unit comprising an electrical generator, a modular transportable unit comprising a heat recovery steam generator (HRSG), a modular transportable unit comprising a thermal product carrier producer, a modular transportable unit comprising a cooling tower, a modular transportable unit comprising an exhaust stack, or a modular transportable unit comprising a an air intake unit, or any combination thereof.

In certain embodiments of the network, at least two of the cogeneration plants comprise modular transportable units wherein for each of the two plants the modular transportable units comprise at least two of a modular transportable unit comprising an electrical generator, a modular transportable unit comprising a heat recovery steam generator (HRSG), a modular transportable unit comprising a thermal product carrier producer, a modular transportable unit comprising a cooling tower, a modular transportable unit comprising an exhaust stack, or a modular transportable unit comprising a an air intake unit, or any combination thereof.

In certain embodiments of the network, at least two of the cogeneration plants comprise modular transportable units wherein for each of the two plants the modular transportable units comprise at least three of a modular transportable unit comprising an electrical generator, a modular transportable unit comprising a heat recovery steam generator (HRSG), a modular transportable unit comprising a thermal product carrier producer, a modular transportable unit comprising a cooling tower, a modular transportable unit comprising an exhaust stack, or a modular transportable unit comprising a an air intake unit, or any combination thereof.

In certain embodiments of the network the processing of step (ii)(b) comprises a forecast step, e.g., as described herein. In certain embodiments, the forecast step forecasts a future value or range of values for 1, 2, 3, 4, 5, 6, 7, 8, 9, 10, or more than 10 of a fuel price, an electricity export price, an electricity import price, an ambient environmental condition, an emissions limit, an incentive for the cogeneration plant, a price for a thermal product, a price for water, an electrical demand from a host facility, a thermal product demand from a host facility, wherein the future value is a value for at least one of the cogeneration systems. In certain embodiments, the future value or range of values is a value or range of values for at least 2, 3, 4, 5, 6, 7 8, 9, 10, 12, 15, 20, or more than 20 of the cogeneration systems. In certain embodiments, the forecast step forecasts a probability for the occurrence of one or more of the future values or range of values. In certain embodiments, the processing step comprises determining a change in one or more set points for one or more the actuators based at least in part on one or more of the forecast values or range of values.

In certain embodiments, the control system adjusts the processing step based on one or more of the results of a previous output, such as a result stored in the data storage unit, to improve the function of the network in the future. Any suitable embodiment of such learning, as described herein, may be used.

In certain embodiments the control system establishes a profile for a cogeneration plant and/or a cogeneration system in the network. In certain embodiments, the control system groups a plurality of cogeneration systems into a peer group according to the profiles of their cogeneration plants and/or cogeneration systems. In certain embodiments, as described herein, the control system adjusts a profile for one or more cogeneration plants and/or cogeneration systems based on experiments, experience, operator overrides, and other experiences as described elsewhere herein. Profiles, peer groups, and development of profiles are described more fully herein.

In certain embodiments, the optimization of the operation of the network optimizes the profit of the network over a desired time period. The time period may be any time period for the optimization of a profit as described herein. In certain embodiments, the time period is an hour, a day, a week, a month, a quarter, two quarters, three quarters, or a year.

In certain embodiments of the common controller comprises a subcontroller for utilizing a thermal product carrier distribution system as a thermal energy storage system in at least one of the host facilities to both distribute a thermal product carrier and to store thermal energy. Such subcontrollers may be any type as described herein, suitably modified for inclusion in a common controller for a network. In certain embodiments, the subcontroller for utilizing a thermal product carrier distribution system as a thermal storage system in at least 2, 3, 4, 5, or more than 5 of the host facilities to both distribute a thermal product carrier and to store thermal energy. In certain embodiments, the subcontroller receives inputs for one, 2, 3, 4, 5, 6, 7, 9, 10 or more than 10 air temperatures within a particular host facility, inputs for set points for one, 2, 3, 4, 5, 6, 7, 9, 10 or more than 10 air temperatures within the particular facility, and inputs for one, 2, 3, 4, 5, 6, 7, 9, 10 or more than 10 fan rates within the particular host facility. In certain embodiments, the subcontroller further receives inputs from a heat product producer in a particular cogeneration plant comprising 1, 2, 3, 4, 5, 6, 7, 8, 9 or all of a percent load of the thermal product carrier producer, an absolute load of a thermal product carrier producer, an operation state of a thermal product carrier producer, an outlet flow rate for a thermal product carrier produced by the thermal product carrier producer, an inlet flow rate for the thermal product carrier, an outlet temperature for a thermal product carrier produced by the thermal product carrier producer, and/or an inlet temperature foe a thermal product carrier produced by the thermal product carrier producer. In certain embodiments, the subcontroller determines whether or not a set point for one or more of the process units that corresponds to one or more of the inputs described above should be altered. In certain embodiments, the subcontroller determines the one or more set points based on keeping the thermal product carrier producer or thermal product carrier producers operating within a range of percentages of maximum operation. In certain embodiments, the range of percentages is a range around an optimum efficiency operating percentage for the thermal product carrier producer or thermal product carrier producers. In certain embodiments, the upper limit of the range is within 1, 2, 3, 4, 5, 6, 7, 8, 9, 10, 11, 12, 13, 14, 15, 16, 17, 18, 19, 20, 22, or 25% of the optimum efficiency percentage and the lower limit of the range is within 1, 2, 3, 4, 5, 6, 7, 8, 9, 10, 11, 12, 13, 14, 15, 16, 17, 18, 19, 20, 22, or 25% of the optimum efficiency percentage. In certain embodiments, the subcontroller further determines set points for 1, 2, 3, 4, 5, 6, 7, 8, 9, 10, 11, 12, 13, 14, 15, 16, 17, 18, 19, 20, or more than 20 fan rates within the host facility, based at least in part on the range of percentages.

In certain embodiments of the network, the common controller is at least partially Web-based. In certain embodiments of the network some or all of the inputs, the outputs, or both the inputs and the outputs are transmitted wirelessly.

In certain embodiments the invention provides a system comprising (i) a first cogeneration plant that produces electrical power and a first thermal or mechanical work product, operably connected to a first facility that utilizes at least a portion of the electrical power from the first cogeneration plant and to a second facility that utilizes at least a portion of the first thermal or mechanical work product, wherein the first facility and the second facility may be the same or different;

(ii) a second cogeneration plant that produces electrical power and a second thermal or mechanical work product, operably connected to a third facility that utilizes at least a portion of the electrical power from the second cogeneration plant and to a fourth facility that utilizes at least a portion of the second thermal or mechanical work product, wherein the third facility and the fourth facility may be the same or different; and (iii) a control system operably connected to the first and second cogeneration plants and the first, second, third, and fourth facilities, wherein the control system is configured to (a) receive inputs from the first and second cogeneration plants, the first, second, third, and fourth facilities, and indicators of expenses or potential expenses for the first and second cogeneration plants, indicators of revenues or potential revenues for the first and second cogeneration plants, or for any combination thereof; (b) calculate a setpoint for a controller in the first cogeneration plant, the second cogeneration plant, the first facility, the second facility, the third facility, or the fourth facility, or any combination thereof, wherein the setpoint is based on the inputs, and is calculated to optimize a combined profit for the first and second cogeneration plants in a time period; and (c) if the setpoint in (ii) is different from the current setpoint for the controller, sending output to the controller to modulate the activity of the controller to approach the setpoint.

In certain embodiments the invention provides a network of cogeneration systems comprising a first cogeneration system and a second cogeneration system, wherein the first cogeneration system includes a first cogeneration plant that includes a plurality of modular transportable units that are operably connected and a first host facility that receives electric power and/or a thermal product from the first cogeneration plant under a first agreement, and the second cogeneration system includes a second cogeneration plant that includes a plurality of modular transportable units that are operably connected and a second host facility that receives electric power and/or a thermal product from the second cogeneration plant under a second agreement, and a common controller that comprises a receiving system for receiving inputs from a plurality of sensors in a plurality of the modular transportable units in the first cogeneration plant and the second cogeneration plant, from the host facilities, and from external sources, a processing system for processing the inputs to achieve an optimal operating result for the network while meeting an obligation in the first agreement and an obligation in the second agreement, and a transmitting system for transmitting a plurality of outputs to a plurality of actuators in a plurality of the modular transportable units in the first cogeneration plant and the second cogeneration plant so as to achieve the optimal operating result for the network.

In certain embodiments the invention provides a cogeneration plant operably connected to a host facility that has a variable thermal and/or mechanical work product demand and a variable electrical power demand and that receives a thermal and/or mechanical work product and electrical energy from the cogeneration plant according to the variable demands, wherein the cogeneration plant is configured to operate over a three month period at an average efficiency of at least 80% when the host facility electrical power demand and/or the host facility thermal product demand vary by at least an average of 5% daily.

In certain embodiments of the cogeneration plant the average efficiency is at least 81, 82, 83, 84, 85, 86, 87, 88, or 90%. In certain embodiments, the host facility electrical power demand and/or the host facility thermal or mechanical work product demand vary by at least an average of 6, 7, 8 9, 10, 11, 12, 13, 14, 15, 16, 17, 18, 19, 20, 21, 22, 25, 27, 30, 32, 35, 371, 40, 45, 50, 55, 60, 65, 70, 75, 80, 85, 90, 95, or 100% daily.

In certain embodiments the invention provides a system for storing thermal energy and distributing a thermal product carrier comprising (i) a thermal product carrier producer that produces a thermal product carrier; (ii) a distribution system that distributes the thermal product carrier to a facility that uses the thermal product carrier according to a need for the thermal product; and (iii) a controller operably connected to the distribution system and to the thermal product carrier producer, wherein the controller is configured to modulate the operation of a first part of the distribution system and a second part of the distribution system based on inputs from the facility and from the distribution system, such that that the energy required to provide the thermal product carrier to the facility that uses it according to the need for a thermal product is optimized.

In certain embodiments the invention provides a method for storing chilling potential and distributing chilling potential comprising (i) generating a chilled water product with a refrigeration unit in a cogeneration plant; (ii) transporting the chilled water product to a facility that requires a time-varying amount of chilling potential; (iii) distributing the chilled water product to one or more areas in the facility; (iv) running the chilled water product through a coil in the one or more areas of the facility; and (v) moving air in the one or more areas across the coil with a variable-speed fan; (vii) controlling the speed of the fan according to the chilling needs of the area, such that during low chilling need periods the fan runs slowly or is turned off, and during high chilling need periods the fan runs more quickly, and such that the chilled water product in the coil varies in temperature, thus storing chilling potential during low demand times and releasing it during high demand times.

In certain embodiments the invention provides a method of peak shifting a thermal product carrier producer, e.g., refrigeration unit, load comprising storing and releasing thermal energy from the thermal product producer in a distribution system for the thermal product.

In certain embodiments the invention provides a system for storing chilling potential and distributing chilling potential comprising (i) a refrigeration unit that produces a chilled water product, wherein the refrigeration unit operates continuously at between 60-100% load at least 90% of the time; (ii) a refrigeration unit exit conduit that transports the chilled water product to a facility in need of chilled water product, wherein the conduit is operably connected to the refrigeration unit and to the facility; (iii) a distribution system within the facility, operably connected to the refrigeration unit exit conduit, that distributes the chilled water product to one or more areas in the facility in need of chilling; (iv) a heat transfer system operably connected to the distribution system, comprising a heat-conductive chilled water product conduit and a fan to move air across the heat-conductive chilled water conduit, for transferring heat from the area in need of chilling to the chilled water product, to produce a desired degree of chilling in the area, wherein the fan is a variable-speed fan; and (v) a collection system operably connected to the heat transfer system for collecting chilled water product exiting the heat transfer system; (vi) a refrigeration unit return conduit operably connected to the collection system and to the refrigeration unit, that transports chilled water product from the facility to the refrigeration unit; and (vii) a control system operably connected to the facility, the refrigeration unit, and the fans, wherein the control system is configured to (a) receive inputs from sensors that detect temperature in the facility, temperature of the chilled water product at various points in the system, load of the refrigeration unit, flow rates of the chilled water product at various points in the system, and fan speeds for the fans in the facility, and inputs from indicators of desired temperature in one or more areas of the facility; (b) calculate a fan rate, a flow rate for chilled water product, a load level for the refrigeration unit, a vent level for a thermal vent, or any combination thereof; and (c) calculate a setpoint for a fan, a chilled water product valve, a thermal vent valve, a refrigeration unit load controller, or any combination thereof, based on the calculation of (b); and (d) output a signal or signals to adjust a fan speed, a chilled water product valve position, or a load level for a refrigeration unit load controller, or any combination thereof.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that different aspects of the invention can be appreciated individually, collectively, or in combination with each other. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A cogeneration network comprising
   (i) a plurality of cogeneration systems, wherein each cogeneration system comprises a cogeneration plant operably connected to a host facility that receives a thermal product and/or mechanical work product and, optionally, electrical power from the cogeneration plant, and wherein at least one of the cogeneration plants comprises a plurality of operably connected modular transportable units, wherein the modular transportable units exist in a first form that is a transportable form and second form that is an assembled form, and wherein the first form and the second form are substantially similar for at least two of the modular transportable units; and
   (ii) a common controller for optimizing the operation of the cogeneration network that is operably connected to the plurality of cogeneration systems wherein the common controller
      (a) receives inputs from a plurality of sensors in or near each of the plurality of cogeneration systems;
      (b) processes the inputs to determine a plurality of outputs, and
      (c) transmits the outputs to a plurality of actuators in the plurality of cogeneration systems, whereby the operation of the network of cogeneration systems is optimized.

2. The network of claim 1 wherein the network comprises at least 2 cogeneration systems wherein at least one of the cogeneration systems comprises a plurality of operably connected modular transportable units.

3. The network of claim 1 wherein the sensors comprise sensors in the cogeneration plants, sensors in the host facilities, sensors for the environment at or near one or more of the cogeneration plants and/or host facilities, or sensors for operable connections between one or more of the cogeneration plants and it host facility, or any combination thereof.

4. The network of claim 1 wherein the common controller further receives input from one or more of the host facilities in one or more of the cogeneration systems, wherein the input comprises an electrical energy demand, a thermal product demand, a thermal product carrier flow rate, an air temperature, a thermal product carrier temperature, a fan rate, a humidity, a set point for an air temperature, a set point for a thermal product carrier temperature, or any combination thereof.

5. The network of claim 1 wherein the common controller further receives inputs from indicators of market conditions.

6. The network of claim 1 wherein the common controller receives inputs from at least 10 sensors, wherein the sensors are located in at least 2 cogeneration systems.

7. The network of claim 1 wherein the common controller further receives input indicating a desired future modulation in a condition of at least 1 host facility wherein the input indicating the desired future modulation is inputted from an interface for interaction between the system and an operator of the host facility.

8. The network of claim 1 wherein the modular transportable units of one of the cogeneration plants comprise at least 2 of a modular transportable unit comprising an electrical generator, a modular transportable unit comprising part or all of a heat recovery steam generator (HRSG), a modular transportable unit comprising part or all of a thermal product carrier producer, a modular transportable unit comprising part or all of a cooling tower, a modular transportable unit comprising part or all an exhaust stack, or a modular transportable unit comprising part or all a an air intake unit, or any combination thereof.

9. The network of claim 1 where the optimization of the operation of the network optimizes the profit of the network over a desired time period.

10. The network of claim 1 wherein the optimization of the operation of the network optimizes an energy efficiency of the network over a desired time period.

11. The network of claim 1 wherein the actuators in a cogeneration plant of the system comprise an actuator or actuator system for controlling a pre-cooler, an actuator or actuator system for controlling a turbine, an actuator or actuator system for controlling a heat recovery steam generator, an actuator or actuator system for controlling a thermal product carrier producer, an actuator or actuator system for controlling a mechanical work product carrier producer, an actuator or actuator system for controlling a cooling tower, an actuator or actuator system for controlling one or more distribution pumps, or optionally, an actuator or actuator system for controlling a thermal energy storage product producer, or any combination thereof.

12. The network of claim 1 wherein the controller is configured to transmit outputs to at least 6 actuators spread over at least 2 cogeneration systems.

13. A cogeneration network comprising
   (i) a plurality of cogeneration systems, wherein each cogeneration system comprises a cogeneration plant operably connected to a host facility that receives a thermal product and/or mechanical work product and, optionally, electrical power from the cogeneration plant, and wherein at least one of the cogeneration plants comprises a plurality of operably connected modular transportable units; and
   (ii) a common controller for optimizing the operation of the cogeneration network that is operably connected to the plurality of cogeneration systems wherein the common controller
      (a) receives inputs from a plurality of sensors in or near each of the plurality of cogeneration systems;
      (b) processes the inputs to determine a plurality of outputs, and (c) transmits the outputs to a plurality of actuators in the plurality of cogeneration systems, whereby the operation of the network of cogeneration systems is optimized; and wherein the controller is configured so that the processing of step (ii)(b) comprises a forecast step, and wherein the forecast step forecasts a future value or range of values, or a probability of a future value or range of values, for a fuel price, an electricity export price, an electricity import price, an ambient environmental condition, an emissions limit, an incentive for the cogeneration plant, a price for a demand response action, a price for a thermal product, a price for water, an electrical demand from a host facility, a thermal product demand from a host facility, wherein the future value or range of future values, or probability of a future value or range of future values, is a value or range of values or probability of a value or range of values for at least one of the cogeneration systems; and wherein the controller is configured so that the processing step of ii(b) may comprise determining a change in one or more set points for one or more the actuators based at least in part on one or more of the forecast values or range of values.

14. The network of claim 13 wherein the common controller further comprises a data storage unit for storing a value for a timing and/or result that occurs after the change in the one or more set points, and wherein the controller is configured to adjust the processing step based on one or more of the results of a previous output, such as a result stored in the data storage unit, to improve the function of the network in the future.

15. The network of claim 13 wherein the sensors comprise sensors in the cogeneration plants, sensors in the host facilities, sensors for the environment at or near one or more of the cogeneration plants and/or host facilities, or sensors for operable connections between one or more of the cogeneration plants and it host facility, or any combination thereof.

16. The network of claim 13 wherein the common controller further receives input from one or more of the host facilities in one or more of the cogeneration systems, wherein the input comprises an electrical energy demand, a thermal product demand, a thermal product carrier flow rate, an air temperature, a thermal product carrier temperature, a fan rate, a humidity, a set point for an air temperature, a set point for a thermal product carrier temperature, or any combination thereof.

17. The network of claim 13 wherein the common controller further receives inputs from indicators of market conditions.

18. The network of claim 13 wherein the common controller receives inputs from at least 10 sensors, wherein the sensors are located in at least 2 cogeneration systems.

19. The network of claim 13 wherein the common controller further receives input indicating a desired future modulation in a condition of at least 1 host facility wherein the input indicating the desired future modulation is inputted from an interface for interaction between the system and an operator of the host facility.

20. The network of claim 13 wherein the modular transportable units of one of the cogeneration plants comprise at least 2 of a modular transportable unit comprising an electrical generator, a modular transportable unit comprising part or all of a heat recovery steam generator (HRSG), a modular transportable unit comprising part or all of a thermal product carrier producer, a modular transportable unit comprising part or all of a cooling tower, a modular transportable unit comprising part or all an exhaust stack, or a modular transportable unit comprising part or all a an air intake unit, or any combination thereof.

21. The network of claim 13 where the optimization of the operation of the network optimizes the profit of the network over a desired time period.

22. The network of claim 13 wherein the optimization of the operation of the network optimizes an energy efficiency of the network over a desired time period.

23. The network of claim 13 wherein the controller is configured to transmit outputs to at least 6 actuators spread over at least 2 cogeneration systems.

\* \* \* \* \*